US012290852B2

(12) United States Patent
Oberoi et al.

(10) Patent No.: US 12,290,852 B2
(45) Date of Patent: May 6, 2025

(54) AUTONOMOUS FLEXIBLE MANUFACTURING SYSTEM FOR BUILDING A FUSELAGE

(71) Applicant: The Boeing Company, Arlington, VA (US)

(72) Inventors: Harinder S. Oberoi, Snohomish, WA (US); Branko Sarh, Huntington Beach, CA (US); Melissa Ann Findlay, Snohomish, WA (US); Alan S. Draper, Everett, WA (US); Jorge Alberto Arriaga, Kirkland, WA (US); Richard Griffith Reese, IV, Seattle, WA (US); Alfredo Jose Gerosa, Snohomish, WA (US); Kevin Marion Barrick, Kingston, WA (US); Michael J. Kozak, Snohomish, WA (US); Quang T. Do, Mukilteo, WA (US); Jeffrey Lawrence Miller, Mukilteo, WA (US); Yuanxin Charles Hu, Newcastle, WA (US)

(73) Assignee: The Boeing Company, Arlington, VA (US)

(*) Notice: Subject to any disclaimer, the term of this patent is extended or adjusted under 35 U.S.C. 154(b) by 0 days.

(21) Appl. No.: 18/356,032

(22) Filed: Jul. 20, 2023

(65) Prior Publication Data
US 2023/0364669 A1 Nov. 16, 2023

Related U.S. Application Data

(62) Division of application No. 16/284,417, filed on Feb. 25, 2019, now Pat. No. 11,724,305, which is a
(Continued)

(51) Int. Cl.
B64F 5/10 (2017.01)
B21J 15/02 (2006.01)
(Continued)

(52) U.S. Cl.
CPC .............. *B21J 15/28* (2013.01); *B21J 15/02* (2013.01); *B21J 15/10* (2013.01); *B21J 15/142* (2013.01);
(Continued)

(58) Field of Classification Search
CPC ..... B23P 21/00; B23P 21/002; B23P 2700/01; B23P 19/10; B23P 19/102; B64F 5/10;
(Continued)

(56) References Cited

U.S. PATENT DOCUMENTS 1,128,634 A 2/1915 Talbot
1,533,099 A 4/1925 Carroll
(Continued)

FOREIGN PATENT DOCUMENTS

CN 1221500 A 6/1999
CN 1252754 A 5/2000
(Continued)

OTHER PUBLICATIONS

Extended European Search Report, dated Nov. 5, 2015, regarding Application No. EP14196476.7, 6 pages.
(Continued)

*Primary Examiner* — Christopher J. Besler
(74) *Attorney, Agent, or Firm* — Yee & Associates, P.C.

(57) ABSTRACT

A method and apparatus for building a fuselage assembly for an aircraft. A number of fixtures may be drive across a floor to an assembly area to form an assembly fixture. The fuselage assembly may be built on the assembly fixture.

11 Claims, 24 Drawing Sheets

Related U.S. Application Data division of application No. 14/559,518, filed on Dec. 3, 2014, now Pat. No. 10,213,823.

(60) Provisional application No. 62/022,641, filed on Jul. 9, 2014.

(51) Int. Cl.

| | | |
|---|---|---|
| *B21J 15/10* | (2006.01) | |
| *B21J 15/14* | (2006.01) | |
| *B21J 15/28* | (2006.01) | |
| *B21J 15/32* | (2006.01) | |
| *B21J 15/40* | (2006.01) | |
| *B23P 19/10* | (2006.01) | |
| *B25B 5/16* | (2006.01) | |
| *B25J 5/00* | (2006.01) | |
| *B25J 9/16* | (2006.01) | |
| *B25J 11/00* | (2006.01) | |
| *B29C 39/02* | (2006.01) | |
| *B29C 39/10* | (2006.01) | |
| *B29C 39/12* | (2006.01) | |
| *B29C 39/22* | (2006.01) | |
| *B29C 45/14* | (2006.01) | |
| *B29C 65/70* | (2006.01) | |
| *B60G 3/14* | (2006.01) | |
| *B60G 7/00* | (2006.01) | |
| *B64C 1/00* | (2006.01) | |
| *B64C 1/06* | (2006.01) | |
| *B64F 5/50* | (2017.01) | |
| *F16B 19/06* | (2006.01) | |
| *G05B 19/418* | (2006.01) | |
| *G05D 1/00* | (2006.01) | |
| *G05D 3/12* | (2006.01) | |
| *B23P 21/00* | (2006.01) | |
| *B29L 31/00* | (2006.01) | |
| *B60P 3/025* | (2006.01) | |

(52) U.S. Cl.
CPC ............ *B21J 15/32* (2013.01); *B21J 15/40* (2013.01); *B23P 19/10* (2013.01); *B25B 5/163* (2013.01); *B25J 5/007* (2013.01); *B25J 9/1682* (2013.01); *B25J 9/1687* (2013.01); *B25J 9/1697* (2013.01); *B25J 11/005* (2013.01); *B25J 11/007* (2013.01); *B29C 39/026* (2013.01); *B29C 39/10* (2013.01); *B29C 39/123* (2013.01); *B29C 39/22* (2013.01); *B29C 45/14336* (2013.01); *B29C 65/70* (2013.01); *B60G 3/145* (2013.01); *B60G 7/001* (2013.01); *B60G 7/008* (2013.01); *B64C 1/00* (2013.01); *B64C 1/06* (2013.01); *B64C 1/068* (2013.01); *B64F 5/10* (2017.01); *B64F 5/50* (2017.01); *F16B 19/06* (2013.01); *G05B 19/41805* (2013.01); *G05D 1/0088* (2013.01); *G05D 3/12* (2013.01); *B23P 21/002* (2013.01); *B23P 2700/00* (2013.01); *B23P 2700/01* (2013.01); *B29C 2045/14368* (2013.01); *B29C 2793/0081* (2013.01); *B29K 2715/00* (2013.01); *B29L 2031/748* (2013.01); *B60G 2204/143* (2013.01); *B60G 2204/418* (2013.01); *B60G 2206/8207* (2013.01); *B60G 2300/60* (2013.01); *B60P 3/025* (2013.01); *B64C 1/069* (2013.01); *G05B 2219/45071* (2013.01); *Y02P 90/80* (2015.11); *Y10S 901/01* (2013.01); *Y10S 901/02* (2013.01); *Y10S 901/41* (2013.01)

(58) Field of Classification Search
CPC ... B64F 5/50; B64F 1/10; B25J 11/005; B25J 11/007; B25J 5/007; B25J 9/1682; B25B 5/163

See application file for complete search history.

(56) References Cited

U.S. PATENT DOCUMENTS

| | | |
|---|---|---|
| 2,505,245 A | 4/1950 | Hollerith |
| 2,712,874 A | 7/1955 | Murray |
| 2,714,321 A | 8/1955 | Roy |
| 2,896,909 A | 7/1959 | Taylor |
| 3,253,842 A | 5/1966 | Rabe |
| 3,348,572 A | 10/1967 | Hall |
| 3,355,346 A | 11/1967 | Black et al. |
| 3,774,636 A | 11/1973 | Arita |
| 3,865,203 A | 2/1975 | Hibma |
| 3,952,401 A | 4/1976 | Wagner |
| 4,172,591 A | 10/1979 | Craig |
| 4,310,958 A | 1/1982 | Balaud et al. |
| 4,424,741 A | 1/1984 | Moldestad |
| 4,440,265 A | 4/1984 | Spagnoli |
| 4,461,455 A | 7/1984 | Mills et al. |
| 4,575,934 A | 3/1986 | Kitmura et al. |
| 4,599,033 A | 7/1986 | Raz |
| 4,655,630 A | 4/1987 | Rinehart |
| 4,685,368 A | 8/1987 | Gardener |
| 4,714,339 A | 12/1987 | Lau et al. |
| 4,740,025 A | 4/1988 | Nelson |
| 4,793,053 A | 12/1988 | Zuccaro et al. |
| 4,798,371 A | 1/1989 | Wallisser |
| 4,864,702 A | 9/1989 | Speller et al. |
| 4,867,595 A | 9/1989 | Hoffman |
| 4,885,836 A | 12/1989 | Bonomi et al. |
| 4,943,202 A | 7/1990 | Galloway |
| 4,995,148 A | 2/1991 | Bonomi et al. |
| 5,005,912 A | 4/1991 | Pipes |
| 5,145,276 A | 9/1992 | Demange |
| 5,174,772 A | 12/1992 | Vranish |
| 5,248,341 A | 9/1993 | Berry et al. |
| 5,408,219 A | 4/1995 | Newman et al. |
| 5,477,597 A | 12/1995 | Catania et al. |
| 5,857,713 A | 1/1999 | Horimoto |
| 5,896,637 A | 4/1999 | Sarh |
| 5,903,459 A | 11/1999 | Greenwood et al. |
| 6,030,244 A | 2/2000 | Buckheit et al. |
| 6,098,260 A | 8/2000 | Sarh |
| 6,108,896 A | 8/2000 | Gignac et al. |
| 6,113,343 A | 9/2000 | Goldenberg et al. |
| 6,158,666 A | 12/2000 | Banks et al. |
| 6,282,036 B1 | 8/2001 | Woytassek |
| 6,295,710 B1 | 10/2001 | Roberts et al. |
| 6,357,194 B1 | 3/2002 | Jones |
| 6,375,378 B1 | 4/2002 | Kitaura |
| 6,415,476 B1 | 7/2002 | McCoy |
| 6,447,073 B1 | 9/2002 | Goettker |
| 6,470,820 B1 | 10/2002 | Wilkins |
| 6,481,096 B2 | 11/2002 | Lehmker et al. |
| 6,505,393 B2 | 1/2003 | Stoewer et al. |
| 6,513,231 B1* | 2/2003 | Hafenrichter ......... B23P 21/002 29/721 |
| 6,691,392 B2 | 2/2004 | Savoy et al. |
| 7,111,854 B1 | 9/2006 | Tuthill et al. |
| 7,237,789 B1 | 7/2007 | Herman |
| 7,344,109 B1 | 3/2008 | Rezai |
| 7,367,973 B2 | 5/2008 | Manzo et al. |
| 7,402,009 B2 | 7/2008 | Hamann et al. |
| 7,416,363 B2 | 8/2008 | Kozhuev |
| 7,421,886 B1 | 9/2008 | Fox et al. |
| 7,527,759 B2 | 5/2009 | Lee et al. |
| 7,530,607 B2 | 5/2009 | Luft |
| 7,591,621 B1 | 9/2009 | Landrum et al. |
| RE41,821 E | 10/2010 | Ross et al. |
| 7,940,685 B1 | 5/2011 | Breslau et al. |
| 7,966,729 B2 | 6/2011 | Frauen et al. |
| 8,266,778 B2 | 9/2012 | Neuhaus et al. |

(56) References Cited

U.S. PATENT DOCUMENTS

| | | |
|---|---|---|
| 8,602,713 B1 | 12/2013 | Davis et al. |
| 8,634,950 B2 | 1/2014 | Simonetti et al. |
| 8,753,050 B2 | 6/2014 | Cyrus et al. |
| 8,989,053 B1 | 3/2015 | Skaaksrud et al. |
| 9,063,525 B2 | 6/2015 | Sanders et al. |
| 9,096,331 B2 | 8/2015 | Gehlsen |
| 9,309,008 B2 | 4/2016 | Boulanger et al. |
| 9,315,137 B1 | 4/2016 | Davis et al. |
| 9,327,751 B2 | 5/2016 | Nou et al. |
| 9,505,051 B2 | 11/2016 | Oberoi et al. |
| 9,751,435 B1 | 9/2017 | Davis et al. |
| 10,016,805 B2 | 7/2018 | Oberoi et al. |
| 2001/0054228 A1 | 12/2001 | Lehmker et al. |
| 2002/0087587 A1 | 7/2002 | Vos et al. |
| 2002/0092149 A1 | 7/2002 | Wolf et al. |
| 2002/0124377 A1 | 9/2002 | Nakamura |
| 2002/0170160 A1 | 11/2002 | Savoy et al. |
| 2003/0009867 A1 | 1/2003 | Whiten et al. |
| 2003/0023540 A2 | 1/2003 | Johnson et al. |
| 2003/0229900 A1 | 12/2003 | Reisman |
| 2004/0022379 A1 | 2/2004 | Klos et al. |
| 2004/0110483 A1 | 6/2004 | Mollenkopf |
| 2004/0113756 A1 | 6/2004 | Mollenkopf |
| 2004/0113757 A1 | 6/2004 | White et al. |
| 2004/0135676 A1 | 7/2004 | Berkman et al. |
| 2004/0267254 A1 | 12/2004 | Manzo et al. |
| 2005/0015962 A1 | 1/2005 | Sturm et al. |
| 2005/0023052 A1 | 2/2005 | Beck et al. |
| 2005/0041048 A1 | 2/2005 | Hillman et al. |
| 2005/0198797 A1* | 9/2005 | Appleton ................ B64F 5/50 29/469 |
| 2005/0275181 A1 | 12/2005 | MacIsaac |
| 2006/0032702 A1 | 2/2006 | Linsmeier et al. |
| 2006/0117547 A1 | 6/2006 | Ffield et al. |
| 2006/0118235 A1 | 6/2006 | Lum et al. |
| 2006/0167587 A1 | 7/2006 | Read |
| 2006/0171776 A1 | 8/2006 | Luft |
| 2006/0218780 A1 | 10/2006 | Lewis et al. |
| 2006/0284047 A1 | 12/2006 | Spishak et al. |
| 2007/0001432 A1 | 1/2007 | Thurm |
| 2007/0001868 A1 | 1/2007 | Hillan |
| 2007/0051852 A1 | 3/2007 | McCoskey et al. |
| 2007/0061811 A1 | 3/2007 | Rumelhart et al. |
| 2007/0080001 A1 | 4/2007 | Beck et al. |
| 2007/0143398 A1 | 6/2007 | Graham |
| 2007/0200379 A1 | 8/2007 | Key et al. |
| 2007/0220341 A1 | 9/2007 | Apostoloui et al. |
| 2007/0266423 A1 | 11/2007 | Tehee |
| 2007/0276538 A1 | 11/2007 | Kjellsson |
| 2008/0025790 A1 | 1/2008 | Kozhuev |
| 2008/0099612 A1 | 5/2008 | Plude et al. |
| 2008/0113557 A1 | 5/2008 | Cox |
| 2008/0160253 A1 | 7/2008 | Liu et al. |
| 2008/0162956 A1 | 7/2008 | Bozek et al. |
| 2008/0162958 A1 | 7/2008 | Bozek et al. |
| 2008/0178537 A1 | 7/2008 | Spangler et al. |
| 2008/0205763 A1 | 8/2008 | Marsh et al. |
| 2008/0244888 A1 | 10/2008 | Sarh |
| 2008/0250626 A1* | 10/2008 | Frankenberger ........ B64F 5/10 29/430 |
| 2008/0255899 A1 | 10/2008 | McConnell et al. |
| 2008/0256776 A1 | 10/2008 | Neuhaus et al. |
| 2008/0307630 A1 | 12/2008 | Hasegawa et al. |
| 2009/0022556 A1 | 1/2009 | Clark |
| 2009/0044655 A1 | 2/2009 | DeLouis et al. |
| 2009/0067973 A1 | 3/2009 | Eliuk et al. |
| 2009/0083589 A1 | 3/2009 | Fulton et al. |
| 2009/0100096 A1 | 4/2009 | Erlichson et al. |
| 2009/0139375 A1 | 6/2009 | Hathaway |
| 2009/0313363 A1 | 12/2009 | Parsons et al. |
| 2009/0313830 A1 | 12/2009 | Bisiach et al. |
| 2010/0011563 A1 | 1/2010 | Burns |
| 2010/0031509 A1 | 2/2010 | Frauen et al. |
| 2010/0077810 A1 | 4/2010 | De Franceschi et al. |
| 2010/0156632 A1 | 6/2010 | Hyland et al. |
| 2010/0235037 A1 | 6/2010 | Vian et al. |
| 2010/0217437 A1 | 8/2010 | Sarh et al. |
| 2010/0259931 A1 | 10/2010 | Chemel et al. |
| 2010/0264846 A1 | 10/2010 | Chemel et al. |
| 2010/0270933 A1 | 10/2010 | Chemel et al. |
| 2010/0295473 A1 | 11/2010 | Chemel et al. |
| 2010/0295474 A1 | 11/2010 | Chemel et al. |
| 2010/0295475 A1 | 11/2010 | Chemel et al. |
| 2010/0295482 A1 | 11/2010 | Chemel et al. |
| 2010/0295672 A1 | 11/2010 | Hyland et al. |
| 2010/0301768 A1 | 12/2010 | Chemel et al. |
| 2010/0301769 A1 | 12/2010 | Chemel et al. |
| 2010/0301770 A1 | 12/2010 | Chemel et al. |
| 2010/0301771 A1 | 12/2010 | Chemel et al. |
| 2010/0301774 A1 | 12/2010 | Chemel et al. |
| 2010/0307279 A1 | 12/2010 | Campagna et al. |
| 2011/0001436 A1 | 1/2011 | Chemel et al. |
| 2011/0001438 A1 | 1/2011 | Chemel et al. |
| 2011/0010007 A1 | 1/2011 | Sarh et al. |
| 2011/0046775 A1 | 2/2011 | Bailey et al. |
| 2011/0054694 A1 | 3/2011 | Munk |
| 2011/0063417 A1 | 3/2011 | Peters et al. |
| 2011/0066297 A1 | 3/2011 | Saberi et al. |
| 2011/0138601 A1 | 6/2011 | Kilibarda |
| 2011/0189440 A1 | 8/2011 | Appleby et al. |
| 2011/0308638 A1 | 12/2011 | Hyland et al. |
| 2012/0007374 A1 | 1/2012 | Nakasugi et al. |
| 2012/0197449 A1 | 8/2012 | Sanders |
| 2012/0235579 A1 | 9/2012 | Chemel et al. |
| 2012/0240381 A1 | 9/2012 | Carey |
| 2012/0300093 A1 | 11/2012 | Laudrain et al. |
| 2013/0008977 A1 | 1/2013 | Pfrenger et al. |
| 2013/0009469 A1 | 1/2013 | Gillett |
| 2013/0035783 A1 | 2/2013 | Scheuerman et al. |
| 2013/0152397 A1 | 6/2013 | Oberoi et al. |
| 2013/0167610 A1 | 7/2013 | Sarh et al. |
| 2013/0176141 A1 | 7/2013 | LaFrance et al. |
| 2013/0185925 A1* | 7/2013 | Sarh ................ B21J 15/105 29/283 |
| 2014/0077471 A1 | 3/2014 | Chang et al. |
| 2014/0096365 A1 | 4/2014 | Sarh et al. |
| 2014/0156905 A1 | 6/2014 | Butcher et al. |
| 2014/0165388 A1 | 6/2014 | Kim et al. |
| 2014/0223490 A1 | 8/2014 | Pan et al. |
| 2014/0292538 A1 | 10/2014 | Pathi et al. |
| 2014/0312581 A1 | 10/2014 | Anderson |
| 2014/0331473 A1* | 11/2014 | Smith ................ B64F 5/10 29/281.1 |
| 2015/0005939 A1 | 1/2015 | DiStefano |
| 2015/0052596 A1 | 2/2015 | Ayanam et al. |
| 2015/0060231 A1 | 3/2015 | Bosgoed |
| 2015/0082593 A1 | 3/2015 | Courtier |
| 2015/0128394 A1 | 5/2015 | Sarh et al. |
| 2015/0135206 A1 | 5/2015 | Reisman |
| 2015/0135214 A1 | 5/2015 | Reisman |
| 2015/0244306 A1 | 8/2015 | Estes |
| 2015/0306967 A1 | 10/2015 | Cohen |
| 2015/0363481 A1 | 12/2015 | Haynes |
| 2015/0375390 A1 | 12/2015 | Becroft et al. |
| 2016/0008869 A1 | 1/2016 | Oberoi et al. |
| 2016/0008934 A1 | 1/2016 | Oberoi et al. |
| 2016/0008981 A1 | 1/2016 | Oberoi et al. |
| 2016/0009155 A1 | 1/2016 | Oberoi et al. |
| 2016/0009416 A1 | 1/2016 | Oberoi et al. |
| 2016/0009417 A1 | 1/2016 | Oberoi et al. |
| 2016/0009418 A1 | 1/2016 | Oberoi et al. |
| 2016/0009419 A1 | 1/2016 | Oberoi et al. |
| 2016/0009420 A1 | 1/2016 | Oberoi et al. |
| 2016/0009421 A1 | 1/2016 | Oberoi et al. |
| 2016/0009422 A1 | 1/2016 | Oberoi et al. |
| 2016/0011593 A1 | 1/2016 | Oberoi et al. |
| 2016/0068210 A1 | 3/2016 | Sakamoto |
| 2016/0075347 A1 | 3/2016 | Thompson et al. |
| 2016/0087432 A1 | 3/2016 | Matan et al. |
| 2016/0130017 A1 | 5/2016 | Best et al. |
| 2016/0163177 A1 | 6/2016 | Klicpera |
| 2016/0204606 A1 | 7/2016 | Matan et al. |
| 2016/0217093 A1 | 7/2016 | Whittington et al. |
| 2016/0311284 A1 | 10/2016 | Osborne et al. |

(56) References Cited

U.S. PATENT DOCUMENTS

| | | |
|---|---|---|
| 2016/0319855 A1 | 11/2016 | Watanabe |
| 2016/0381181 A1 | 12/2016 | Cohan |
| 2018/0126447 A1 | 5/2018 | Oberoi et al. |
| 2018/0318911 A1 | 11/2018 | Oberoi et al. |
| 2018/0361462 A1 | 12/2018 | Oberoi et al. |

FOREIGN PATENT DOCUMENTS

| | | |
|---|---|---|
| CN | 1322607 A | 11/2001 |
| CN | 2779207 Y | 5/2006 |
| CN | 101212875 A | 7/2008 |
| CN | 101357687 A | 2/2009 |
| CN | 101462595 A | 6/2009 |
| CN | 101583536 A | 11/2009 |
| CN | 201442654 U | 4/2010 |
| CN | 102519441 A | 6/2010 |
| CN | 101898301 A | 12/2010 |
| CN | 102001451 A | 4/2011 |
| CN | 102405447 A | 4/2012 |
| CN | 102554594 A | 7/2012 |
| CN | 102765489 A | 11/2012 |
| CN | 102795011 A | 11/2012 |
| CN | 103158890 A | 6/2013 |
| CN | 103226789 A | 7/2013 |
| CN | 103228536 A | 7/2013 |
| CN | 103303491 A | 9/2013 |
| CN | 103434653 A | 12/2013 |
| CN | 103889664 A | 6/2014 |
| CN | 204624973 U | 9/2015 |
| DE | 10134852 A1 | 8/2002 |
| DE | 102008062026 A1 | 6/2010 |
| DE | 102009018991 A1 | 11/2010 |
| DE | 102011053800 A1 | 3/2013 |
| EP | 1063166 A1 | 12/2000 |
| EP | 1961514 A2 | 8/2008 |
| EP | 2166646 A1 | 3/2010 |
| EP | 2221151 A2 | 8/2010 |
| EP | 2527257 A1 | 11/2012 |
| EP | 2527527 A2 | 11/2012 |
| EP | 2604523 A2 | 6/2013 |
| EP | 2617536 A1 | 7/2013 |
| EP | 2965832 A3 | 1/2016 |
| EP | 2965871 A2 | 1/2016 |
| FR | 2153221 A1 | 5/1973 |
| FR | 2457151 A1 | 12/1980 |
| FR | 2706369 A1 | 12/1994 |
| FR | 2841809 A1 | 1/2004 |
| GB | 2473100 A | 3/2011 |
| JP | H07223177 A | 8/1995 |
| JP | H0828751 A | 2/1996 |
| JP | 2010520104 A | 6/2010 |
| JP | 2010194710 A | 9/2010 |
| JP | 2012126388 A | 7/2012 |
| JP | 2013124099 A | 6/2013 |
| JP | 2013154464 A | 8/2013 |
| WO | WO9636461 A1 | 11/1996 |
| WO | WO2008106249 A3 | 4/2008 |
| WO | WO2014023284 A2 | 2/2014 |
| WO | WO2014163921 A1 | 10/2014 |

OTHER PUBLICATIONS

Partial European Search Report, dated Nov. 17, 2015, regarding Application No. EP14196497.3, 5 pages.
Extended European Search Report, dated Nov. 26, 2015, regarding Application No. EP14196544.2, 8 pages.
Extended European Search Report, dated Dec. 2, 2015, regarding Application No. EP14196574.9, 8 pages.
Extended European Search Report, dated Feb. 8, 2016, regarding Application No. EP14196497.3, 13 pages.
Partial European Search Report, dated Jan. 28, 2016, regarding Application No. EP14196608.5, 10 pages.
Partial European Search Report, dated Jun. 20, 2016, regarding Application No. EP14196485.8, 129 pages.
Extended European Search Report, dated Feb. 18, 2016, regarding Application No. EP14196581.4, 9 pages.
Extended European Search Report, dated May 4, 2016, regarding Application No. EP14196469.2, 8 pages.
Extended European Search Report, dated Apr. 8, 2016, regarding Application No. EP14196472.6, 6 pages.
Extended European Search Report, dated May 9, 2016, regarding Application No. EP14196474.2, 8 pages.
Extended European Search Report, dated May 10, 2016, regarding Application No. EP14196491.6, 7 pages.
Canadian Search Report, dated Jun. 1, 2016, regarding Application No. 2894206, 4 pages.
Canadian Search Report, dated Jun. 28, 2016, regarding Application No. 2895735, 4 pages.
Canadian Search Report, dated Aug. 3, 2016, regarding Application No. 2895704, 4 pages.
Canadian Search Report, dated Sep. 8, 2016, regarding Application No. 2,894,299, 5 pages.
Extended European Search Report, dated Jul. 11, 2016, regarding Application No. 14196608.5, 15 pages.
Canadian Intellectual Property Office Examination Search Report, dated Jan. 30, 2017, regarding Application No. 2,895,739, 3 pages.
Extended European Search Report, dated Mar. 15, 2017, regarding Application No. EP14196485.8, 9 pages.
Canadian Intellectual Property Office Examination Search Report, dated Feb. 23, 2017, regarding Application No. 2,896,059, 3 pages.
Canadian Intellectual Property Office Office Action, dated Apr. 10, 2017, regarding Application No. 2,895,735, 3 pages.
Canadian Intellectual Property Office Office Action, dated May 2, 2017, regarding Application No. 2,894,311, 17 pages.
Canadian Intellectual Property Office Office Action, dated Apr. 27, 2017, regarding Application No. 2,895,737, 10 pages.
Canadian Intellectual Property Office Office Action, dated Apr. 6, 2017, regarding Application No. 2,894,306, 12 pages.
Decker et al. "Dynamic Measurement of Position and Orientation of Robots", IEEE Transactions on Instrumentation and Measurement, vol. 41, No. 6, Dec. 1992, 5 pages.
Canadian Intellectual Property Office Office Action, dated May 29, 2017, regarding Application No. 2,895,704, 7 pages.
Canadian Intellectual Property Office Office Action, dated Jun. 9, 2017, regarding Application No. 2,895,824, 5 pages.
Canadian Intellectual Property Office Office Action, dated Jul. 5, 2017, regarding Application No. 2,894,299, 18 pages.
Extended European Search Report, dated Jul. 25, 2017, regarding Application No. EP17168019.2, 8 pages.
Canadian Intellectual Property Office, Office Action, dated Jan. 25, 2018, regarding Application No. 2,895,737, 11 pages.
Canadian Intellectual Property Office Examination Report, dated Jan. 31, 2018, regarding Application No. 2,894,308, 19 pages.
The State Intellectual Property Office of China First Notification of Office Action, dated Feb. 9, 2018, regarding Application No. 201510394630.6, 10 pages.
The Korean Intellectual Property Office, Notice of Office Action, dated Mar. 23, 2018, regarding Application No. 10-2015-0096358, 10 pages.
Canadian Intellectual Property Office Office Action, dated May 18, 2018, regarding Application No. 2,894,299, 25 pages.
The State Intellectual Property Office of China First Notification of Office Action, Search Report, and English Translation, dated May 28, 2018, regarding Application No. 201510400526.3, 15 pages.
The State Intellectual Property Office of China First Notification of Office Action, Search Report, and English translation, dated May 28, 2018, regarding Application No. 201510389151.5, 19 pages.
The State Intellectual Property Office of China First Notification of Office Action, Search Report, and English Translation, dated Jun. 22, 2018, regarding Application No. 201510370020.2, 18 pages.
The State Intellectual Property Office of China First Notification of Office Action, Search Report, and English Translation, dated Jun. 26, 2018, regarding Application No. 201510387516.0, 18 pages.
Chinese National Intellectual Property Administration First Notification of Office Action with English Translation, dated Sep. 19, 2018, regarding Application No. 201510397579.4, 17 pages.

(56) References Cited

OTHER PUBLICATIONS

Chinese National Intellectual Property Administration First Notification of Office Action with English Translation, dated Sep. 26, 2018, regarding Application No. 201510400529.7, 11 pages.
Chinese National Intellectual Property Administration First Notification of Office Action with English Translation, dated Oct. 26, 2018, regarding Application No. 201510394571.2, 13 pages.
Chinese National Intellectual Property Administration First Notification of Office Action with English Translation, dated Oct. 29, 2018, regarding Application No. 201510400460.8, 13 pages.
Canadian Intellectual Property Office Examination Search Report, dated Nov. 8, 2018, regarding Application No. 2894308, 3 pages.
European Patent Office Communication Report, dated Nov. 16, 2018, regarding Application No. 14196574.9, 7 pages.
European Patent Office Communication Report, dated Dec. 6, 2018, regarding Application No. 14196608.5, 4 pages.
Office Action, dated Mar. 4, 2016, regarding U.S. Appl. No. 14/558,933, 22 pages.
Notice of Allowance, dated Jul. 20, 2016, regarding U.S. Appl. No. 14/558,933, 18 pages.
Office Action, dated Sep. 25, 2017, regarding U.S. Appl. No. 15/352,524, 49 pages.
Office Action, dated Jan. 27, 2017, U.S. Appl. No. 14/559,073, 53 pages.
Final Office Action, dated Jun. 8, 2017, regarding U.S. Appl. No. 14/559,073, 22 pages.
Office Action, dated Nov. 29, 2016, U.S. Appl. No. 14/559,115, 48 pages.
Notice of Allowance, dated Jun. 2, 2017, regarding U.S. Appl. No. 14/559,115, 15 pages.
Office Action, dated Apr. 6, 2017, regarding U.S. Appl. No. 14/559,153, 42 pages.
Final Office Action, dated Oct. 18, 2017, regarding U.S. Appl. No. 14/559,153, 20 pages.
Office Action, dated Feb. 10, 2017, regarding U.S. Appl. No. 14/559,855, 45 pages.
Final Office Action, dated Aug. 9, 2017, regarding U.S. Appl. No. 14/559,855, 38 pages.
Office Action, dated Feb. 1, 2017, regarding U.S. Appl. No. 14/559,234, 47 pages.
Final Office Action, dated Jun. 8, 2017, regarding U.S. Appl. No. 14/559,234, 22 pages.
Office Action, dated Nov. 22, 2017, regarding U.S. Appl. No. 14/559,234, 25 pages.
Office Action, dated Nov. 17, 2017, regarding U.S. Appl. No. 14/559,277, 73 pages.
Office Action, dated Nov. 16, 2016, regarding U.S. Appl. No. 14/559,303, 48 pages.
Office Action, dated Jun. 30, 2017, regarding U.S. Appl. No. 14/559,303, 25 pages.
Office Action, dated Jan. 18, 2017, regarding U.S. Appl. No. 14/559,371, 46 pages.
Final Office Action, dated May 16, 2017, regarding U.S. Appl. No. 14/559,371, 27 pages.
Notice of Allowance, dated Sep. 6, 2017, regarding U.S. Appl. No. 14/559,371, 20 pages.
Office Action, dated Jun. 30, 2017, regarding U.S. Appl. No. 14/559,483, 42 pages.
Notice of Allowance, dated Nov. 22, 2017, regarding U.S. Appl. No. 12/559,483, 17 pages.
Office Action, dated Apr. 5, 2017, regarding U.S. Appl. No. 14/559,518, 64 pages.
Final Office Action, dated Aug. 28, 2017, regarding U.S. Appl. No. 14/559,518, 29 pages.
Final Office Action, dated Jun. 7, 2018, regarding U.S. Appl. No. 14/559,277, 29 pages.
Final Office Action, dated Jun. 15, 2018, regarding U.S. Appl. No. 14/559,073, 11 pages.
Final Office Action, dated Jun. 20, 2018, regarding U.S. Appl. No. 14/559,234, 30 pages.
Tower, "Vise," U.S. Pat. No. 530,733, patented Dec. 11, 1894, 3 pages.
Dobson, "Sheet Metal Joint," U.S. Pat. No. 819,866, patented May 8, 1906, 2 pages.
European Patent Office Communication Report, dated Jul. 12, 2018, regarding application No. 14196544.2, 3 pages.
China National Intellectual Property Administration Second Notification of Office Action with English Translation, dated Dec. 3, 2018, regarding Application No. 201510389151.5, 9 pages.
Notice of Allowance, dated Sep. 20, 2018, regarding U.S. Appl. No. 14/559,191, 30 pages.
Notice of Allowance, dated Sep. 27, 2018, regarding U.S. Appl. No. 14/559,518, 37 pages.
Office Action, dated Nov. 29, 2018, regarding U.S. Appl. No. 14/559,277, 26 pages.
Japanese Patent Office Notice of Reasons for Rejection with English Translation, dated Apr. 15, 2019, regarding Application No. 2015-118130, 8 pages.
Japanese Patent Office Notice of Reasons for Rejection with English Translation, dated Apr. 22, 2019, regarding Application No. 2015-119170, 21 pages.
China National Intellectual Property Administration 3rd Notification of Office Action with English Translation, dated May 7, 2019, regarding Application No. 201510389151.5, 9 pages.
Japanese Patent Office Notice of Reasons for Rejection with English Translation, dated May 13, 2019, regarding Application No. 2015-118132, 9 pages.
Final Office Action, dated Apr. 29, 2019 regarding U.S. Appl. No. 14/559,073, 43 pages.
Oberoi et al., "Towers for Accessing an Interior of a Fuselage Assembly," U.S. Appl. No. 16/563,156, filed Sep. 6, 2019, 160 pages.
Japanese Patent Office Notice of Reasons for Rejection with English Translation, dated Jun. 17, 2019, regarding Application No. 2015-119172, 13 pages.
Japanese Patent Office Notice of Reasons for Rejection with English Translation, dated Jun. 24, 2019, regarding Application No. 2015-119176, 12 pages.
Final Office Action, dated Jul. 30, 2019, regarding U.S. Appl. No. 14/559,073, 19 pages.
Japanese Office Action with English Translation, dated Nov. 25, 2019, regarding Application No. 2015-118130, 8 pages.
Chinese Decision of Rejection, dated Nov. 5, 2019 and English Translation, regarding Application No. 201510370020.2, 22 pages.
Office Action, dated Nov. 5, 2019, regarding U.S. Appl. No. 16/031,196, 59 pages.
Office Action, dated Nov. 5, 2019, regarding U.S. Appl. No. 14/559,277, 26 pages.
Office Action, dated Dec. 10, 2019, regarding U.S. Appl. No. 15/864,427, 79 pages.
Japanese Office Action with English Translation, dated Jan. 20, 2020, regarding Application No. 2015-119176, 89 pages.
Office Action, dated Feb. 6, 2020, regarding U.S. Appl. No. 16/102,466, 61 pages.
Japanese Office Action and Decision to Reject with English translation, dated Apr. 27, 2020 regarding Application No. JP2015-118130, 8 pages.
The Korean Intellectual Property Office, Notice of Office Action, regarding Korean Application No. 10-2015-0097066, dated Sep. 2, 2021, 15 pages.
Chinese Office Action with English translation, dated Mar. 10, 2022, regarding Application No. 201811406606.X, 17 pages.
Chinese Office Action with English translation, dated Mar. 22, 2022, regarding Application No. 21910379080.9, 13 pages.

\* cited by examiner

AUTONOMOUS FLEXIBLE MANUFACTURING SYSTEM FOR BUILDING A FUSELAGE

This application is a divisional of U.S. patent application Ser. No. 16/284,417, filed Feb. 25, 2019, and issued as U.S. Pat. No. 11,724,305 B2 on Aug. 15, 2023, which is a divisional of U.S. patent application Ser. No. 14/559,518, filed Dec. 3, 2014, now U.S. Pat. No. 10,213,823, which claims the benefit of U.S. Provisional Patent Application Ser. No. 62/022,641, filed Jul. 9, 2014, and entitled "Automated Flexible Manufacturing System for Building a Fuselage", the disclosures of which are incorporated by reference herein in their entirety.

CROSS-REFERENCE TO RELATED APPLICATIONS

This application is related to the following patent applications: entitled "Mobile Platforms for Performing Operations Along an Exterior of a Fuselage Assembly," application Ser. No. 14/558,933, now U.S. Pat. No. 9,505,051, issued Nov. 29, 2016; entitled "Mobile Platforms for Performing Operations Inside a Fuselage Assembly," application Ser. No. 14/559,073, now U.S. Pat. No. 10,960,458 issued Mar. 30, 2021; entitled "Wheel Mounting System," application Ser. No. 14/559,115, now U.S. Pat. No. 9,782,822 issued Oct. 10, 2017; entitled "Dual-Interface Coupler," application Ser. No. 14/559,153, now U.S. Pat. No. 10,525,524 issued Jan. 7, 2020; entitled "Metrology-Based System for Operating a Flexible Manufacturing System," application Ser. No. 14/559,855, now U.S. Pat. No. 10,046,381 issued Aug. 14, 2018; entitled "Clamping Feet for an End Effector," application Ser. No. 14/559,191, now U.S. Pat. No. 10,201,847 issued Feb. 12, 2019; entitled "Towers for Accessing an Interior of a Fuselage Assembly," application Ser. No. 14/559,234, now U.S. Pat. No. 10,406,593 issued Sep. 20, 2019; entitled "Assembly Fixture for Supporting a Fuselage Assembly," application Ser. No. 14/559,277, now U.S. Pat. No. 10,825,947 issued Nov. 17, 2020; entitled "Adjustable Retaining Structure for a Cradle Fixture," application Ser. No. 14/559,303, now U.S. Pat. No. 10,835,984 issued Nov. 17, 2020; entitled "Utility Fixture for Creating a Distributed Utility Network," application Ser. No. 14/559,371, now U.S. Pat. No. 9,895,741 issued Feb. 20, 2018; and entitled "Two-Stage Riveting," application Ser. No. 14/559,483, now U.S. Pat. No. 9,937,549 issued Apr. 10, 2018, all filed of even date herewith, each of which claims the benefit of U.S. Provisional Patent Application. No. 62/022,641, filed Jul. 9, 2014 and entitled "Automated Flexible Manufacturing System for Building a Fuselage," each assigned to the same assignee, and each incorporated herein by reference in its entirety.

BACKGROUND INFORMATION

1. Field

The present disclosure relates generally to aircraft and, in particular, to building the fuselage of an aircraft. Still more particularly, the present disclosure relates to a method, apparatus, and system for autonomously building a fuselage assembly for an aircraft.

2. Background

Building a fuselage may include assembling skin panels and a support structure for the fuselage. The skin panels and support structure may be joined together to form a fuselage assembly. For example, without limitation, the skin panels may have support members, such as frames and stringers, attached to the surface of the skin panels that will face the interior of the fuselage assembly. These support members may be used to form the support structure for the fuselage assembly. The skin panels may be positioned relative to each other and the support members may be tied together to form this support structure.

Fastening operations may then be performed to join the skin panels and the support members together to form the fuselage assembly. These fastening operations may include, for example, riveting operations, interference-fit bolting operations, other types of attachment operations, or some combination thereof. The fuselage assembly may need to be assembled in a manner that meets outer mold line (OML) requirements and inner mold line (IML) requirements for the fuselage assembly.

With some currently available methods for building a fuselage assembly, the fastening operations performed to assemble the skin panels and the support members together may be performed manually. For example, without limitation, a first human operator positioned at an exterior of the fuselage assembly and a second human operator positioned at an interior of the fuselage assembly may use handheld tools to perform these fastening operations. In some cases, this type of manual fastening process may be more labor-intensive, time-consuming, ergonomically challenging, or expensive than desired. Further, some current assembly methods used to build fuselages that involve manual fastening processes may not allow fuselages to be built in the desired assembly facilities or factories at desired assembly rates or desired assembly costs.

In some cases, the current assembly methods and systems used to build fuselages may require that these fuselages be built in facilities or factories specifically designated and permanently configured for building fuselages. These current assembly methods and systems may be unable to accommodate different types and shapes of fuselages. For example, without limitation, large and heavy equipment needed for building fuselages may be permanently affixed to a factory and configured for use solely with fuselages of a specific type. Therefore, it would be desirable to have a method and apparatus that take into account at least some of the issues discussed above, as well as other possible issues.

SUMMARY

In one illustrative embodiment, a method for building a fuselage assembly for an aircraft may be provided. A number of fixtures may be driven across a floor to an assembly area to form an assembly fixture. The fuselage assembly may be built on the assembly fixture. In another illustrative embodiment, a flexible manufacturing system may comprise a drivable tower and a number of drivable fixtures that are autonomously coupleable to the tower.

In yet another illustrative embodiment, a flexible manufacturing system may comprise an assembly fixture and an autonomous panel joining system. The assembly fixture may be comprised of a number of drivable cradle fixtures. The autonomous panel joining system may join a plurality of panels together on the assembly fixture.

In another illustrative embodiment, a method for establishing a distributed utility network may be provided. A tower may be driven across a floor into a selected tower position relative to a utility fixture. A number of utilities may be coupled between the tower and the utility fixture to establish the distributed utility network.

In yet another illustrative embodiment, a distributed utility network may comprise a utility fixture and a drivable mobile system. The utility fixture may be fixedly associated with an assembly area. The drivable mobile system may be coupled to the utility fixture such that a number of utilities is distributed from the utility fixture to the drivable mobile system.

In still another illustrative embodiment, a flexible manufacturing system may comprise a utility fixture, a drivable tower, and a number of drivable cradle fixtures. The drivable tower may be autonomously coupleable with the utility fixture. The number of drivable cradle fixtures may be autonomously coupleable in series to the tower.

In another illustrative embodiment, a method for building a fuselage assembly may be provided. A tower may be autonomously driven into a selected tower position relative to a utility fixture. The tower may be coupled to the utility fixture autonomously to enable a number of utilities to flow from the utility fixture to the tower. A number of cradle fixtures may be autonomously driven into a number of selected cradle positions relative to the tower to build an assembly fixture. The number of cradle fixtures may be coupled to the tower in series autonomously to enable a number of utilities to flow downstream from the tower to each of the number of cradle fixtures. A plurality of panels may be engaged for the fuselage assembly with the assembly fixture. The plurality of panels may be temporarily connected to each other to hold the plurality of panels in place relative to each other. The plurality of panels may be joined together to build the fuselage assembly using an autonomous tooling system while the fuselage assembly is being supported by the assembly fixture.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
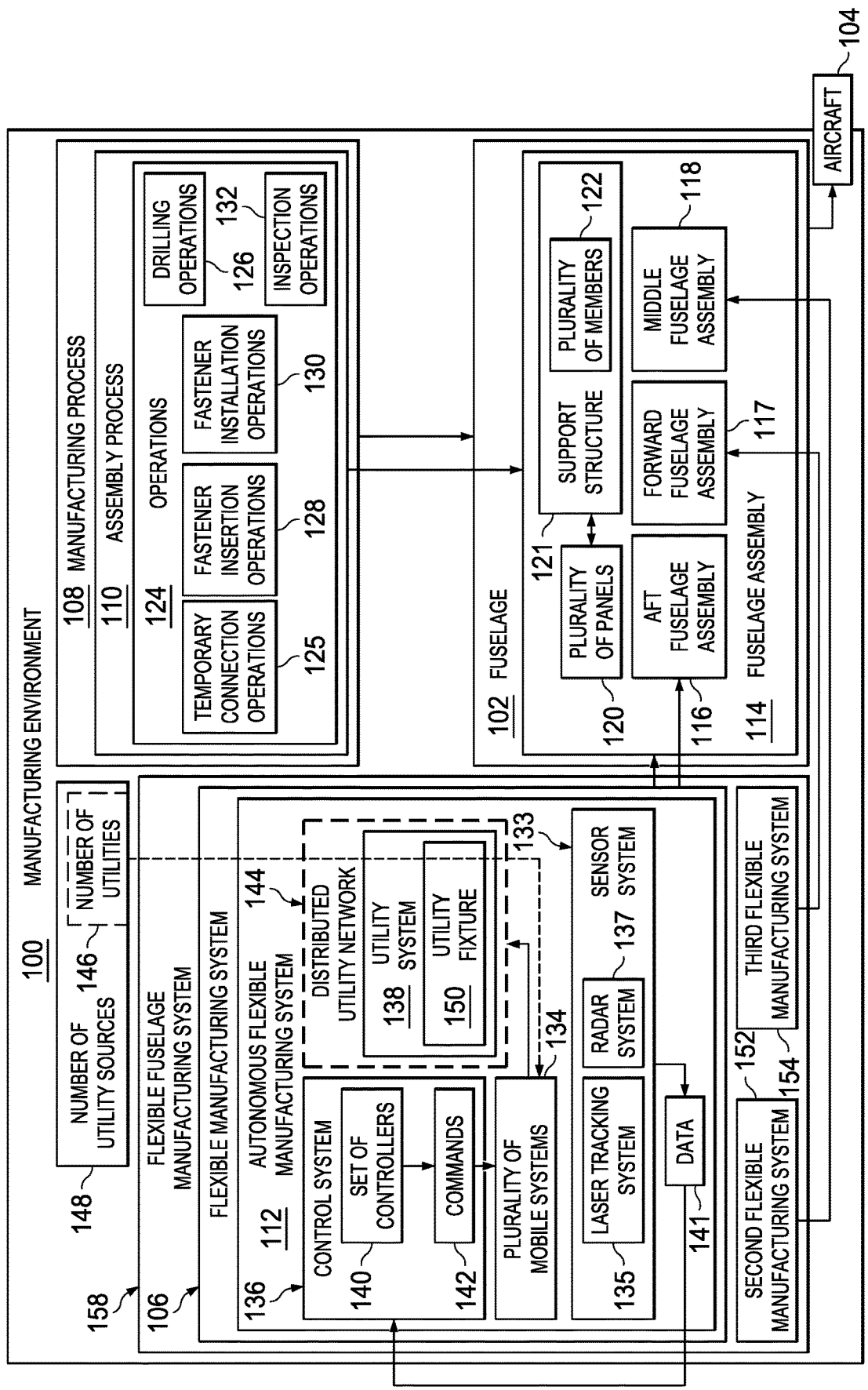
FIG. 1 is an illustration of a manufacturing environment in the form of a block diagram in accordance with an illustrative embodiment.

The illustrative embodiments recognize and take into account different considerations. For example, the illustrative embodiments recognize and take into account that it may be desirable to automate the process of building a fuselage assembly for an aircraft. Automating the process of building a fuselage assembly for an aircraft may improve build efficiency, improve build quality, and reduce costs associated with building the fuselage assembly. The illustrative embodiments also recognize and take into account that automating the process of building a fuselage assembly may improve the accuracy and precision with which assembly operations are performed, thereby ensuring improved compliance with outer mold line (OML) requirements and inner mold line (IML) requirements for the fuselage assembly.

Further, the illustrative embodiments recognize and take into account that automating the process used to build a fuselage assembly for an aircraft may significantly reduce the amount of time needed for the build cycle. For example, without limitation, automating fastening operations may reduce and, in some cases, eliminate, the need for human operators to perform these fastening operations as well as other types of assembly operations.

Further, this type of automation of the process for building a fuselage assembly for an aircraft may be less labor-intensive, time-consuming, ergonomically challenging, and expensive than performing this process primarily manually. Reduced manual labor may have a desired benefit for the human laborer. Additionally, automating the fuselage assembly process may allow fuselage assemblies to be built in desired assembly facilities and factories at desired assembly rates and desired assembly costs.

The illustrative embodiments also recognize and take into account that it may be desirable to use equipment that can be autonomously driven and operated to automate the process of building a fuselage assembly. In particular, it may be desirable to have an autonomous flexible manufacturing system comprised of mobile systems that may be autonomously driven across a factory floor, autonomously positioned relative to the factory floor as needed for building the fuselage assembly, autonomously operated to build the fuselage assembly, and then autonomously driven away when building of the fuselage assembly has been completed.

As used herein, performing any operation, action, or step autonomously may mean performing that operation substantially without any human input. For example, without limitation, a platform that may be autonomously driven is a platform that may be driven substantially independently of any human input. In this manner, an autonomously drivable platform may be a platform that is capable of driving or being driven substantially independently of human input.

Thus, the illustrative embodiments provide a method, apparatus, and system for building a fuselage assembly for an aircraft. In particular, the illustrative embodiments provide an autonomous flexible manufacturing system that automates most, if not all, of the process of building a fuselage assembly. For example, without limitation, the autonomous flexible manufacturing system may automate the process of installing fasteners to join fuselage skin panels and a fuselage support structure together to build the fuselage assembly.

However, the illustrative embodiments recognize and take into account that automating the process for building a fuselage assembly using an autonomous flexible manufacturing system may present unique technical challenges that require unique technical solutions. For example, the illustrative embodiments recognize and take into account that it may be desirable to provide utilities to all of the various systems within the autonomous flexible manufacturing system. In particular, it may be desirable to provide these utilities in a manner that will not disrupt or delay the process of building the fuselage assembly or restrict the movement of various mobile systems within the autonomous flexible manufacturing system over a factory floor.

For example, without limitation, it may be desirable to provide a set of utilities, such as power, communications, and air, to the autonomous flexible manufacturing system using an infrastructure that includes only a single direct connection to each of a set of utility sources providing the set of utilities. These direct connections may be above-ground, in-ground, or embedded. These direct connections may be established using, for example, without limitation, a utility fixture. Thus, the infrastructure may include a utility fixture that provides a direct connection to each of the set of utility sources and an assembly area with a floor space sufficiently large to allow the various systems of an autonomous flexible manufacturing system to be coupled to the utility fixture and each other in series. In this manner, the set of utilities may flow from the set of utility sources to the utility fixture and then downstream to the various systems of the autonomous flexible manufacturing system within the assembly area.

Thus, the illustrative embodiments provide a distributed utility network that may be used to provide utilities to the various systems of the autonomous flexible manufacturing system. The distributed utility network may provide these utilities in a manner that does not restrict or impede movement of the various mobile systems of the autonomous flexible manufacturing system. The different mobile systems of the autonomous flexible manufacturing system may be autonomously coupled to each other to create this distributed utility network.

Referring now to the figures and, in particular, with reference to FIGS. 1-5, illustrations of a manufacturing environment are depicted in the form of block diagrams in accordance with an illustrative embodiment. In particular, in FIGS. 1-5, a fuselage assembly, a flexible manufacturing system, the various systems within the flexible manufacturing system that may be used to build the fuselage assembly, and a distributed utility network are described.

Turning now to FIG. 1, an illustration of a manufacturing environment is depicted in the form of a block diagram in accordance with an illustrative embodiment. In this illustrative example, manufacturing environment 100 may be an example of one environment in which at least a portion of fuselage 102 may be manufactured for aircraft 104.

Manufacturing environment 100 may take a number of different forms. For example, without limitation, manufacturing environment 100 may take the form of a factory, a manufacturing facility, an outdoor factory area, an enclosed manufacturing area, an offshore platform, or some other type of manufacturing environment 100 suitable for building at least a portion of fuselage 102.

Fuselage 102 may be built using manufacturing process 108. Flexible manufacturing system 106 may be used to implement at least a portion of manufacturing process 108. In one illustrative example, manufacturing process 108 may be substantially automated using flexible manufacturing system 106. In other illustrative examples, only one or more stages of manufacturing process 108 may be substantially automated.

Flexible manufacturing system 106 may be configured to perform at least a portion of manufacturing process 108 autonomously. In this manner, flexible manufacturing system 106 may be referred to as autonomous flexible manufacturing system 112. In other illustrative examples, flexible manufacturing system 106 may be referred to as an automated flexible manufacturing system.

As depicted, manufacturing process 108 may include assembly process 110 for building fuselage assembly 114. Flexible manufacturing system 106 may be configured to perform at least a portion of assembly process 110 autonomously.

Fuselage assembly 114 may be fuselage 102 at any stage during manufacturing process 108 prior to the completion of manufacturing process 108. In some cases, fuselage assembly 114 may be used to refer to a partially assembled fuselage 102. Depending on the implementation, one or more other components may need to be attached to fuselage assembly 114 to fully complete the assembly of fuselage 102. In other cases, fuselage assembly 114 may be used to refer to the fully assembled fuselage 102. Flexible manufacturing system 106 may build fuselage assembly 114 up to the point needed to move fuselage assembly 114 to a next stage in the manufacturing process for building aircraft 104. In some cases, at least a portion of flexible manufacturing system 106 may be used at one or more later stages in the manufacturing process for building aircraft 104.

In one illustrative example, fuselage assembly 114 may be an assembly for forming a particular section of fuselage 102. As one example, fuselage assembly 114 may take the form of aft fuselage assembly 116 for forming an aft section of fuselage 102. In another example, fuselage assembly 114 may take the form of forward fuselage assembly 117 for forming a forward section of fuselage 102. In yet another example, fuselage assembly 114 may take the form of middle fuselage assembly 118 for forming a center section of fuselage 102 or some other middle section of fuselage 102 between the aft and forward sections of fuselage 102.

As depicted, fuselage assembly 114 may include plurality of panels 120 and support structure 121. Support structure 121 may be comprised of plurality of members 122. Plurality of members 122 may be used to both support plurality of panels 120 and connect plurality of panels 120 to each other. Support structure 121 may help provide strength, stiffness, and load support for fuselage assembly 114.

Plurality of members 122 may be associated with plurality of panels 120. As used herein, when one component or structure is "associated" with another component or structure, the association is a physical association in the depicted examples.

For example, a first component, such as one of plurality of members 122, may be considered to be associated with a second component, such as one of plurality of panels 120, by being at least one of secured to the second component, bonded to the second component, mounted to the second component, attached to the component, coupled to the component, welded to the second component, fastened to the second component, adhered to the second component, glued to the second component, or connected to the second component in some other suitable manner. The first component also may be connected to the second component using one or more other components. For example, the first component may be connected to the second component using a third component. Further, the first component may be considered to be associated with the second component by being formed as part of the second component, an extension of the second component, or both. In another example, the first component may be considered part of the second component by being co-cured with the second component.

As used herein, the phrase "at least one of," when used with a list of items, means different combinations of one or more of the listed items may be used and only one of the items in the list may be needed. The item may be a particular object, thing, action, process, or category. In other words, "at least one of" means any combination of items or number of items may be used from the list, but not all of the items in the list may be required.

For example, "at least one of item A, item B, and item C" or "at least one of item A, item B, or item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In these illustrative examples, a member of plurality of members 122 may be associated with at least one of plurality of panels 120 in a number of different ways. For example, without limitation, a member of plurality of members 122 may be attached directly to a single panel, attached to two or more panels, attached to another member that is directly attached to at least one panel, attached to at least one member that is directly or indirectly attached to at least one panel, or associated with at least one of plurality of panels 120 in some other way.

In one illustrative example, substantially all or all of plurality of members 122 may be associated with plurality of panels 120 prior to the beginning of assembly process 110 for building fuselage assembly 114. For example, a corresponding portion of plurality of members 122 may be associated with each panel of plurality of panels 120 prior to plurality of panels 120 being joined to each other through assembly process 110.

In another illustrative example, only a first portion of plurality of members 122 may be associated with plurality of panels 120 prior to the beginning of assembly process 110. Assembly process 110 may include attaching a remaining portion of plurality of members 122 to plurality of panels 120 for at least one of providing support to plurality of panels 120 or connecting plurality of panels 120 together. The first portion of plurality of members 122 attached to plurality of panels 120 prior to assembly process 110 and the remaining portion of plurality of members 122 attached to plurality of panels 120 during assembly process 110 may together form support structure 121.

In yet another illustrative example, all of plurality of members 122 may be associated with plurality of panels 120 during assembly process 110. For example, each of plurality of panels 120 may be "naked" without any members attached to or otherwise associated with the panel prior to assembly process 110. During assembly process 110, plurality of members 122 may then be associated with plurality of panels 120.

In this manner, support structure 121 for fuselage assembly 114 may be built up in a number of different ways. Fuselage assembly 114 comprising plurality of panels 120 and support structure 121 is described in greater detail in FIG. 2 below.

Building fuselage assembly 114 may include joining plurality of panels 120 together. Joining plurality of panels 120 may be performed in a number of different ways. Depending on the implementation, joining plurality of panels 120 together may include joining one or more of plurality of members 122 to one or more of plurality of panels 120 or to other members of plurality of members 122.

In particular, joining plurality of panels 120 may include joining at least one panel to at least one other panel, joining at least one member to at least one other member, or joining at least one member to at least one panel, or some combination thereof. As one illustrative example, joining a first panel and a second panel together may include at least one of the following: fastening the first panel directly to the second panel, joining a first member associated with the first panel to a second member associated with the second panel, joining a member associated with the first panel directly to the second panel, joining one member associated with both the first panel and the second panel to another member, joining a selected member to both the first panel and the second panel, or some other type of joining operation.

Assembly process 110 may include operations 124 that may be performed to join plurality of panels 120 together to build fuselage assembly 114. In this illustrative example, flexible manufacturing system 106 may be used to perform at least a portion of operations 124 autonomously.

Operations 124 may include, for example, but are not limited to, temporary connection operations 125, drilling operations 126, fastener insertion operations 128, fastener installation operations 130, inspection operations 132, other types of assembly operations, or some combination thereof. Temporary connection operations 125 may be performed to temporarily connect plurality of panels 120 together. For example, without limitation, temporary connection operations 125 may include temporarily tacking plurality of panels 120 together using tack fasteners.

Drilling operations 126 may include drilling holes through one or more of plurality of panels 120 and, in some cases, through one or more of plurality of members 122. Fastener insertion operations 128 may include inserting fasteners into the holes drilled by drilling operations 126.

Fastener installation operations 130 may include fully installing each of the fasteners that have been inserted into the holes. Fastener installation operations 130 may include, for example, without limitation, riveting operations, interference-fit bolting operations, other types of fastener installation operations, or some combination thereof. Inspection operations 132 may include inspecting the fully installed fasteners. Depending on the implementation, flexible manufacturing system 106 may be used to perform any number of these different types of operations 124 substantially autonomously.

As depicted, flexible manufacturing system 106 may include plurality of mobile systems 134, control system 136, and utility system 138. Each of plurality of mobile systems 134 may be a drivable mobile system. In some cases, each of plurality of mobile systems 134 may be an autonomously drivable mobile system. For example, without limitation, each of plurality of mobile systems 134 may include one or more components that may be autonomously driven within manufacturing environment 100 from one location to another location. Plurality of mobile systems 134 are described in greater detail in FIG. 3 below.

In this illustrative example, control system 136 may be used to control the operation of flexible manufacturing system 106. For example, without limitation, control system 136 may be used to control plurality of mobile systems 134. In particular, control system 136 may be used to direct the movement of each of plurality of mobile systems 134 within manufacturing environment 100. Control system 136 may be at least partially associated with plurality of mobile systems 134.

In one illustrative example, control system 136 may include set of controllers 140. As used herein, a "set of" items may include one or more items. In this manner, set of controllers 140 may include one or more controllers.

Each of set of controllers 140 may be implemented using hardware, firmware, software, or some combination thereof. In one illustrative example, set of controllers 140 may be associated with plurality of mobile systems 134. For example, without limitation, one or more of set of controllers 140 may be implemented as part of plurality of mobile systems 134. In other examples, one or more of set of controllers 140 may be implemented independently of plurality of mobile systems 134.

Set of controllers 140 may generate commands 142 to control the operation of plurality of mobile systems 134 of flexible manufacturing system 106. Set of controllers 140 may communicate with plurality of mobile systems 134 using at least one of a wireless communications link, a wired communications link, an optical communications link, or other type of communications link. In this manner, any number of different types of communications links may be used for communication with and between set of controllers 140.

In these illustrative examples, control system 136 may control the operation of plurality of mobile systems 134 using data 141 received from sensor system 133. Sensor system 133 may be comprised of any number of individual sensor systems, sensor devices, controllers, other types of components, or combination thereof. In one illustrative example, sensor system 133 may include laser tracking system 135 and radar system 137. Laser tracking system 135 may be comprised of any number of laser tracking devices, laser targets, or combination thereof. Radar system 137 may be comprised of any number of radar sensors, radar targets, or combination thereof.

Sensor system 133 may be used to coordinate the movement and operation of the various mobile systems in plurality of mobile systems 134 within manufacturing environment 100. As one illustrative example, radar system 137 may be used for macro-positioning mobile systems, systems within mobile systems, components within mobile systems, or some combination thereof. Further, laser tracking system 135 may be used for micro-positioning mobile systems, systems within mobile systems, components within mobile systems, or some combination thereof.

Plurality of mobile systems 134 may be used to form distributed utility network 144. Depending on the implementation, one or more of plurality of mobile systems 134 may form distributed utility network 144. Number of utilities 146 may flow from number of utility sources 148 to the various mobile systems of plurality of mobile systems 134 that make up distributed utility network 144.

In this illustrative example, each of number of utility sources 148 may be located with manufacturing environment 100. In other illustrative examples, one or more of number of utility sources 148 may be located outside of manufacturing environment 100. The corresponding utility provided by these one or more utility sources may then be carried into manufacturing environment 100 using, for example, without limitation, one or more utility cables.

In one illustrative example, distributed utility network 144 may allow number of utilities 146 to flow directly from number of utility sources 148 to one mobile system in plurality of mobile systems 134 over some number of utility cables. This one mobile system may then distribute number of utilities 146 to other mobile systems of plurality of mobile systems 134 such that these other mobile systems do not need to directly receive number of utilities 146 from number of utility sources 148.

As depicted, distributed utility network 144 may be formed using utility system 138. Utility system 138 may include utility fixture 150. Utility system 138 may be configured to connect to number of utility sources 148 such that number of utilities 146 may flow from number of utility sources 148 to utility fixture 150. Utility fixture 150 may be above-ground or in-ground, depending on the implementation. For example, without limitation, utility fixture 150 may be embedded in a floor within manufacturing environment 100.

Utility fixture 150 may then distribute number of utilities 146 to one or more of plurality of mobile systems 134. In particular, one autonomous coupling of one of plurality of mobile systems 134 to utility fixture 150 may be followed by any number of autonomous couplings of mobile systems to each other in series to form distributed utility network 144. Utility fixture 150 may distribute number of utilities 146 to each of plurality of mobile systems 134 downstream of utility fixture 150 in the series of autonomous couplings of the mobile systems.

Depending on the implementation, distributed utility network 144 may have a chain-like configuration or a tree-like configuration. In one illustrative example, plurality of mobile systems 134 may include mobile systems A, B, C, and D (not shown in figure) with mobile system A autonomously coupled to utility fixture 150 and mobile systems B, C, and D autonomously coupled to mobile system A and each other in series. An example of a chain-like configuration for distributed utility network 144 may include number of utilities 146 flowing from number of utility sources 148 over some number of utility cables to utility fixture 150, from utility fixture 150 to mobile system A, from mobile system A to mobile system B, from mobile system B to mobile system C, and from mobile system C to mobile system D. An example of a tree-like configuration for distributed utility network 144 may include number of utilities 146 flowing from number of utility sources 148 over some number of utility cables to utility fixture 150, from utility fixture 150 to mobile system A, from mobile system A to both mobile system B and mobile system C, and from mobile system C to mobile system D. An example of one manner in which distributed utility network 144 may be implemented using plurality of mobile systems 134 is described in greater detail in FIG. 5 below.

In some illustrative examples, multiple flexible manufacturing systems may be used to build multiple fuselage assemblies concurrently. For example, flexible manufacturing system 106 may be a first flexible manufacturing system of many flexible manufacturing systems.

In one illustrative example, flexible manufacturing system 106, second flexible manufacturing system 152, and third flexible manufacturing system 154 may be used to build aft fuselage assembly 116, middle fuselage assembly 118, and forward fuselage assembly 117, respectively. Aft fuselage assembly 116, middle fuselage assembly 118, and forward fuselage assembly 117 may then be joined together to form a fully assembled fuselage 102. In this manner, in this example, flexible manufacturing system 106, second flexible manufacturing system 152, and third flexible manufacturing system 154 may together form flexible fuselage manufacturing system 158.

Thus, any number of fuselage assemblies, such as fuselage assembly 114, may be built within manufacturing environment 100 using any number of flexible manufacturing systems implemented in a manner similar to flexible manufacturing system 106. Similarly, any number of full fuselages, such as fuselage 102, may be built within manufacturing environment 100 using any number of flexible fuselage manufacturing systems implemented in a manner similar to flexible fuselage manufacturing system 158.

Figure 2:
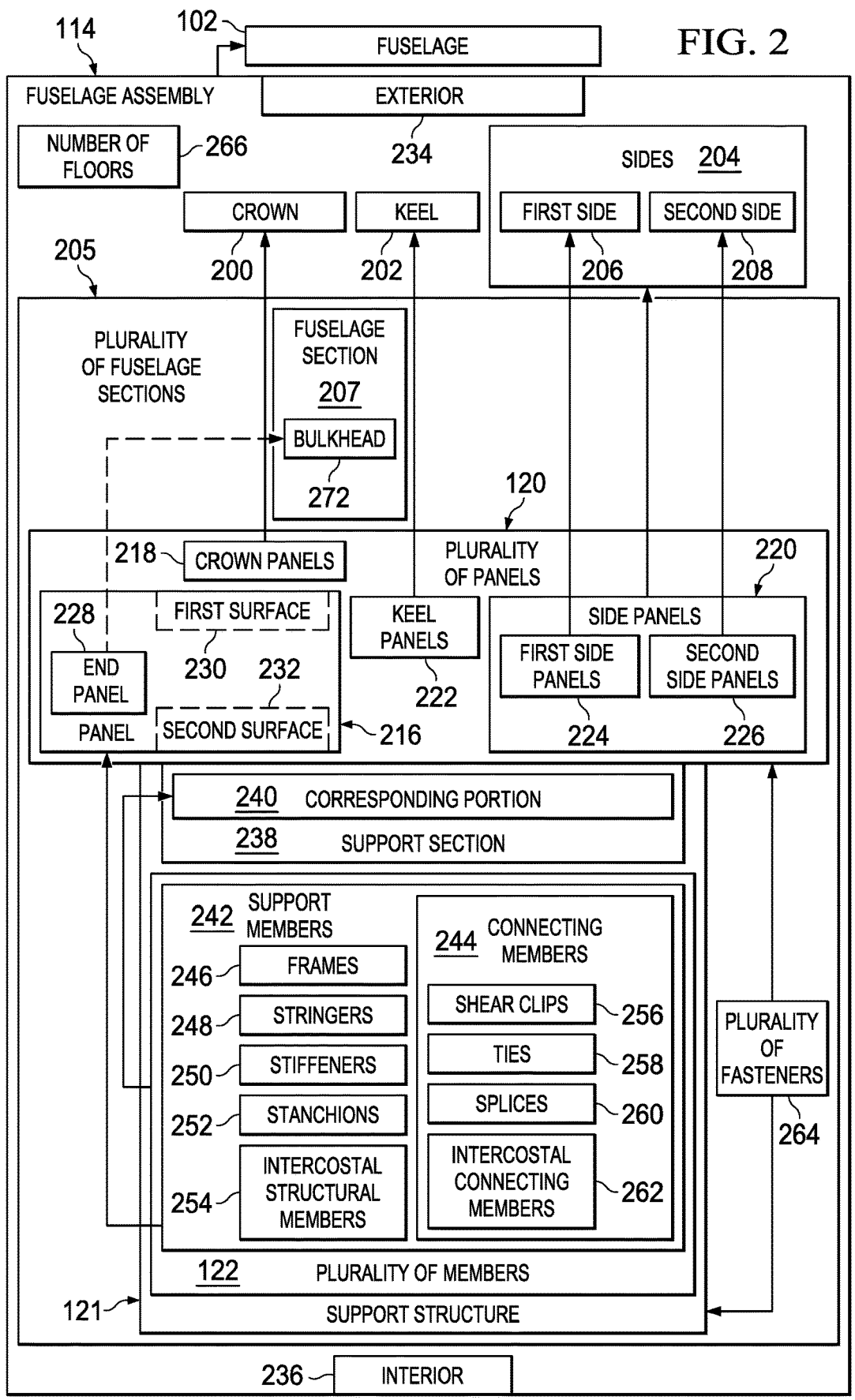
FIG. 2 is an illustration of a fuselage assembly in the form of a block diagram in accordance with an illustrative embodiment.

With reference now to FIG. 2, an illustration of fuselage assembly 114 from FIG. 1 is depicted in the form of a block diagram in accordance with an illustrative embodiment. As described above, fuselage assembly 114 may include plurality of panels 120 and support structure 121. Fuselage assembly 114 may be used to refer to any stage in the building of fuselage assembly 114. For example, fuselage assembly 114 may be used to refer to a single one of plurality of panels 120, multiple ones of plurality of panels 120 that have been or are being joined together, a partially built fuselage assembly, or a fully built fuselage assembly.

As depicted, fuselage assembly 114 may be built such that fuselage assembly 114 has plurality of fuselage sections 205. Each of plurality of fuselage sections 205 may include one or more of plurality of panels 120. In this illustrative example, each of plurality of fuselage sections 205 may take the form of a cylindrically-shaped fuselage section, a barrel-shaped fuselage section, a tapered cylindrical fuselage section, a cone-shaped fuselage section, a dome-shaped fuselage section, or a section having some other type of shape. Depending on the implementation, a fuselage section of plurality of fuselage sections 205 may have a shape that has a substantially circular cross-sectional shape, elliptical cross-sectional shape, oval cross-sectional shape, polygon with rounded corners cross-sectional shape, or otherwise closed-curve cross-sectional shape.

As one specific illustrative example, each of plurality of fuselage sections 205 may be a portion of fuselage assembly 114 defined between two radial cross-sections of fuselage assembly 114 that are taken substantially perpendicular to a center axis or longitudinal axis through fuselage assembly 114. In this manner, plurality of fuselage sections 205 may be arranged along the longitudinal axis of fuselage assembly 114. In other words, plurality of fuselage sections 205 may be arranged longitudinally.

Fuselage section 207 may be an example of one of plurality of fuselage sections 205. Fuselage section 207 may be comprised of one or more of plurality of panels 120. In one illustrative example, multiple panel sections may be arranged circumferentially around fuselage section 207 to form the skin of fuselage section 207. In some cases, multiple rows of two or more longitudinally adjacent panels may be arranged circumferentially around fuselage section 207 to form the skin of fuselage section 207.

In one illustrative example, fuselage assembly 114 may have crown 200, keel 202, and sides 204. Sides 204 may include first side 206 and second side 208.

Crown 200 may be the top portion of fuselage assembly 114. Keel 202 may be the bottom portion of fuselage assembly 114. Sides 204 of fuselage assembly 114 may be the portions of fuselage assembly 114 between crown 200 and keel 202. In one illustrative example, each of crown 200, keel 202, first side 206, and second side 208 of fuselage assembly 114 may be formed by at least a portion of at least one of plurality of panels 120. Further, a portion of each of plurality of fuselage sections 205 may form each of crown 200, keel 202, first side 206, and second side 208.

Panel 216 may be an example of one of plurality of panels 120. Panel 216 may also be referred to as a skin panel, a fuselage panel, or a fuselage skin panel, depending on the implementation. In some illustrative examples, panel 216 may take the form of a mega-panel comprised of multiple smaller panels, which may be referred to as sub-panels. A mega-panel may also be referred to as a super panel. In these illustrative examples, panel 216 may be comprised of at least one of a metal, a metal alloy, some other type of metallic material, a composite material, or some other type of material. As one illustrative example, panel 216 may be comprised of an aluminum alloy, steel, titanium, a ceramic material, a composite material, some other type of material, or some combination thereof.

When used to form keel 202 of fuselage assembly 114, panel 216 may be referred to as a keel panel or a bottom panel. When used to form one of sides 204 of fuselage assembly 114, panel 216 may be referred to as a side panel. When used to form crown 200 of fuselage assembly 114, panel 216 may be referred to as a crown panel or a top panel. As one illustrative example, plurality of panels 120 may include crown panels 218 for forming crown 200, side panels 220 for forming sides 204, and keel panels 222 for forming keel 202. Side panels 220 may include first side panels 224 for forming first side 206 and second side panels 226 for forming second side 208.

In one illustrative example, fuselage section 207 of plurality of fuselage sections 205 of fuselage assembly 114 may include one of crown panels 218, two of side panels 220, and one of keel panels 222. In another illustrative example, fuselage section 207 may form an end of fuselage assembly 114.

In some cases, fuselage section 207 may be comprised solely of a single panel, such as panel 216. For example, without limitation, panel 216 may take the form of end panel 228.

End panel 228 may be used to form one end of fuselage assembly 114. For example, when fuselage assembly 114 takes the form of aft fuselage assembly 116 in FIG. 1, end panel 228 may form the aftmost end of fuselage assembly 114. When fuselage assembly 114 takes the form of forward fuselage assembly 117 in FIG. 1, end panel 228 may form the forwardmost end of fuselage assembly 114.

In one illustrative example, end panel 228 may take the form of a cylindrically-shaped panel, a cone-shaped panel, a barrel-shaped panel, or a tapered cylindrical panel. For example, end panel 228 may be a single cylindrically-shaped panel having a substantially circular cross-sectional shape that may change in diameter with respect to a center axis for fuselage assembly 114.

In this manner, as described above, fuselage section 207 may be comprised solely of end panel 228. In some illustrative examples, fuselage section 207 may be an end fuselage section that is comprised of only a single panel, which may be end panel 228. In some cases, bulkhead 272 may be associated with end panel 228 when fuselage section 207 is an end fuselage section. Bulkhead 272, which may also be referred to as a pressure bulkhead, may be considered separate from or part of end panel 228, depending on the implementation. Bulkhead 272 may have a dome-type shape in these illustrative examples.

When fuselage assembly 114 takes the form of aft fuselage assembly 116 in FIG. 1, bulkhead 272 may be part of fuselage section 207 located at the aftmost end of aft fuselage assembly 116. When fuselage assembly 114 takes the form of forward fuselage assembly 117 in FIG. 1, bulkhead 272 may be part of fuselage section 207 located at forwardmost end of aft fuselage assembly 116. Middle fuselage assembly 118 in FIG. 1 may not include a bulkhead, such as bulkhead 272, at either end of middle fuselage assembly 118. In this manner, plurality of fuselage sections 205 may be implemented in any number of different ways.

Panel 216 may have first surface 230 and second surface 232. First surface 230 may be configured for use as an exterior-facing surface. In other words, first surface 230 may be used to form exterior 234 of fuselage assembly 114. Second surface 232 may be configured for use as an interior-facing surface. In other words, second surface 232 may be used to form interior 236 of fuselage assembly 114. Each of plurality of panels 120 may be implemented in a manner similar to panel 216.

As described earlier, support structure 121 may be associated with a corresponding one of plurality of panels 120. Support structure 121 may be comprised of plurality of members 122 that are associated with panel 216. In one illustrative example, corresponding portion 240 may be the portion of plurality of members 122 that correspond to panel 216. Corresponding portion 240 may form support section 238 corresponding to panel 216. Support section 238 may form a part of support structure 121.

Plurality of members 122 may include support members 242. Support members 242 may include, for example, without limitation, at least one of connecting members 244, frames 246, stringers 248, stiffeners 250, stanchions 252, intercostal structural members 254, or other types of structural members.

Connecting members 244 may connect other types of support members 242 together. In some cases, connecting members 244 may also connect support members 242 to plurality of panels 120. Connecting members 244 may include, for example, without limitation, shear clips 256, ties 258, splices 260, intercostal connecting members 262, other types of mechanical connecting members, or some combination thereof.

In one illustrative example, when panel 216 is comprised of multiple sub-panels, connecting members 244 may be used to, for example, without limitation, connect together complementary frames of frames 246 running in the hoop-wise direction on adjacent sub-panels and complementary stringers of stringers 248 running in the longitudinal direction on adjacent sub-panels. In other illustrative examples, connecting members 244 may be used to connect together complementary frames, stringers, or other types of support members on two or more adjacent panels in plurality of panels 120. In some cases, connecting members 244 may be used to connect together complementary support members on two or more adjacent fuselage sections.

Operations 124, as described in FIG. 1, may be performed to join plurality of panels 120 together to build fuselage assembly 114. In one illustrative example, plurality of fasteners 264 may be used to join plurality of panels 120 together.

As described above, joining plurality of panels 120 together may be performed in a number of different ways. Joining plurality of panels 120 together may include at least one of joining at least one panel in plurality of panels 120 to another one of plurality of panels 120, joining at least one panel in plurality of panels 120 to at least one of plurality of members 122, joining at least one member in plurality of members 122 to another one of plurality of members 122, or some other type of joining operation. Plurality of panels 120 may be joined together such that plurality of members 122 ultimately form support structure 121 for fuselage assembly 114.

As depicted, number of floors 266 may be associated with fuselage assembly 114. In this illustrative example, number of floors 266 may be part of fuselage assembly 114. Number of floors 266 may include, for example, without limitation, at least one of a passenger floor, a cargo floor, or some other type of floor.

Figure 3:
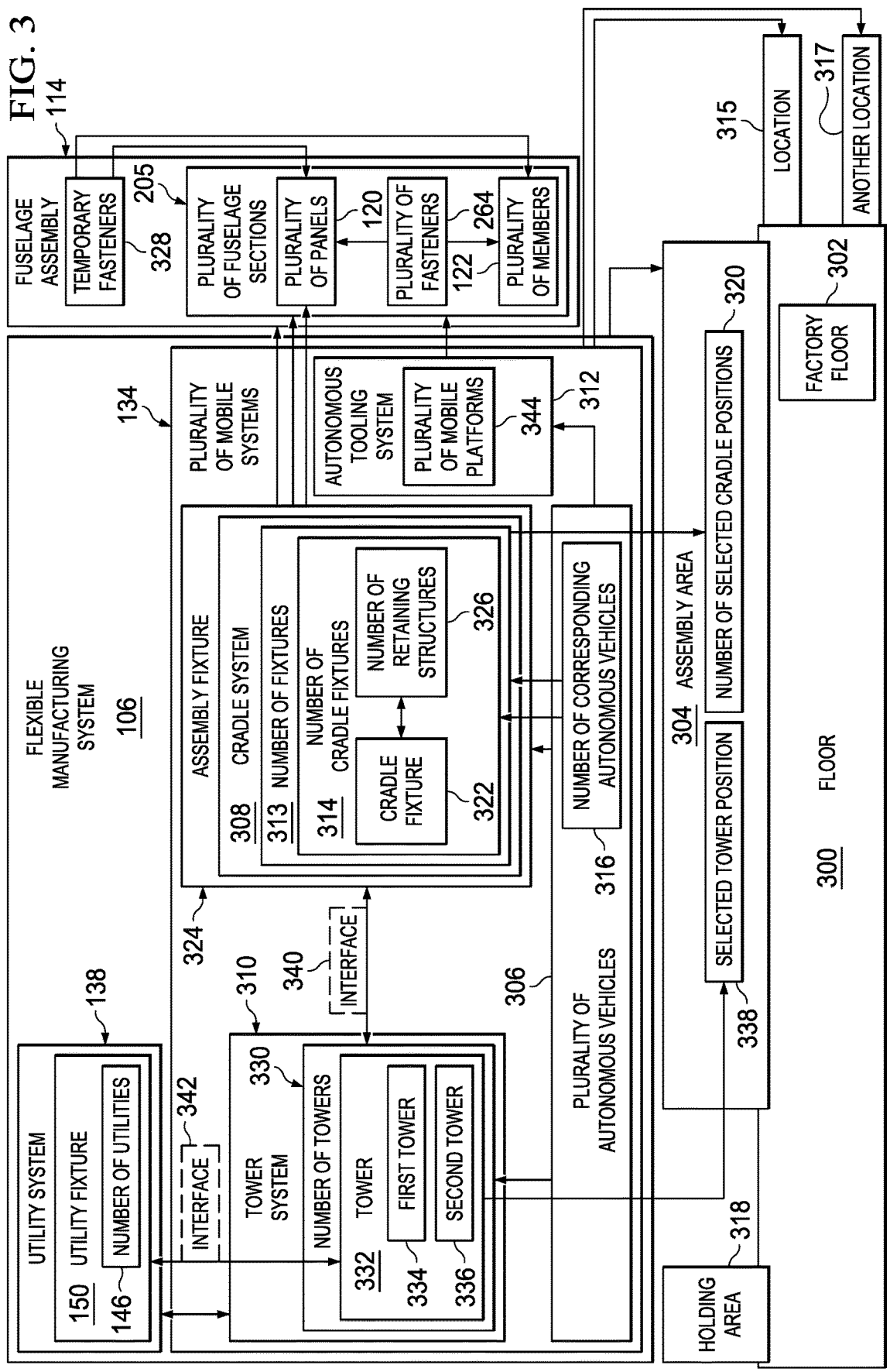
FIG. 3 is an illustration of a plurality of mobile systems of a flexible manufacturing system within a manufacturing environment in the form of a block diagram in accordance with an illustrative embodiment.

With reference now to FIG. 3, an illustration of plurality of mobile systems 134 of flexible manufacturing system 106 within manufacturing environment 100 from FIG. 1 is depicted in the form of a block diagram in accordance with an illustrative embodiment. As depicted, flexible manufacturing system 106 may be used to build fuselage assembly 114 on floor 300 of manufacturing environment 100. When manufacturing environment 100 takes the form of a factory, floor 300 may be referred to as factory floor 302.

In one illustrative example, floor 300 may be substantially smooth and substantially planar. For example, floor 300 may be substantially level. In other illustrative examples, one or more portions of floor 300 may be sloped, ramped, or otherwise uneven.

Assembly area 304 may be an area within manufacturing environment 100 designated for performing assembly process 110 in FIG. 1 to build a fuselage assembly, such as fuselage assembly 114. Assembly area 304 may also be referred to as a cell or a work cell. In this illustrative example, assembly area 304 may be a designated area on floor 300. However, in other illustrative examples, assembly area 304 may include a designated area on floor 300 as well as the area above this designated area. Any number of assembly areas may be present within manufacturing environment 100 such that any number of fuselage assemblies may be built concurrently within manufacturing environment 100.

As depicted, plurality of mobile systems 134 may include plurality of autonomous vehicles 306, cradle system 308, tower system 310, and autonomous tooling system 312. Each of plurality of mobile systems 134 may be drivable across floor 300. In other words, each of plurality of mobile systems 134 may be capable of being autonomously driven across floor 300 from one location 315 to another location 317 on floor 300.

In one illustrative example, each of plurality of autonomous vehicles 306 may take the form of an automated guided vehicle (AGV), which may be capable of operating independently without human direction or guidance. In some cases, plurality of autonomous vehicles 306 may be referred to as a plurality of automated guided vehicles (AGVs).

In this illustrative example, cradle system 308 may be used to support and hold fuselage assembly 114 during assembly process 110 in FIG. 1. In some cases, cradle system 308 may be referred to as a drivable cradle system. In still other cases, cradle system 308 may be referred to as an autonomously drivable cradle system.

Cradle system 308 may include number of fixtures 313. As used herein, a "number of" items may include one or more items. In this manner, number of fixtures 313 may include one or more fixtures. In some illustrative examples, number of fixtures 313 may be referred to as a number of drivable fixtures. In other illustrative examples, number of fixtures 313 may be referred to as a number of autonomously drivable fixtures.

Number of fixtures 313 may include number of cradle fixtures 314. In some illustrative examples, number of cradle fixtures 314 may be referred to as a number of drivable cradle fixtures. In other illustrative examples, number of cradle fixtures 314 may be referred to as a number of autonomously drivable cradle fixtures. Cradle fixture 322 may be an example of one of number of cradle fixtures 314.

Number of retaining structures 326 may be associated with each of number of cradle fixtures 314. Number of retaining structures 326 associated with each of number of cradle fixtures 314 may be engaged with and used to support fuselage assembly 114. For example, number of retaining structures 326 associated with cradle fixture 322 may be engaged with and used to support one or more of plurality of panels 120.

Number of cradle fixtures 314 may be autonomously driven across floor 300 of manufacturing environment 100 to assembly area 304. In one illustrative example, each of number of cradle fixtures 314 may be autonomously driven across floor 300 using a corresponding one of plurality of autonomous vehicles 306. In other words, without limitation, number of corresponding autonomous vehicles 316 in plurality of autonomous vehicles 306 may be used to drive number of cradle fixtures 314 across floor 300 into assembly area 304.

In this illustrative example, number of corresponding autonomous vehicles 316 may drive from, for example, without limitation, holding area 318, across floor 300, to assembly area 304. Holding area 318 may be an area in which at least one of plurality of autonomous vehicles 306, cradle system 308, tower system 310, autonomous tooling system 312, or control system 136 from FIG. 1 may be held when flexible manufacturing system 106 is not in use or when that particular device or system is not in use.

Holding area 318 may be referred to as a home area, a storage area, or a base area, depending on the implementation. Although holding area 318 is depicted as being located within manufacturing environment 100, holding area 318 may be located in some other area or environment outside of manufacturing environment 100 in other illustrative examples.

Number of corresponding autonomous vehicles 316 in plurality of autonomous vehicles 306 may drive number of cradle fixtures 314 into number of selected cradle positions 320. As used herein, a "position" may be comprised of a location, an orientation, or both. The location may be in two-dimensional coordinates or three-dimensional coordinates with respect to a reference coordinate system. The orientation may be a two-dimensional or three-dimensional orientation with respect to a reference coordinate system. This reference coordinate system may be, for example, without limitation, a fuselage coordinate system, an aircraft coordinate system, a coordinate system for manufacturing environment 100, or some other type of coordinate system.

When number of cradle fixtures 314 includes more than one cradle fixture such that number of selected cradle positions 320 includes more than one cradle position, these cradle positions may be positions selected relative to each other. In this manner, number of cradle fixtures 314 may be positioned such that number of cradle fixtures 314 are in number of selected cradle positions 320 relative to each other.

In these illustrative examples, number of corresponding autonomous vehicles 316 may be used to drive number of cradle fixtures 314 into number of selected cradle positions 320 within assembly area 304. "Driving" a component or a system across floor 300 may mean, for example, but not limited to, moving substantially the entirety of that component or system from one location to another location. For example, without limitation, driving cradle fixture 322 across floor 300 may mean moving the entirety of cradle fixture 322 from one location to another location. In other words, all or substantially all components that comprise cradle fixture 322 may be simultaneously moved together from one location to another location.

Once number of cradle fixtures 314 has been driven into number of selected cradle positions 320 in assembly area 304, number of cradle fixtures 314 may be coupled to each other and to tower system 310. Number of corresponding autonomous vehicles 316 may then drive away from number of cradle fixtures 314 to, for example, without limitation, holding area 318, once number of cradle fixtures 314 is positioned in number of selected cradle positions 320 within selected tolerances. In other illustrative examples, number of corresponding autonomous vehicles 316 may be comprised of a single autonomous vehicle that is used to drive each of number of cradle fixtures 314 into a corresponding selected position in number of selected cradle positions 320 within assembly area 304 one at a time.

In assembly area 304, number of cradle fixtures 314 may be configured to form assembly fixture 324. Assembly fixture 324 may be formed when the different cradle fixtures in number of cradle fixtures 314 have been placed in number of selected cradle positions 320 relative to each other. In some cases, assembly fixture 324 may be formed when number of cradle fixtures 314 have been coupled to each other while number of cradle fixtures 314 is in number of selected cradle positions 320 and when number of retaining structures 326 associated with each of number of cradle fixtures 314 has been adjusted to receive fuselage assembly 114.

In this manner, number of cradle fixtures 314 may form a single fixture entity, such as assembly fixture 324. Assembly fixture 324 may be used to support and hold fuselage assembly 114. In some cases, assembly fixture 324 may be referred to as an assembly fixture system or a fixture system. In some cases, assembly fixture 324 may be referred to as a drivable assembly fixture. In other cases, assembly fixture 324 may be referred to as an autonomously drivable assembly fixture.

Once assembly fixture 324 has been formed, number of cradle fixtures 314 may receive fuselage assembly 114. In other words, plurality of fuselage sections 205 may be engaged with number of cradle fixtures 314. In particular, plurality of fuselage sections 205 may be engaged with number of retaining structures 326 associated with each of number of cradle fixtures 314. Plurality of fuselage sections 205 may be engaged with number of cradle fixtures 314 in any number of ways.

When number of cradle fixtures 314 includes a single cradle fixture, that cradle fixture may be used to support and hold substantially the entire fuselage assembly 114. When number of cradle fixtures 314 includes multiple cradle fixtures, each of these cradle fixtures may be used to support and hold at least one corresponding fuselage section of plurality of fuselage sections 205.

In one illustrative example, each of plurality of fuselage sections 205 may be engaged with number of cradle fixtures 314 one at a time. For example, without limitation, all of the panels for a particular fuselage section in plurality of fuselage sections 205 may be positioned relative to each other and a corresponding cradle fixture in number of cradle fixtures 314 and then engaged with the corresponding cradle fixture. The remaining fuselage sections in plurality of fuselage sections 205 may then be formed and engaged with number of cradle fixtures 314 in a similar manner. In this manner, plurality of panels 120 may be engaged with number of cradle fixtures 314 by engaging at least a portion of plurality of panels 120 with number of retaining structures 326 associated with each of number of cradle fixtures 314 that makes up assembly fixture 324 such that plurality of panels 120 is supported by number of cradle fixtures 314.

As described in FIG. 2, plurality of panels 120 may include keel panels 222, side panels 220, and crown panels 218. In one illustrative example, all of keel panels 222 in FIG. 2 used to form keel 202 of fuselage assembly 114 in FIG. 2 may first be positioned relative to and engaged with number of cradle fixtures 314. Next, all of side panels 220 in FIG. 2 used to form sides 204 of fuselage assembly 114 in FIG. 2 may be positioned relative to and engaged with keel panels 222. Then, all of crown panels 218 in FIG. 2 used to form crown 200 of fuselage assembly 114 in FIG. 2 may be positioned relative to and engaged with side panels 220. In this manner, plurality of fuselage sections 205 may be concurrently assembled to form fuselage assembly 114.

In one illustrative example, each panel in plurality of panels 120 may have a corresponding portion of plurality of members 122 fully formed and associated with the panel prior to the panel being engaged with one of number of cradle fixtures 314. This corresponding portion of plurality of members 122 may be referred to as a support section. For example, support section 238 in FIG. 2 may be fully formed and associated with panel 216 in FIG. 2 prior to panel 216 being engaged with one of number of cradle fixtures 314 or another panel of plurality of panels 120 in FIG. 2. In other words, a corresponding portion of support members 242 in FIG. 2 may already be attached to panel 216 and a corresponding portion of connecting members 244 in FIG. 2 already installed to connect this portion of support members 242 to each other prior to panel 216 from FIG. 2 being engaged with one of number of cradle fixtures 314.

In other illustrative examples, plurality of members 122 may be associated with plurality of panels 120 after plurality of panels 120 have been engaged with each other and number of cradle fixtures 314. In still other illustrative examples, only a portion of plurality of members 122 may be associated with plurality of panels 120 prior to plurality of panels 120 being engaged with each other and number of cradle fixtures 314 and then a remaining portion of plurality of members 122 associated with plurality of panels 120 once plurality of panels 120 have been engaged with each other and number of cradle fixtures 314.

In some illustrative examples, one or more of support members 242 in FIG. 2, one or more of connecting members 244 in FIG. 2, or both may not be associated with panel 216 when panel 216 from FIG. 2 is engaged with one of number of cradle fixtures 314 or with one of the other panels in plurality of panels 120. For example, without limitation, frames 246 described in FIG. 2 may be added to panel 216 from FIG. 2 after panel 216 has been engaged with cradle fixture 322. In another example, stiffeners 250 described in FIG. 2 may be added to panel 216 from FIG. 2 after panel 216 has been engaged with cradle fixture 322.

Building fuselage assembly 114 may include engaging plurality of panels 120 with each other as plurality of panels 120 are built up on number of cradle fixtures 314 of assembly fixture 324. For example, adjacent panels in plurality of panels 120 may be connected by connecting at least a portion of the support members associated with the panels. Depending on the implementation, at least one of lap splices, butt splices, or other types of splices may be used to connect the adjacent panels in addition to or in place of connecting the corresponding support members of the adjacent panels.

As one illustrative example, the support members associated with two adjacent panels in plurality of panels 120 may be connected together using connecting members, thereby connecting the two adjacent panels. The two support members associated with these two adjacent panels may be, for example, without limitation, spliced, tied, clipped, tacked, pinned, joined, or fastened together in some other manner. When the two adjacent panels are hoop-wise adjacent, complementary frames may be connected in the hoop-wise direction. When the two adjacent panels are longitudinally adjacent, complementary stringers may be connected in the longitudinal direction.

In some cases, connecting complementary stringers, frames, or other support members on these two adjacent panels may be part of splicing these panels together. Adjacent panels may be connected together using any number of panel splices, stringer splices, frame splices, or other types of splices.

In one illustrative example, plurality of panels 120 may be temporarily connected to each other by temporarily fastening at least one of plurality of panels 120 or plurality of members 122 together using temporary fasteners or permanent fasteners. For example, without limitation, temporary clamps may be used to temporarily connect and hold in place two of plurality of panels 120 together. Temporarily connecting plurality of panels 120 together may be performed by at least one of temporarily connecting at least two plurality of panels 120 together, temporarily connecting at least two plurality of members 122 together, or temporarily connecting at least one of plurality of panels 120 to at least one of plurality of members 122 such that plurality of members 122 associated with plurality of panels 120 forms support structure 121 in FIG. 2 for fuselage assembly 114.

As one illustrative example, plurality of panels 120 may be temporarily tacked or pinned together using temporary fasteners 328 until plurality of fasteners 264 are installed to join plurality of panels 120 together to form fuselage assembly 114. Temporarily connecting plurality of panels 120 may temporarily connect together plurality of fuselage sections 205 from FIG. 2 formed by plurality of panels 120. Once plurality of fasteners 264 have been installed, temporary fasteners 328 may then be removed.

In this manner, plurality of panels 120 may be connected together in a number of different ways. Once plurality of panels 120 have been connected together, plurality of members 122 may be considered as forming support structure 121 for fuselage assembly 114. Connecting plurality of panels 120 together and forming support structure 121 may maintain desired compliance with outer mold line requirements and inner mold line requirements for fuselage assembly 114. In other words, plurality of panels 120 may be held together in place relative to each other such that fuselage assembly 114 formed using plurality of panels 120 meets outer mold line requirements and inner mold line requirements for fuselage assembly 114 within selected tolerances.

In particular, assembly fixture 324 may support plurality of panels 120 and support structure 121 associated with plurality of panels 120 such that fuselage assembly 114 built using plurality of panels 120 and support structure 121 has a shape and a configuration that is within selected tolerances. In this manner, this shape and configuration may be maintained within selected tolerances while supporting plurality of panels 120 and plurality of members 122 associated with plurality of panels 120 during the building of fuselage assembly 114. This shape may be at least partially determined by, for example, without limitation, the outer mold line requirements and inner mold line requirements for fuselage assembly 114. In some cases, the shape may be at least partially determined by the location and orientation of the frames and stringers of fuselage assembly 114.

In some cases, when the assembly of plurality of panels 120 and support structure 121 that comprise fuselage assembly 114 has reached a desired point, number of corresponding autonomous vehicles 316 may drive assembly fixture 324 out of assembly area 304. For example, fuselage assembly 114 may be driven across floor 300 into a different area within manufacturing environment 100, from floor 300 onto another floor in a different manufacturing environment, or from floor 300 onto another floor in some other area or environment.

In one illustrative example, assembly fixture 324 may be driven to some other location at which another assembly fixture is located such that the two assembly fixtures may be coupled to form a larger assembly fixture. As one illustrative example, assembly fixture 324 may be used to hold and support aft fuselage assembly 116 in FIG. 1, while another assembly fixture implemented in a manner similar to assembly fixture 324 may be used to hold and support forward fuselage assembly 117 in FIG. 1. Yet another assembly fixture implemented in a manner similar to assembly fixture 324 may be used to hold and support middle fuselage assembly 118 in FIG. 1.

Once these three fuselage assemblies have been built, the three assembly fixtures may be brought together to form a larger assembly fixture for holding aft fuselage assembly 116, middle fuselage assembly 118, and forward fuselage assembly 117 such that these three fuselage assemblies may be joined to form fuselage 102 described in FIG. 1. In particular, this larger assembly fixture may hold aft fuselage assembly 116, middle fuselage assembly 118, and forward fuselage assembly 117 in alignment with each other such that fuselage 102 may be built within selected tolerances.

In another illustrative example, a first assembly fixture and a second assembly fixture implemented in a manner similar to assembly fixture 324 may be used to hold and support aft fuselage assembly 116 and forward fuselage assembly 117, respectively, from FIG. 1. Once these two fuselage assemblies have been built, the two assembly fixtures may then be brought together to form a larger assembly fixture for holding the two fuselage assemblies such that these fuselage assemblies may be joined to form fuselage 102. The larger assembly fixture may hold aft fuselage assembly 116 and forward fuselage assembly 117 in alignment with each other such that fuselage 102 may be built within selected tolerances.

As depicted, tower system 310 includes number of towers 330. Tower 332 may be an example of one implementation for one of number of towers 330. Tower 332 may be configured to provide access to interior 236 of fuselage assembly 114 described in FIG. 2. In some illustrative examples, tower 332 may be referred to as a drivable tower. In other illustrative examples, tower 332 may be referred to as an autonomously drivable tower.

In one illustrative example, tower 332 may take the form of first tower 334. First tower 334 may also be referred to as an operator tower in some cases. In another illustrative example, tower 332 may take the form of second tower 336. Second tower 336 may also be referred to as a robotics tower in some cases. In this manner, number of towers 330 may include both first tower 334 and second tower 336.

First tower 334 may be configured substantially for use by a human operator, whereas second tower 336 may be configured substantially for use by a mobile platform having at least one robotic device associated with the mobile platform. In other words, first tower 334 may allow a human operator to access and enter interior 236 of fuselage assembly 114.

Second tower 336 may allow a mobile platform to access and enter interior 236 of fuselage assembly 114.

First tower 334 and second tower 336 may be positioned relative to assembly fixture 324 at different times during assembly process 110. As one illustrative example, one of plurality of autonomous vehicles 306 may be used to move or autonomously drive first tower 334 from holding area 318 into selected tower position 338 within assembly area 304. Number of cradle fixtures 314 may then be autonomously driven, using number of corresponding autonomous vehicles 316, into number of selected cradle positions 320 relative to first tower 334, which is in selected tower position 338 within assembly area 304.

Second tower 336 may be exchanged for first tower 334 at some later stage during assembly process 110 in FIG. 1. For example, one of plurality of autonomous vehicles 306 may be used to autonomously drive first tower 334 out of assembly area 304 and back into holding area 318. The same autonomous vehicle or a different autonomous vehicle in plurality of autonomous vehicles 306 may then be used to autonomously drive second tower 336 from holding area 318 into selected tower position 338 within assembly area 304 that was previously occupied by first tower 334. Depending on the implementation, first tower 334 may be later exchanged for second tower 336.

In other illustrative examples, first tower 334 and second tower 336 may each have an autonomous vehicle in plurality of autonomous vehicles 306 fixedly associated with the tower. In other words, one of plurality of autonomous vehicles 306 may be integrated with first tower 334 and one of plurality of autonomous vehicles 306 may be integrated with second tower 336. For example, one of plurality of autonomous vehicles 306 may be considered part of or built into first tower 334. First tower 334 may then be considered capable of autonomously driving across floor 300. In a similar manner, one of plurality of autonomous vehicles 306 may be considered part of or built into second tower 336. Second tower 336 may then be considered capable of autonomously driving across floor 300.

Tower system 310 and assembly fixture 324 may be configured to form interface 340 with each other. Interface 340 may be a physical interface between tower system 310 and assembly fixture 324. Tower system 310 may also be configured to form interface 342 with utility system 138. In one illustrative example, interface 340 and interface 342 may be autonomously formed.

Interface 342 may be a physical interface between tower system 310 and utility system 138. In these illustrative examples, in addition to being physical interfaces, interface 340 and interface 342 may also be utility interfaces. For example, with respect to the utility of power, interface 340 and interface 342 may be considered electrical interfaces.

Utility system 138 is configured to distribute number of utilities 146 to tower system 310 when tower system 310 and utility system 138 are physically and electrically coupled through interface 342. Tower system 310 may then distribute number of utilities 146 to assembly fixture 324 formed by cradle system 308 when assembly fixture 324 and tower system 310 are physically and electrically coupled through interface 340. Number of utilities 146 may include at least one of power, air, hydraulic fluid, communications, water, or some other type of utility.

As depicted, utility system 138 may include utility fixture 150. Utility fixture 150 may be configured to receive number of utilities 146 from number of utility sources 148. Number of utility sources 148 may include, for example, without limitation, at least one of a power generator, a battery system, a water system, an electrical line, a communications system, a hydraulic fluid system, an air tank, or some other type of utility source. For example, utility fixture 150 may receive power from a power generator.

In one illustrative example, utility fixture 150 may be positioned relative to assembly area 304. Depending on the implementation, utility fixture 150 may be positioned inside assembly area 304 or outside of assembly area 304.

In some illustrative examples, utility fixture 150 may be associated with floor 300. Depending on the implementation, utility fixture 150 may be permanently associated with floor 300 or temporarily associated with floor 300. In other illustrative examples, utility fixture 150 may be associated with some other surface of manufacturing environment 100, such as a ceiling, or some other structure in manufacturing environment 100. In some cases, utility fixture 150 may be embedded within floor 300.

In one illustrative example, first tower 334 may be autonomously driven into selected tower position 338 with respect to floor 300 relative to utility fixture 150 such that interface 342 may be formed between first tower 334 and utility fixture 150. Once interface 342 has been formed, number of utilities 146 may flow from utility fixture 150 to first tower 334. Assembly fixture 324 may then autonomously form interface 340 with first tower 334 to form a network of utility cables between first tower 334 and assembly fixture 324. Once both interface 342 and interface 340 have been formed, number of utilities 146 received at utility fixture 150 may flow from utility fixture 150 to first tower 334 and to each of number of cradle fixtures 314 that forms assembly fixture 324. In this manner, first tower 334 may function as a conduit or "middleman" for distributing number of utilities 146 to assembly fixture 324.

When interface 340 has been formed between second tower 336 and assembly fixture 324 and interface 342 has been formed between second tower 336 and utility fixture 150, number of utilities 146 may be provided to second tower 336 and assembly fixture 324 in a similar manner as described above. Thus, utility fixture 150 may distribute number of utilities 146 to tower system 310 and assembly fixture 324 without tower system 310 and cradle assembly fixture 324 having to separately connect to number of utility sources 148 or any other utility sources.

Autonomous tooling system 312 may be used to assemble plurality of panels 120 and support structure 121 while fuselage assembly 114 is being supported and held by assembly fixture 324. Autonomous tooling system 312 may include plurality of mobile platforms 344. Each of plurality of mobile platforms 344 may be configured to perform one or more of operations 124 in assembly process 110 described in FIG. 1. In particular, plurality of mobile platforms 344 may be autonomously driven into selected positions relative to plurality of panels 120 within selected tolerances to autonomously perform operations 124 that join plurality of panels 120 together to build fuselage assembly 114. Plurality of mobile platforms 344 are described in greater detail in FIG. 4 below.

In this illustrative example, set of controllers 140 in control system 136 may generate commands 142 as described in FIG. 1 to control the operation of at least one of cradle system 308, tower system 310, utility system 138, autonomous tooling system 312, or plurality of autonomous vehicles 306. Set of controllers 140 in FIG. 1 may communicate with at least one of cradle system 308, tower system 310, utility system 138, autonomous tooling system 312, or plurality of autonomous vehicles 306 using any number of wireless communications links, wired communications links, optical communications links, other types of communications links, or combination thereof.

In this manner, plurality of mobile systems 134 of flexible manufacturing system 106 may be used to automate the process of building fuselage assembly 114. Plurality of mobile systems 134 may enable fuselage assembly 114 to be built substantially autonomously with respect to joining together plurality of panels 120 to reduce the overall time, effort, and human resources needed.

Flexible manufacturing system 106 may build fuselage assembly 114 up to the point needed to move fuselage assembly 114 to the next stage in manufacturing process 108 for building fuselage 102 or the next stage in the manufacturing process for building aircraft 104, depending on the implementation. In some cases, cradle system 308 in the form of assembly fixture 324 may continue carrying and supporting fuselage assembly 114 during one or more of these later stages in manufacturing process 108 for building fuselage 102 and aircraft 104.

Figure 4:
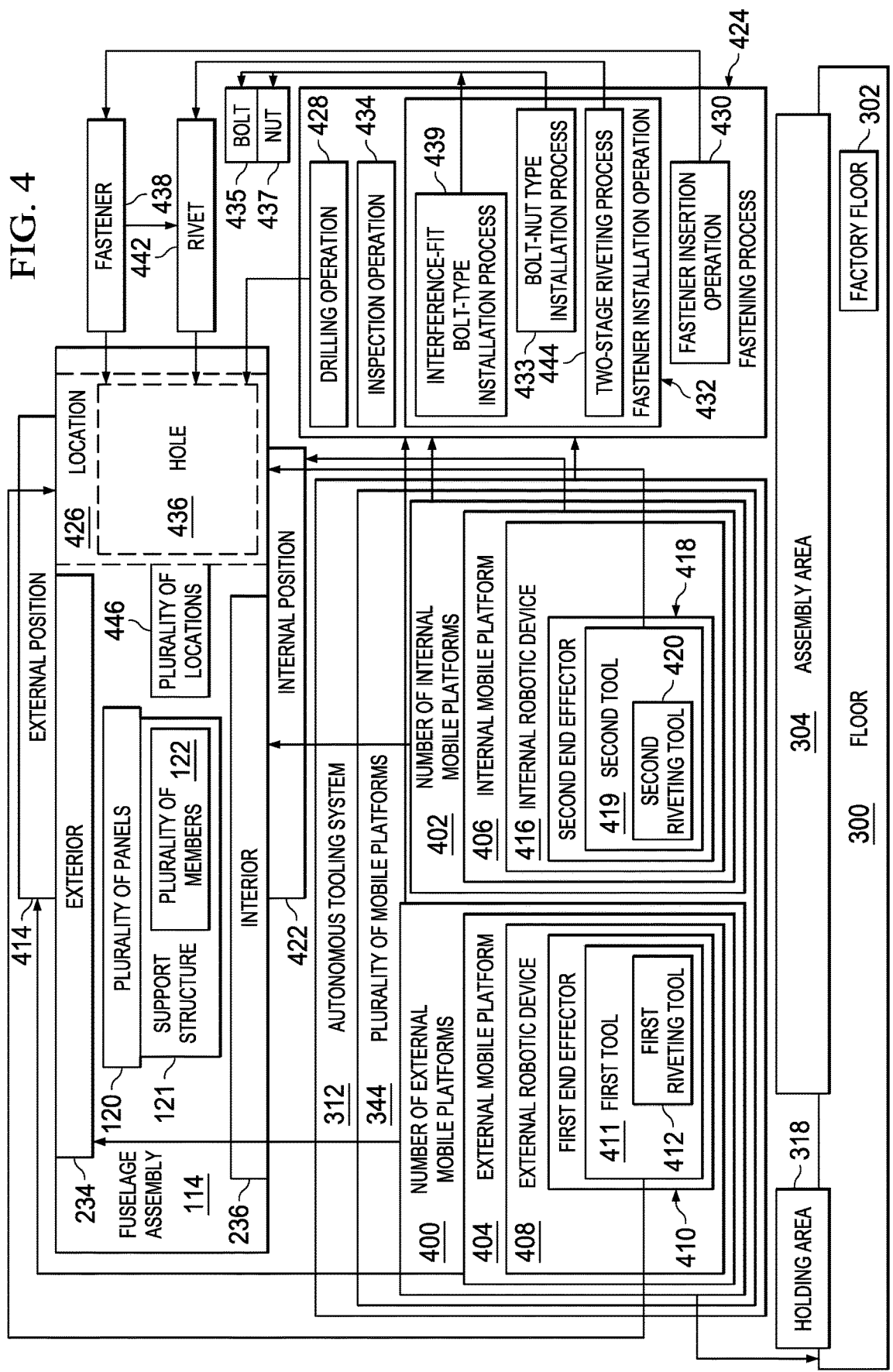
FIG. 4 is an illustration a plurality of mobile platforms in the form of a block diagram in accordance with an illustrative embodiment.

With reference now to FIG. 4, an illustration of plurality of mobile platforms 344 from FIG. 3 is depicted in the form of a block diagram in accordance with an illustrative embodiment. As depicted, plurality of mobile platforms 344 may include number of external mobile platforms 400 and number of internal mobile platforms 402. In this manner, plurality of mobile platforms 344 may include at least one external mobile platform and at least one internal mobile platform.

In some illustrative examples, number of external mobile platforms 400 may be referred to as a number of drivable external mobile platforms. Similarly, in some cases, number of internal mobile platforms 402 may be referred to as a number of drivable internal mobile platforms. In other illustrative examples, number of external mobile platforms 400 and number of internal mobile platforms 402 may be referred to as a number of autonomously drivable external mobile platforms and a number of autonomously drivable internal mobile platforms, respectively.

External mobile platform 404 may be an example of one of number of external mobile platforms 400 and internal mobile platform 406 may be an example of one of number of internal mobile platforms 402. External mobile platform 404 and internal mobile platform 406 may be platforms that are autonomously drivable. Depending on the implementation, each of external mobile platform 404 and internal mobile platform 406 may be configured to autonomously drive across floor 300 on its own or with the assistance of one of plurality of autonomous vehicles 306 from FIG. 3.

As one illustrative example, without limitation, external mobile platform 404 may be autonomously driven across floor 300 using a corresponding one of plurality of autonomous vehicles 306. In some illustrative examples, external mobile platform 404 and this corresponding one of plurality of autonomous vehicles 306 may be integrated with each other. For example, the autonomous vehicle may be fixedly associated with external mobile platform 404. An entire load of external mobile platform 404 may be transferable to the autonomous vehicle such that driving the autonomous vehicle across floor 300 drives external mobile platform 404 across floor 300.

External mobile platform 404 may be driven from, for example, without limitation, holding area 318 to a position relative to exterior 234 of fuselage assembly 114 to perform one or more operations 124 in FIG. 1. As depicted, at least one external robotic device 408 may be associated with external mobile platform 404. In this illustrative example, external robotic device 408 may be considered part of external mobile platform 404. In other illustrative examples, external robotic device 408 may be considered a separate component that is physically attached to external mobile platform 404. External robotic device 408 may take the form of, for example, without limitation, a robotic arm.

External robotic device 408 may have first end effector 410. Any number of tools may be associated with first end effector 410. These tools may include, for example, without limitation, at least one of a drilling tool, a fastener insertion tool, a fastener installation tool, an inspection tool, or some other type of tool. In particular, any number of fastening tools may be associated with first end effector 410.

As depicted, first tool 411 may be associated with first end effector 410. In one illustrative example, first tool 411 may be any tool that is removably associated with first end effector 410. In other words, first tool 411 associated with first end effector 410 may be changed as various operations need to be performed. For example, without limitation, first tool 411 may take the form of one type of tool, such as a drilling tool, to perform one type of operation. This tool may then be exchanged with another type of tool, such as a fastener insertion tool, to become the new first tool 411 associated with first end effector 410 to perform a different type of operation.

In one illustrative example, first tool 411 may take the form of first riveting tool 412. First riveting tool 412 may be used to perform riveting operations. In some illustrative examples, a number of different tools may be exchanged with first riveting tool 412 and associated with first end effector 410. For example, without limitation, first riveting tool 412 may be exchangeable with a drilling tool, a fastener insertion tool, a fastener installation tool, an inspection tool, or some other type of tool.

External mobile platform 404 may be autonomously driven across floor 300 and positioned relative to assembly fixture 324 in FIG. 3 supporting fuselage assembly 114 to position first end effector 410 and first tool 411 associated with first end effector 410 relative to one of plurality of panels 120. For example, external mobile platform 404 may be autonomously driven across floor 300 to external position 414 relative to assembly fixture 324. In this manner, first tool 411 carried by external mobile platform 404 may be macro-positioned using external mobile platform 404.

Once in external position 414, first end effector 410 may be autonomously controlled using at least external robotic device 408 to position first tool 411 associated with first end effector 410 relative to a particular location on an exterior-facing side of one of plurality of panels 120. In this manner, first tool 411 may be micro-positioned relative to the particular location.

Internal mobile platform 406 may be located on second tower 336 in FIG. 3 when internal mobile platform 406 is not in use. When interface 342 described in FIG. 3 is formed between second tower 336 and assembly fixture 324, internal mobile platform 406 may be driven from second tower 336 into interior 236 of fuselage assembly 114 and used to perform one or more of operations 124. In one illustrative example, internal mobile platform 406 may have a movement system that allows internal mobile platform 406 to move from second tower 336 onto a floor inside fuselage assembly 114.

At least one internal robotic device 416 may be associated with internal mobile platform 406. In this illustrative example, internal robotic device 416 may be considered part of internal mobile platform 406. In other illustrative examples, internal robotic device 416 may be considered a separate component that is physically attached to internal mobile platform 406. Internal robotic device 416 may take the form of, for example, without limitation, a robotic arm.

Internal robotic device 416 may have second end effector 418. Any number of tools may be associated with second end effector 418. For example, without limitation, at least one of a drilling tool, a fastener insertion tool, a fastener installation tool, an inspection tool, or some other type of tool may be associated with second end effector 418. In particular, any number of fastening tools may be associated with second end effector 418.

As depicted, second tool 419 may be associated with second end effector 418. In one illustrative example, second tool 419 may be any tool that is removably associated with second end effector 418. In other words, second tool 419 associated with second end effector 418 may be changed as various operations need to be performed. For example, without limitation, first tool 411 may take the form of one type of tool, such as a drilling tool, to perform one type of operation. This tool may then be exchanged with another type of tool, such as a fastener insertion tool, to become the new first tool 411 associated with first end effector 410 to perform a different type of operation.

In one illustrative example, second tool 419 may take the form of second riveting tool 420. Second riveting tool 420 may be associated with second end effector 418. Second riveting tool 420 may be used to perform riveting operations. In some illustrative examples, a number of different tools may be exchanged with second riveting tool 420 and associated with second end effector 418. For example, without limitation, second riveting tool 420 may be exchangeable with a drilling tool, a fastener insertion tool, a fastener installation tool, an inspection tool, or some other type of tool.

Internal mobile platform 406 may be driven from second tower 336 into fuselage assembly 114 and positioned relative to interior 236 of fuselage assembly 114 to position second end effector 418 and second tool 419 associated with second end effector 418 relative to one of plurality of panels 120. In one illustrative example, internal mobile platform 406 may be autonomously driven onto one of number of floors 266 in FIG. 2 into internal position 422 within fuselage assembly 114 relative to fuselage assembly 114. In this manner, second tool 419 may be macro-positioned into internal position 422 using internal mobile platform 406.

Once in internal position 422, second end effector 418 may be autonomously controlled to position second tool 419 associated with second end effector 418 relative to a particular location on an interior-facing side of one of plurality of panels 120 or an interior-facing side of one of plurality of members 122 in FIG. 2 that make up support structure 121. In this manner, second tool 419 may be micro-positioned relative to the particular location.

In one illustrative example, external position 414 for external mobile platform 404 and internal position 422 for internal mobile platform 406 may be selected such that fastening process 424 may be performed at location 426 on fuselage assembly 114 using external mobile platform 404 and internal mobile platform 406. Fastening process 424 may include any number of operations. In one illustrative example, fastening process 424 may include at least one of drilling operation 428, fastener insertion operation 430, fastener installation operation 432, inspection operation 434, or some other type of operation.

As one specific example, drilling operation 428 may be performed autonomously using first tool 411 associated with first end effector 410 of external mobile platform 404 or second tool 419 associated with second end effector 418 of internal mobile platform 406. For example, without limitation, first tool 411 or second tool 419 may take the form of a drilling tool for use in performing drilling operation 428. Drilling operation 428 may be autonomously performed using first tool 411 or second tool 419 to form hole 436 at location 426. Hole 436 may pass through at least one of two panels in plurality of panels 120, two members of a plurality of members 122, or a panel and one of plurality of members 122.

Fastener insertion operation 430 may be performed autonomously using first tool 411 associated with first end effector 410 of external mobile platform 404 or second tool 419 associated with second end effector 418 of internal mobile platform 406. Fastener insertion operation 430 may result in fastener 438 being inserted into hole 436.

Fastener installation operation 432 may then be performed autonomously using at least one of first tool 411 associated with first end effector 410 of external mobile platform 404 or second tool 419 associated with second end effector 418 of internal mobile platform 406. In one illustrative example, fastener installation operation 432 may be performed autonomously using first tool 411 in the form of first riveting tool 412 and second tool 419 in the form of second riveting tool 420 such that fastener 438 becomes rivet 442 installed at location 426. Rivet 442 may be a fully installed rivet. Rivet 442 may be one of plurality of fasteners 264 described in FIG. 2.

In one illustrative example, fastener installation operation 432 may take the form of bolt-nut type installation process 433. First tool 411 associated with first end effector 410 may be used to, for example, without limitation, install bolt 435 through hole 436. Second tool 419 associated with second end effector 418 may then be used to install nut 437 over bolt 435. In some cases, installing nut 437 may include applying a torque sufficient to nut 437 such that a portion of nut 437 breaks off. In these cases, nut 437 may be referred to as a frangible collar.

In another illustrative example, fastener installation operation 432 may take the form of interference-fit bolt-type installation process 439. First tool 411 associated with first end effector 410 may be used to, for example, without limitation, install bolt 435 through hole 436 such that an interference fit is created between bolt 435 and hole 436. Second tool 419 associated with second end effector 418 may then be used to install nut 437 over bolt 435.

In yet another illustrative example, fastener installation operation 432 may take the form of two-stage riveting process 444. Two-stage riveting process 444 may be performed using, for example, without limitation, first riveting tool 412 associated with external mobile platform 404 and second riveting tool 420 associated with internal mobile platform 406.

For example, first riveting tool 412 and second riveting tool 420 may be positioned relative to each other by external mobile platform 404 and internal mobile platform 406, respectively. For example, external mobile platform 404 and external robotic device 408 may be used to position first riveting tool 412 relative to location 426 at exterior 234 of fuselage assembly 114. Internal mobile platform 406 and internal robotic device 416 may be used to position second riveting tool 420 relative to the same location 426 at interior 236 of fuselage assembly 114.

First riveting tool 412 and second riveting tool 420 may then be used to perform two-stage riveting process 444 to form rivet 442 at location 426. Rivet 442 may join at least two of plurality of panels 120 together, a panel in plurality of panels 120 to support structure 121 formed by plurality of members 122, or two panels in plurality of panels 120 to support structure 121.

In this example, two-stage riveting process 444 may be performed at each of plurality of locations 446 on fuselage assembly 114 to install plurality of fasteners 264 as described in FIG. 2. Two-stage riveting process 444 may ensure that plurality of fasteners 264 in FIG. 2 are installed at plurality of locations 446 with a desired quality and desired level of accuracy.

In this manner, internal mobile platform 406 may be autonomously driven and operated inside fuselage assembly 114 to position internal mobile platform 406 and second riveting tool 420 associated with internal mobile platform 406 relative to plurality of locations 446 on fuselage assembly 114 for performing assembly process 110 described in FIG. 1. Similarly, external mobile platform 404 may be autonomously driven and operated around fuselage assembly 114 to position external mobile platform 404 and first riveting tool 412 associated with external mobile platform 404 relative to plurality of locations 446 on fuselage assembly 114 for performing operations 124.

Figure 5:
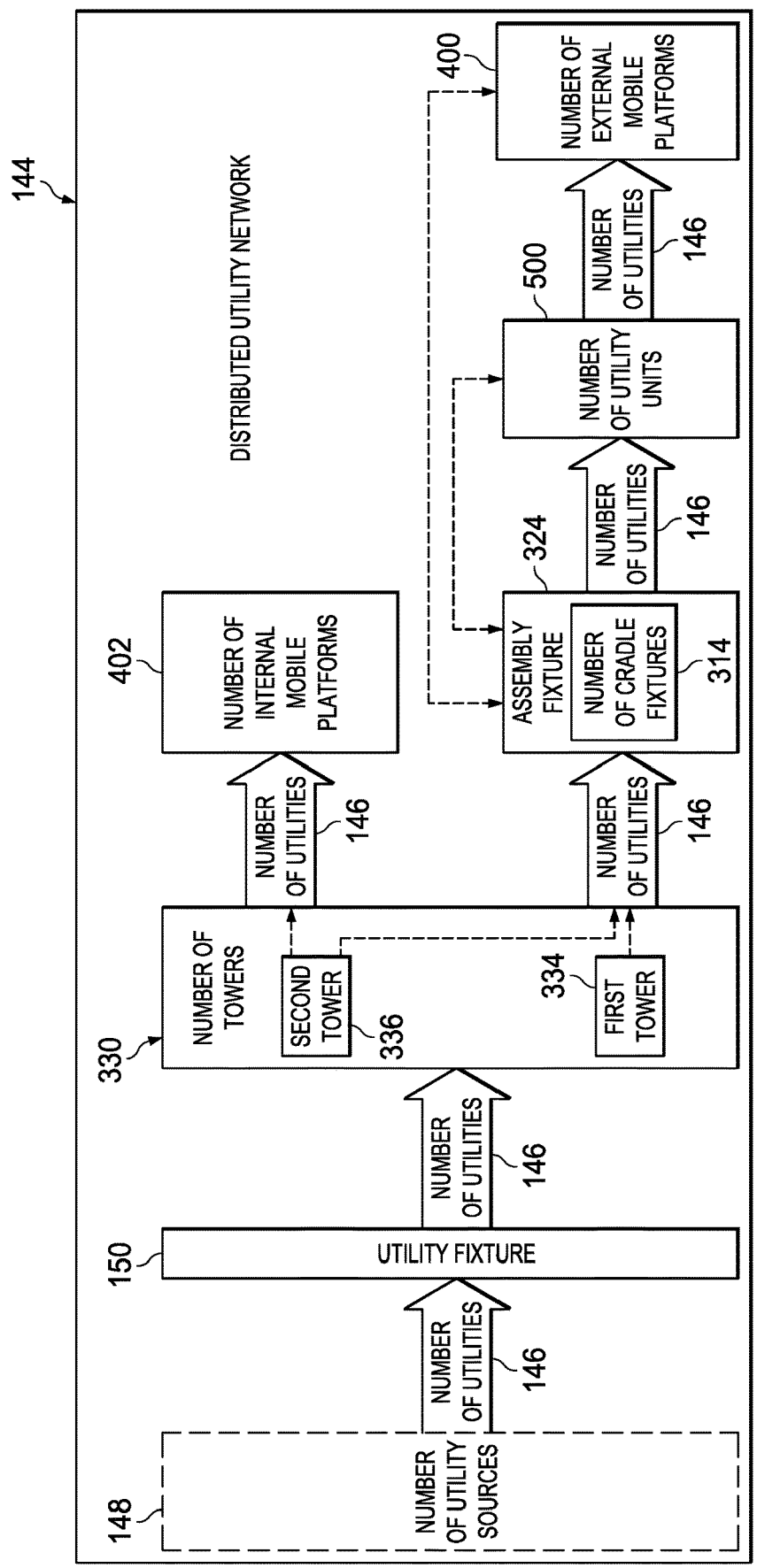
FIG. 5 is an illustration of a flow of a number of utilities across a distributed utility network in the form of a block diagram in accordance with an illustrative embodiment.

With reference now to FIG. 5, an illustration of a flow of number of utilities 146 across distributed utility network 144 from FIG. 1 is depicted in the form of a block diagram in accordance with an illustrative embodiment. As depicted, number of utilities 146 may be distributed across distributed utility network 144.

Distributed utility network 144 may include, for example, without limitation, number of utility sources 148, utility fixture 150, number of towers 330, assembly fixture 324, number of external mobile platforms 400, and number of utility units 500. In some cases, distributed utility network 144 may also include number of internal mobile platforms 402. In some illustrative examples, number of utility sources 148 may be considered separate from distributed utility network 144.

In this illustrative example, only one of number of towers 330 may be included in distributed utility network 144 at a time. When first tower 334 is used, distributed utility network 144 may be formed when utility fixture 150 is coupled to number of utility sources 148, first tower 334 is coupled to utility fixture 150, assembly fixture 324 is coupled to first tower 334, and number of external mobile platforms 400 is coupled to number of utility units 500.

Number of utility units 500 may be associated with number of cradle fixtures 314 of assembly fixture 324 or separated from number of cradle fixtures 314. For example, without limitation, a number of dual interfaces may be created between number of external mobile platforms 400, number of utility units 500, and number of cradle fixtures 314 using one or more dual-interface couplers.

When second tower 336 is used, distributed utility network 144 may be formed when utility fixture 150 is coupled to number of utility sources 148, second tower 336 is coupled to utility fixture 150, assembly fixture 324 is coupled to second tower 336, number of internal mobile platforms 402 is coupled to second tower 336, and number of external mobile platforms 400 is coupled to number of utility units 500, which may be associated with number of cradle fixtures 314 or separated from number of cradle fixtures 314. Number of internal mobile platforms 402 may receive number of utilities 146 through a number of cable management systems associated with second tower 336.

In this manner, number of utilities 146 may be distributed across distributed utility network 144 using a single utility fixture 150. This type of distributed utility network 144 may reduce the number of utility components, utility cables, and other types of devices needed to provide number of utilities 146 to the various components in distributed utility network 144. Further, with this type of distributed utility network 144, starting from at least utility fixture 150, number of utilities 146 may be provided completely above floor 300 of manufacturing environment in FIG. 1.

The illustrations in FIGS. 1-5 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, in some cases, more than one flexible manufacturing system may be present within manufacturing environment 100. These multiple flexible manufacturing systems may be used to build multiple fuselage assemblies within manufacturing environment 100. In other illustrative examples, flexible manufacturing system 106 may include multiple cradle systems, multiple tower systems, multiple utility systems, multiple autonomous tooling systems, and multiple pluralities of autonomous vehicles such that multiple fuselage assemblies may be built within manufacturing environment 100.

In some illustrative examples, utility system 138 may include multiple utility fixtures that are considered separate from flexible manufacturing system 106. Each of these multiple utility fixtures may be configured for use with flexible manufacturing system 106 and any number of other flexible manufacturing systems.

Additionally, the different couplings of mobile systems in plurality of mobile systems 134 may be performed autonomously in these illustrative examples. However, in other illustrative example, a coupling of one of plurality of mobile systems 134 to another one of plurality of mobile systems 134 may be performed manually in other illustrative examples.

Further, in other illustrative examples, one or more of plurality of mobile systems 134 may be drivable by, for example, without limitation, a human operator. For example, without limitation, in some cases, first tower 332 may be drivable with human guidance.

Figure 6:
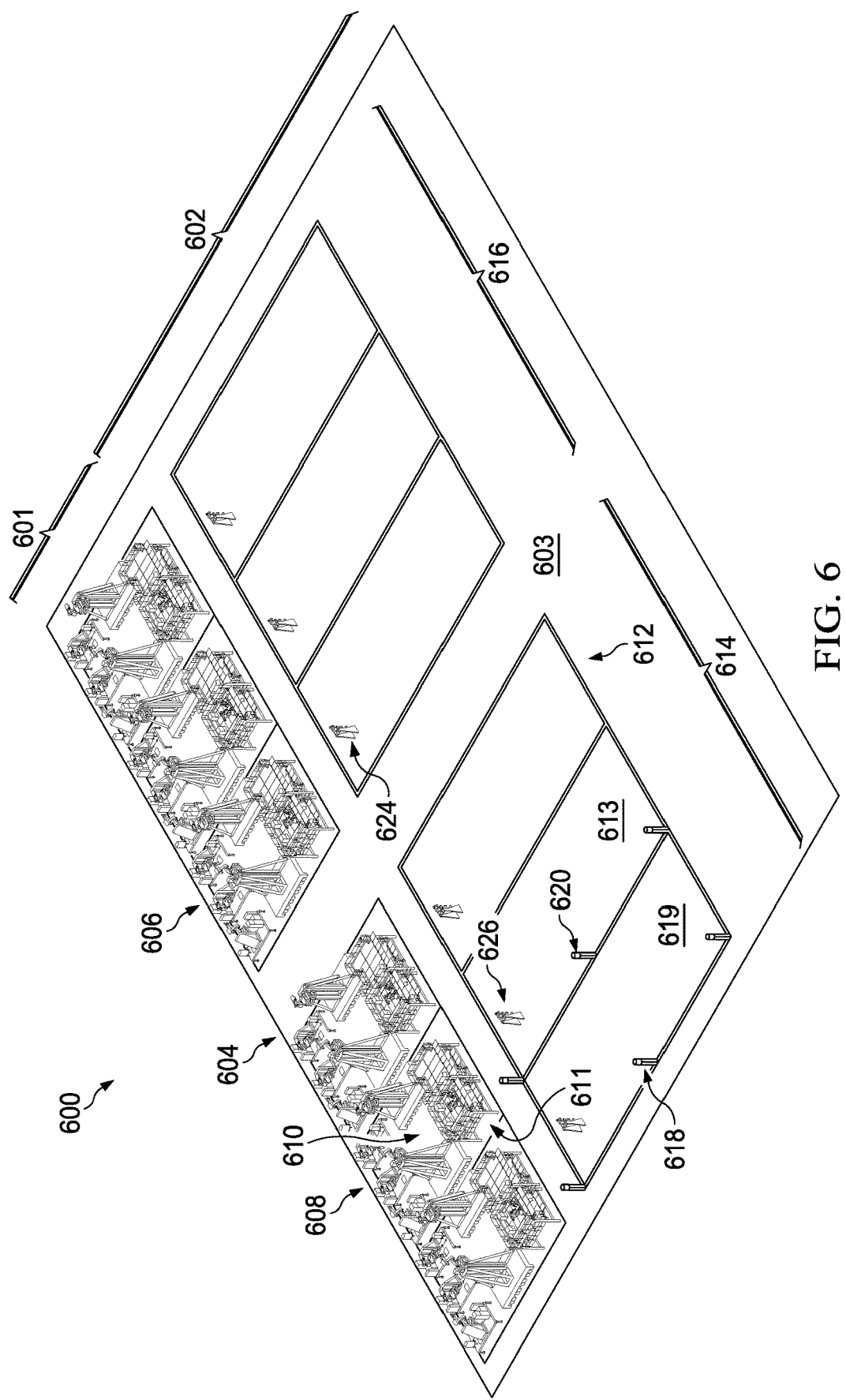
FIG. 6 is an illustration of an isometric view of a manufacturing environment in accordance with an illustrative embodiment.

With reference now to FIG. 6, an illustration of an isometric view of a manufacturing environment is depicted in accordance with an illustrative embodiment. In this illustrative example, manufacturing environment 600 may be an example of one implementation for manufacturing environment 100 in FIG. 1.

As depicted, manufacturing environment 600 may include holding environment 601 and assembly environment 602. Holding environment 601 may be a designated area on and over floor 603 of manufacturing environment 600 for storing plurality of flexible manufacturing systems 606 when plurality of flexible manufacturing systems 606 are not in use. Each of plurality of flexible manufacturing systems 606 may be an example of one implementation for flexible manufacturing system 106 described in FIGS. 1 and 3-5. In particular, each of plurality of flexible manufacturing systems 606 may be an example of one implementation for autonomous flexible manufacturing system 112 in FIG. 1.

Holding environment 601 may include plurality of holding cells 604. In this illustrative example, each of plurality of holding cells 604 may be considered an example of one implementation for holding area 318 in FIG. 3. In other illustrative examples, the entire holding environment 601 may be considered an example of one implementation for holding area 318 in FIG. 3.

Each of plurality of flexible manufacturing systems 606 may be stored in a corresponding one of plurality of holding cells 604. In particular, each of plurality of holding cells 604 may be designated for a specific one of plurality of flexible manufacturing systems 606. However, in other illustrative examples, any one of plurality of holding cells 604 may be used for storing any one of plurality of flexible manufacturing systems 606.

As depicted, flexible manufacturing system 608 may be an example of one of plurality of flexible manufacturing systems 606. Flexible manufacturing system 608 may include plurality of mobile systems 611, which may be an example of one implementation for plurality of mobile systems 134 in FIGS. 1 and 3.

Flexible manufacturing system 608 may be stored in holding cell 610 of plurality of holding cells 604. In this example, all of holding environment 601 may be considered an example of one implementation for holding area 318 in FIG. 3. However, in other examples, each of plurality of holding cells 604 in holding environment 601 may be considered an example of one implementation for holding area 318 in FIG. 3.

Floor 603 of manufacturing environment 600 may be substantially smooth to allow the various components and systems of plurality of flexible manufacturing systems 606 to be autonomously driven across floor 603 of manufacturing environment 600 with ease. When one of plurality of flexible manufacturing systems 606 is ready for use, that flexible manufacturing system may be driven across floor 603 from holding environment 601 into assembly environment 602.

Assembly environment 602 may be the designated area on and above floor 603 for building fuselage assemblies. When none of plurality of flexible manufacturing systems 606 are in use, floor 603 of assembly environment 602 may be kept substantially open and substantially clear.

As depicted, assembly environment 602 may include plurality of work cells 612. In one illustrative example, each of plurality of work cells 612 may be an example of one implementation for assembly area 304 in FIG. 3. Thus, each of plurality of work cells 612 may be designated for performing a fuselage assembly process, such as assembly process 110 in FIG. 1, for building fuselage assembly 114 in FIG. 1. In other illustrative examples, the entire assembly environment 602 may be considered an example of one implementation for assembly area 304 in FIG. 3.

In this illustrative example, first portion 614 of plurality of work cells 612 may be designated for building forward fuselage assemblies, such as forward fuselage assembly 117 in FIG. 1, while second portion 616 of plurality of work cells 612 may be designated for building aft fuselage assemblies, such as aft fuselage assembly 116 in FIG. 1. In this manner, plurality of work cells 612 may allow multiple fuselage assemblies to be built concurrently. Depending on the implementation, the building of these fuselage assemblies may begin at the same time or at different times in plurality of work cells 612.

In one illustrative example, plurality of mobile systems 611 that belong to flexible manufacturing system 608 may be driven across floor 603 from holding cell 610 into work cell 613. Within work cell 613, plurality of mobile systems 611 may be used to build a fuselage assembly (not shown). An example of one manner in which this fuselage assembly may be built using flexible manufacturing system 608 is described in greater detail in FIGS. 7-17 below.

In some illustrative examples, a sensor system may be associated with one or more of plurality of work cells 612. For example, without limitation, in some cases, sensor system 618 may be associated with work cell 619 of plurality of work cells 612. Sensor data generated by sensor system 618 may be used to help drive the various mobile systems of the corresponding one of plurality of flexible manufacturing systems 606 designated for building a fuselage assembly within work cell 619. In one illustrative example, sensor system 618 may take the form of metrology system 620.

Depending on the implementation, sensor system 618 may be optional. For example, without limitation, other sensor systems are not depicted associated with other work cells of plurality of work cells 612. Not using sensors systems such as sensor system 618 may help keep floor 603 of manufacturing environment 600 more open and clear to help the various mobile systems of plurality of flexible manufacturing systems 606 be driven more freely across floor 603.

As depicted, plurality of utility fixtures 624 may be permanently affixed to floor 603. Each of plurality of utility fixtures 624 may be an example of one implementation for utility fixture 150 in FIG. 1.

Plurality of utility fixtures 624 may be interfaced with a number of utility sources (not shown in this view). These utility sources (not shown) may be, for example, without limitation, located beneath floor 603. Utility fixture 626 may be an example of one of plurality of utility fixtures 624.

In this illustrative example, each of plurality of utility fixtures 624 is located in a corresponding one of plurality of work cells 612. Any one of plurality of flexible manufacturing systems 606 may be driven towards and interfaced with any one of plurality of utility fixtures 624. In this manner, plurality of utility fixtures 624 may be used to provide one or more utilities to plurality of flexible manufacturing systems 606.

Referring now to FIGS. 7-17, illustrations of the building of a fuselage assembly within manufacturing environment 600 from FIG. 6 are depicted in accordance with an illustrative embodiment. In FIGS. 7-17, flexible manufacturing system 608 from FIG. 6 may be used to build a fuselage assembly. The building of the fuselage assembly may be performed within any one of plurality of work cells 612 in FIG. 6. For example, without limitation, the building of the fuselage assembly may be performed within one of the work cells in second portion 616 of plurality of work cells 612 in FIG. 6.

Figure 7:
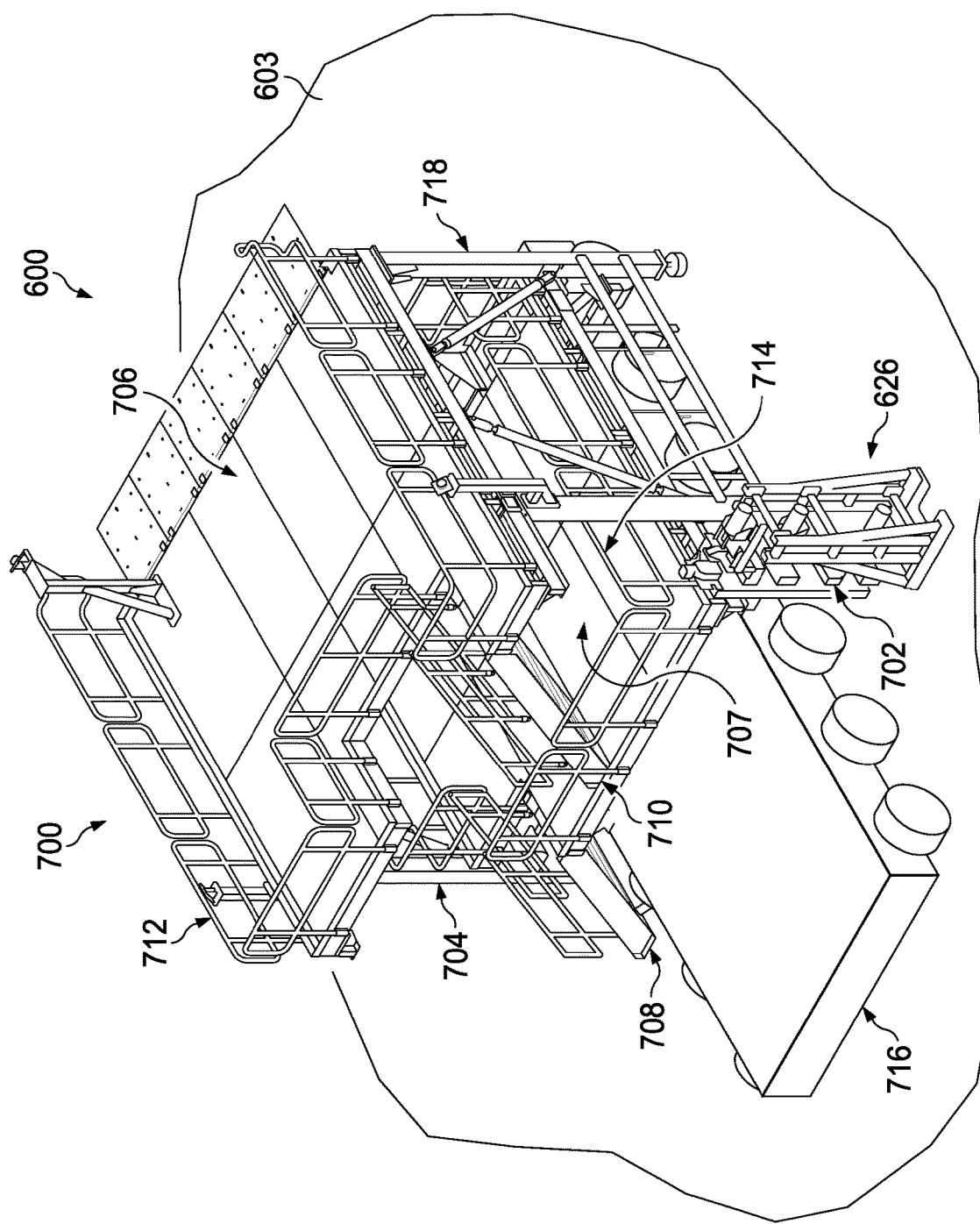
FIG. 7 is an illustration of a first tower coupled to a utility fixture.

Turning now to FIG. 7, an illustration of an isometric view of a first tower coupled to utility fixture 626 from FIG. 6 is depicted in accordance with an illustrative embodiment. In this illustrative example, first tower 700 may be coupled to utility fixture 626. First tower 700 may be an example of one of plurality of mobile systems 611 of flexible manufacturing system 608 in FIG. 6. In particular, first tower 700 may be an example of one implementation for first tower 334 in FIG. 1.

First tower 700 may be at least one of electrically and physically coupled to utility fixture 626 such that interface 702 is formed between first tower 700 and utility fixture 626. Interface 702 may be an example of one implementation for interface 342 in FIG. 3.

As depicted, first tower 700 may have base structure 704. Base structure 704 may include top platform 706 and bottom platform 707. In some cases, top platform 706 and bottom platform 707 may be referred to as top platform level and a bottom platform level, respectively. Top platform 706 may be used to provide a human operator with access to a top floor of a fuselage assembly (not shown), such as a passenger floor inside the fuselage assembly. Bottom platform 707 may be used to provide a human operator with access to a bottom floor of the fuselage assembly (not shown), such as a cargo floor inside the fuselage assembly.

In this illustrative example, walkway 708 may provide access from a floor, such as floor 603 in FIG. 6, to bottom platform 707. Walkway 710 may provide access from bottom platform 707 to top platform 706. Railing 712 is associated with top platform 706 for the protection of a human operator moving around on top platform 706. Railing 714 is associated with bottom platform 707 for the protection of a human operator moving around on bottom platform 707.

First tower 700 may be autonomously driven across floor 603 using autonomous vehicle 716. Autonomous vehicle 716 may be an automated guided vehicle (AGV) in this example. Autonomous vehicle 716 may be an example of one of plurality of autonomous vehicles 306 in FIG. 3. As depicted, autonomous vehicle 716 may be used to drive first tower 700 from holding environment 601 in FIG. 6 to selected tower position 718 relative to utility fixture 626. Selected tower position 718 may be an example of one implementation for selected tower position 338 in FIG. 3.

Once first tower 700 has been autonomously driven into selected tower position 718, first tower 700 may autonomously couple to utility fixture 626. In particular, first tower 700 may electrically and physically couple to utility fixture 626 autonomously to form interface 702. This type of coupling may enable a number of utilities to flow from utility fixture 626 to first tower 700. In this manner, first tower 700 and utility fixture 626 may establish at least a portion of a distributed utility network, similar to distributed utility network 144 described in FIGS. 1 and 5.

Figure 8:
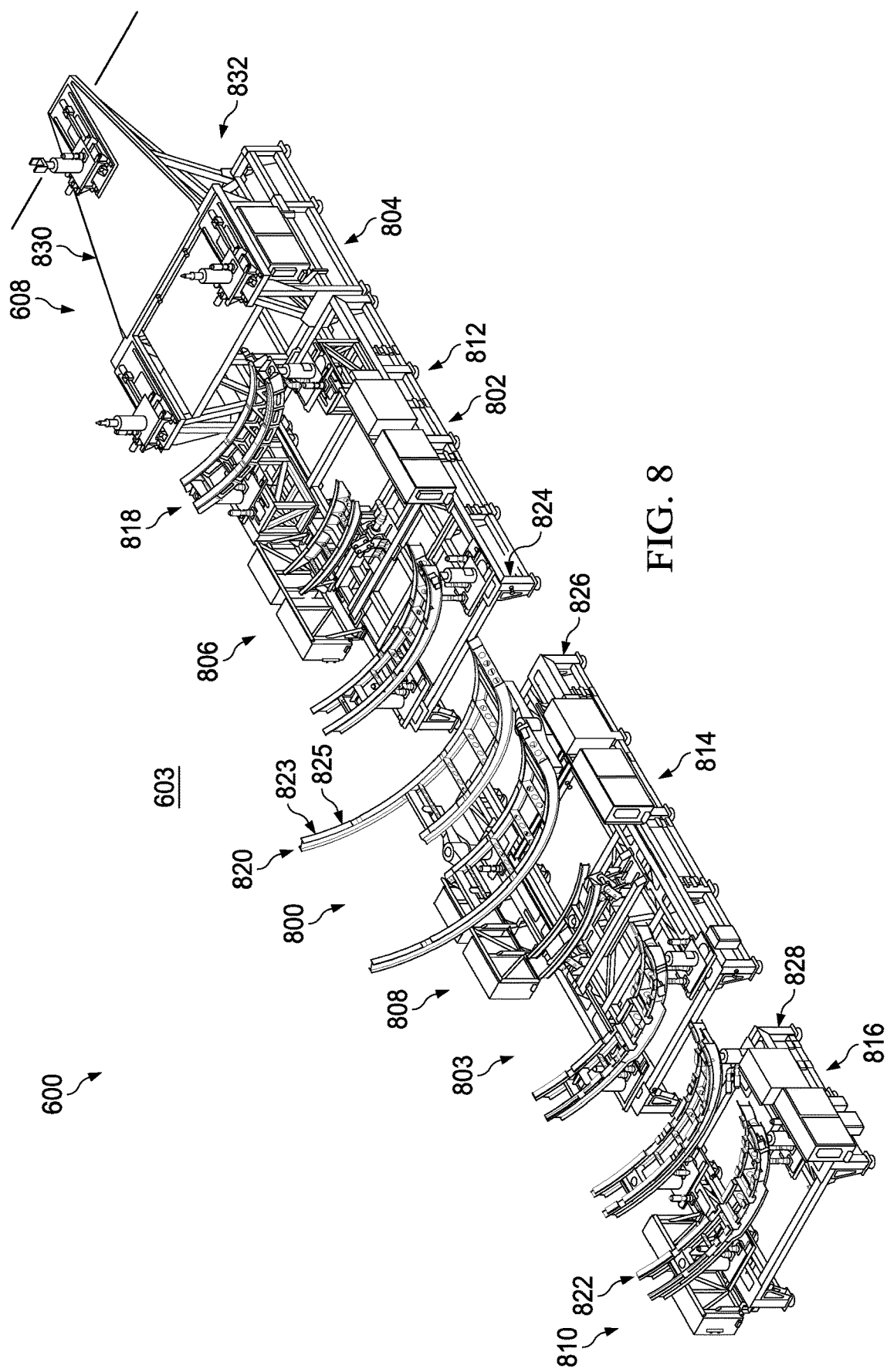
FIG. 8 is an illustration of an isometric view of a cradle system in accordance with an illustrative embodiment.

With reference now to FIG. 8, an illustration of an isometric view of a cradle system is depicted in accordance with an illustrative embodiment. In this illustrative example, cradle system 800 may be an example of one implementation for cradle system 308 in FIG. 3. Further, cradle system 800 may be an example of one of plurality of mobile systems 611 of flexible manufacturing system 608 in FIG. 6. In this manner, cradle system 800 may be an example of one of plurality of mobile systems 611 that are stored in holding cell 610 in FIG. 6.

As depicted, cradle system 800 may be comprised of number of fixtures 803. Number of fixtures 803 may be an example of one implementation for number of fixtures 313 in FIG. 3. Number of fixtures 803 may include number of cradle fixtures 802 and fixture 804. Number of cradle fixtures 802 may be an example of one implementation for number of cradle fixtures 314 in FIG. 3.

Number of cradle fixtures 802 may include cradle fixture 806, cradle fixture 808, and cradle fixture 810. Fixture 804 may be fixedly associated with cradle fixture 806. In this illustrative example, fixture 804 may be considered part of cradle fixture 806. However, in other illustrative examples, fixture 804 may be considered a separate fixture from cradle fixture 806.

As depicted, cradle fixture 806, cradle fixture 808, and cradle fixture 810 have base 812, base 814, and base 816, respectively. Number of retaining structures 818 may be associated with base 812. Number of retaining structures 820 may be associated with base 814. Number of retaining structures 822 may be associated with base 816. Each of number of retaining structures 818, number of retaining structures 820, and number of retaining structures 822 may be an example of an implementation for number of retaining structures 326 in FIG. 3.

Each retaining structure in number of retaining structures 818, number of retaining structures 820, and number of retaining structures 822 may have a curved shape that substantially matches a curvature of a corresponding fuselage section to be received by the retaining structure. Retaining structure 823 may be an example of one of number of retaining structures 820. As depicted, retaining structure 823 may have curved shape 825.

Curved shape 825 may be selected such that curved shape 825 substantially matches a curvature of a corresponding keel panel (not shown) that is to be engaged with retaining structure 823. More specifically, retaining structure 823 may have a substantially same radius of curvature as a corresponding keel panel (not shown) that is to be engaged with retaining structure 823.

In this illustrative example, plurality of stabilizing members 824, plurality of stabilizing members 826, and plurality of stabilizing members 828 may be associated with base 812, base 814, and base 816, respectively. Plurality of stabilizing members 824, plurality of stabilizing members 826, and plurality of stabilizing members 828 may be used to stabilize base 812, base 814, and base 816, respectively, relative to floor 603 of manufacturing environment 600.

In one illustrative example, these stabilizing members may keep their respective bases substantially level relative to floor 603. Further, each of plurality of stabilizing members 824, plurality of stabilizing members 826, and plurality of stabilizing members 828 may substantially support their respective base until that base is to be moved to a new location within or outside of manufacturing environment 600. In one illustrative example, each stabilizing member of plurality of stabilizing members 824, plurality of stabilizing members 826, and plurality of stabilizing members 828 may be implemented using a hydraulic leg.

Each of number of fixtures 803 may be used to support and hold a corresponding fuselage section (not shown) for a fuselage assembly (not shown) for an aircraft (not shown), such as one of plurality of fuselage sections 205 for fuselage assembly 114 for aircraft 104 in FIG. 2. For example, without limitation, fixture 804 may have platform 830 associated with base 832. Platform 830 may be configured to support and hold a forward fuselage section (not shown) or an aft fuselage section (not shown) for the aircraft (not shown), depending on the implementation. The forward fuselage section (not shown) may be the portion of the fuselage assembly (not shown) that is to be closest to the nose of the aircraft (not shown). The aft fuselage section (not shown) may be the portion of the fuselage assembly (not shown) that is to be closest to the tail of the aircraft (not shown).

Figure 9:
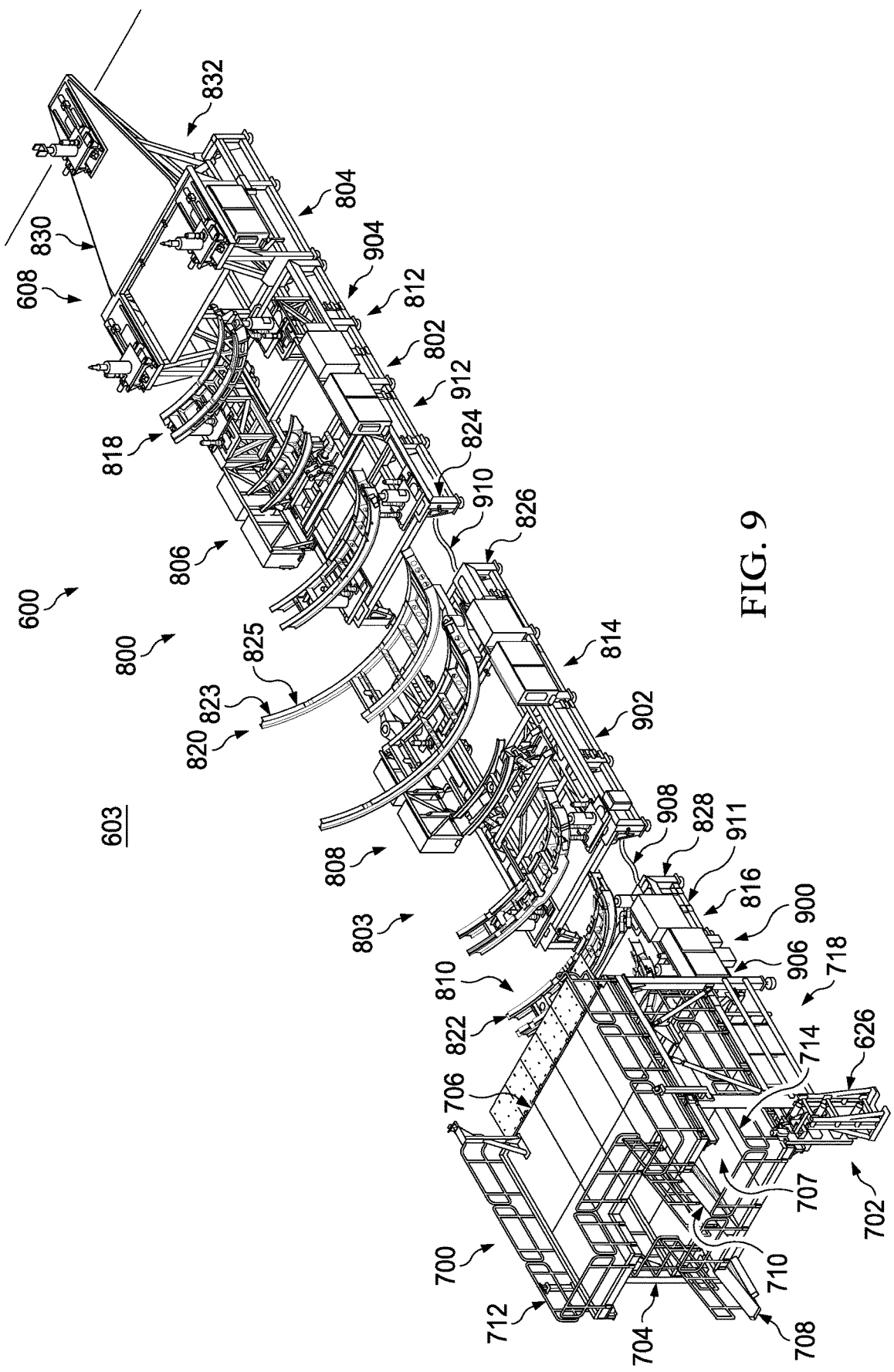
FIG. 9 is an illustration of an isometric view of an assembly fixture formed using a cradle system and coupled to a first tower in accordance with an illustrative embodiment.

With reference now to FIG. 9, an illustration of an isometric view of an assembly fixture formed using cradle system 800 from FIG. 8 and coupled to first tower 700 from FIG. 7 is depicted in accordance with an illustrative embodiment. In this illustrative example, cradle fixture 810 is coupled to first tower 700 and cradle fixture 810, cradle fixture 806, and cradle fixture 808 are coupled to each other.

Cradle fixture 810, cradle fixture 808, and cradle fixture 806 may have been autonomously driven across floor 603 of manufacturing environment 600 to selected cradle position 900, selected cradle position 902, and selected cradle position 904, respectively, using a number of corresponding autonomous vehicles (not shown), such as number of corresponding autonomous vehicles 316 from FIG. 3. Driving cradle fixture 806 may also cause fixture 804 to be driven when fixture 804 is part of cradle fixture 806 as shown. Selected cradle position 900, selected cradle position 902, and selected cradle position 904 may be an example of one implementation for number of selected cradle positions 320 in FIG. 3.

After driving cradle fixture 810, cradle fixture 808, and cradle fixture 806 to selected cradle position 900, selected cradle position 902, and selected cradle position 904, respectively, the number of corresponding autonomous vehicles (not shown) may be autonomously driven away. In other illustrative examples, the number of corresponding autonomous vehicles (not shown) may be integrated as part of cradle fixture 810, cradle fixture 808, and cradle fixture 806.

Selected cradle position 900 may be a position relative to selected tower position 718 of first tower 700. When cradle fixture 810 is in selected cradle position 900 relative to first tower 700, cradle fixture 810 may be electrically and physically coupled to first tower 700 to form interface 906. In some cases, cradle fixture 810 may be coupled to first tower 700 autonomously to form interface 906. In one illustrative example, interface 906 may be formed by autonomously coupling cradle fixture 810 to first tower 700. Interface 906 may be an electrical and physical interface that enables a number of utilities that are flowing from utility fixture 626 to first tower 700 to also flow to cradle fixture 810. In this manner, interface 906 may be formed by autonomously coupling a number of utilities between cradle fixture 810 and first tower 700. Interface 906 may be an example of one implementation for interface 340 in FIG. 3. In this illustrative example, cradle fixture 810, being coupled to first tower 700, may be referred to as primary cradle fixture 911.

Further, as depicted, cradle fixture 806, cradle fixture 808, and cradle fixture 810 may be coupled to each other. In particular, cradle fixture 808 may be coupled to cradle fixture 810 to form interface 908. Similarly, cradle fixture 806 may be coupled to cradle fixture 808 to form interface 910. In one illustrative example, both interface 908 and interface 910 may be formed by autonomously coupling these cradle fixtures to each other.

In particular, interface 908 and interface 910 may take the form of electrical and physical interfaces that enable the number of utilities to flow from cradle fixture 810, to cradle fixture 808, and to cradle fixture 806. In this manner, interface 908 may be formed by autonomously coupling the number of utilities between cradle fixture 810 and cradle fixture 808 and interface 910 may be formed by autonomously coupling the number of utilities between cradle fixture 808 and cradle fixture 806. In this manner, number of utilities 146 may be autonomously coupled between adjacent cradle fixtures in number of cradle fixtures 314.

Thus, when utility fixture 626, first tower 700, cradle fixture 810, cradle fixture 808, and cradle fixture 806 are all coupled in series as described above, the number of utilities may be distributed downstream from utility fixture 626 to first tower 700, cradle fixture 810, cradle fixture 808, and cradle fixture 806. In this illustrative example, any utilities that flow to cradle fixture 806 may also be distributed to fixture 804.

Any number of coupling units, structural members, connection devices, cables, other types of elements, or combination thereof may be used to form interface 908 and interface 910. Depending on the implementation, interface 908 and interface 910 may take the form of coupling units that both physically and electrically connect cradle fixture 810, cradle fixture 808, and cradle fixture 806 to each other. In other illustrative examples, interface 908 and interface 910 may be implemented in some other manner.

When cradle fixture 810, cradle fixture 808, and cradle fixture 806 are in selected cradle position 900, selected cradle position 902, and selected cradle position 904, respectively, and coupled to each other, these cradle fixtures together form assembly fixture 912. Assembly fixture 912 may be an example of one implementation for assembly fixture 324 in FIG. 3. In this manner, interface 906 between first tower 700 and cradle fixture 810 may also be considered an electrical and physical interface between first tower 700 and assembly fixture 912.

Figure 10:
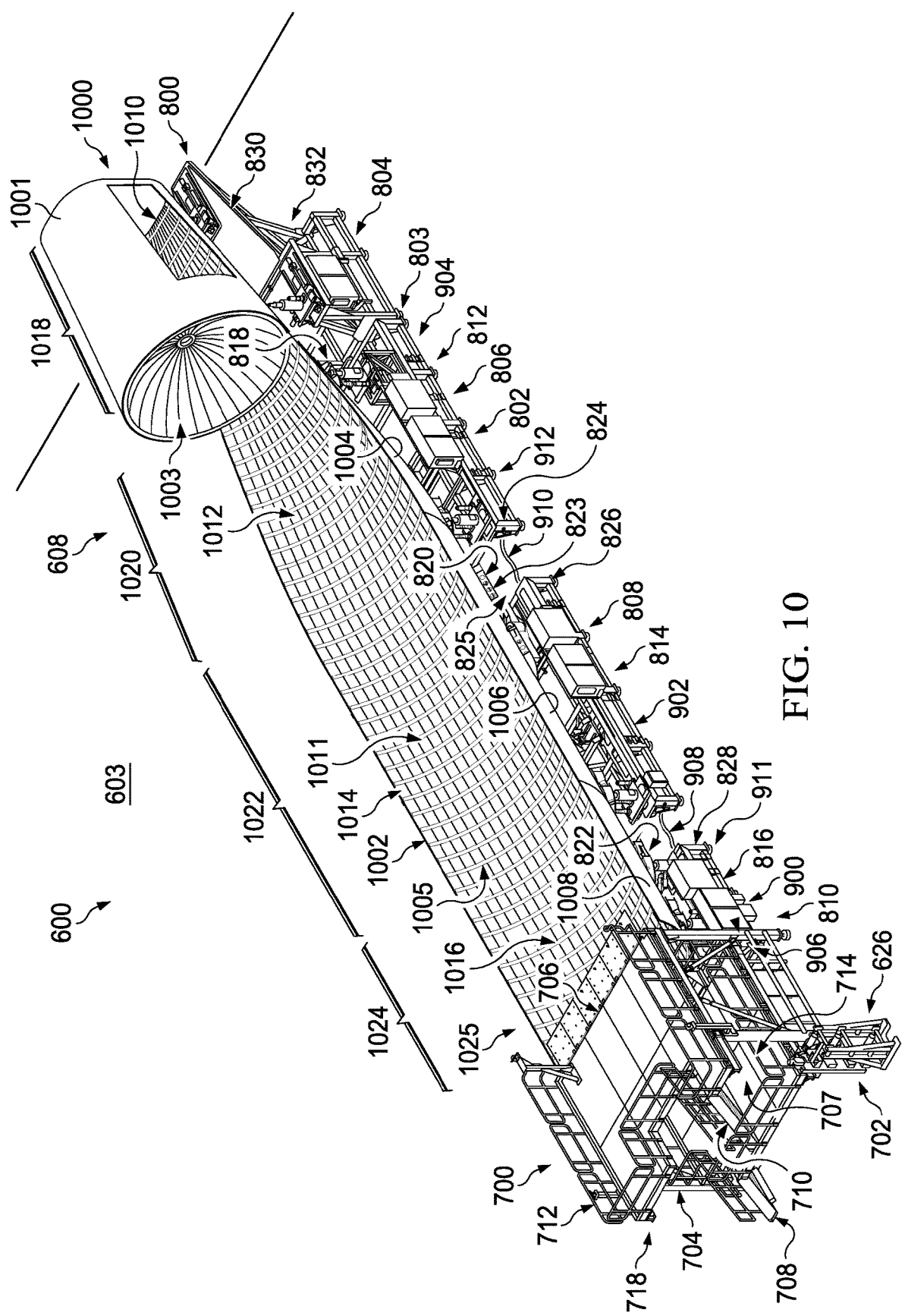
FIG. 10 is an illustration of an isometric view of one stage in the assembly process for building a fuselage assembly that is being supported by an assembly fixture in accordance with an illustrative embodiment.

With reference now to FIG. 10, an illustration of an isometric view of one stage in the assembly process for building a fuselage assembly that is being supported by assembly fixture 912 from FIG. 9 is depicted in accordance with an illustrative embodiment. In this illustrative example, assembly fixture 912 may support fuselage assembly 1000 as fuselage assembly 1000 is built on assembly fixture 912.

Fuselage assembly 1000 may be an aft fuselage assembly that is an example of one implementation for aft fuselage assembly 116 in FIG. 1. Fuselage assembly 1000 may be partially assembled in this illustrative example. Fuselage assembly 1000 may be at an early stage of assembly in this example.

At this stage of the assembly process, fuselage assembly 1000 includes end panel 1001 and plurality of keel panels 1002. End panel 1001 may have a tapered cylindrical shape in this illustrative example. In this manner, one portion of end panel 1001 may form part of the keel 1005 for fuselage assembly 1000, another portion of end panel 1001 may form part of the sides (not fully shown) for fuselage assembly 1000, and yet another portion of end panel 1001 may form part of a crown (not fully shown) for fuselage assembly 1000.

Further, as depicted, bulkhead 1003 may be associated with end panel 1001. Bulkhead 1003 may be a pressure bulkhead. Bulkhead 1003 may be an example of one implementation for bulkhead 272 in FIG. 2.

Plurality of keel panels 1002 include keel panel 1004, keel panel 1006, and keel panel 1008. End panel 1001 and plurality of keel panels 1002 have been engaged with assembly fixture 912. In particular, end panel 1001 has been engaged with fixture 804. Keel panel 1004, keel panel 1006, and keel panel 1008 have been engaged with cradle fixture 806, cradle fixture 808, and cradle fixture 810, respectively.

In one illustrative example, end panel 1001 is first engaged with fixture 804 with keel panel 1004, keel panel 1006, and keel panel 1008 then being successively engaged with cradle fixture 806, cradle fixture, 808, and cradle fixture 810, respectively. In this manner, keel 1005 of fuselage assembly 1000 may be assembled in a direction from the aft end of fuselage assembly 1000 to the forward end of fuselage assembly 1000.

Each of cradle fixture 806, cradle fixture 808, and cradle fixture 810 may be at least one of autonomously or manually adjusted, as needed, to accommodate plurality of keel panels 1002 such that fuselage assembly 1000 may be built to meet outer mold line requirements and inner mold line requirements within selected tolerances. In some cases, at least one of cradle fixture 806, cradle fixture 808, and cradle fixture 810 may have at least one retaining structure that can be adjusted to adapt to the shifting of fuselage assembly 1000 during the assembly process due to increased loading as fuselage assembly 1000 is built.

As depicted, members 1011 may be associated with end panel 1001 and plurality of keel panels 1002. Members 1011 may include frames and stringers in this illustrative example. However, depending on the implementation, members 1011 may also include, without limitation, stiffeners, stanchions, intercostal structural members, connecting members, other types of structural members, or some combination thereof. The connecting members may include, for example, without limitation, shear clips, ties, splices, intercostal connecting members, other types of mechanical connecting members, or some combination thereof.

The portion of members 1011 attached to end panel 1001 may form support section 1010. The portions of members 1011 attached to keel panel 1004, keel panel 1006, and keel panel 1008 may form support section 1012, support section 1014, and support section 1016, respectively.

In this illustrative example, end panel 1001 may form fuselage section 1018 for fuselage assembly 1000. Each of keel panel 1004, keel panel 1006, and keel panel 1008 may form a portion of fuselage section 1020, fuselage section 1022, and fuselage section 1024, respectively, for fuselage assembly 1000. Fuselage section 1018, fuselage section 1020, fuselage section 1022, and fuselage section 1024 may together form plurality of fuselage sections 1025 for fuselage assembly 1000. Each of fuselage section 1018, fuselage section 1020, fuselage section 1022, and fuselage section 1024 may be an example of one implementation for fuselage section 207 in FIG. 2.

End panel 1001 and plurality of keel panels 1002 may be temporarily connected together using temporary fasteners such as, for example, without limitation, tack fasteners. In particular, end panel 1001 and plurality of keel panels 1002 may be temporarily connected to each other as each of the panels is engaged with assembly fixture 912 and other panels.

For example, without limitation, coordination holes (not shown) may be present at the edges of end panel 1001 and each of plurality of keel panels 1002. In some cases, a coordination hole may pass through a panel and at least one of members 1011 associated with the panel. Engaging one panel with another panel may include aligning these coordination holes such that temporary fasteners, such as tack fasteners, may be installed in these coordination holes. In some cases, engaging one panel with another panel may include aligning a coordination hole through one panel with a coordination hole through one of members 1011 associated with another panel.

In yet another illustrative example, engaging a first panel with another panel may include aligning the edges of the two panels to form a butt splice. These two panels may then be temporarily connected together by aligning a first number of coordination holes in, for example, a splice plate, with a corresponding number of holes on the first panel and aligning a second number of coordination holes in that splice plate with a corresponding number of holes on the second panel. Temporary fasteners may then be inserted through these aligned coordination holes to temporarily connect the first panel to the second panel.

In this manner, panels and members may be engaged with each other and temporarily connected together in a number of different ways. Once end panel 1001 and plurality of keel panels 1002 have been temporarily connected together, assembly fixture 912 may help maintain the position and orientation of end panel 1001 and each of plurality of keel panels 1002 relative to each other.

Figure 11:
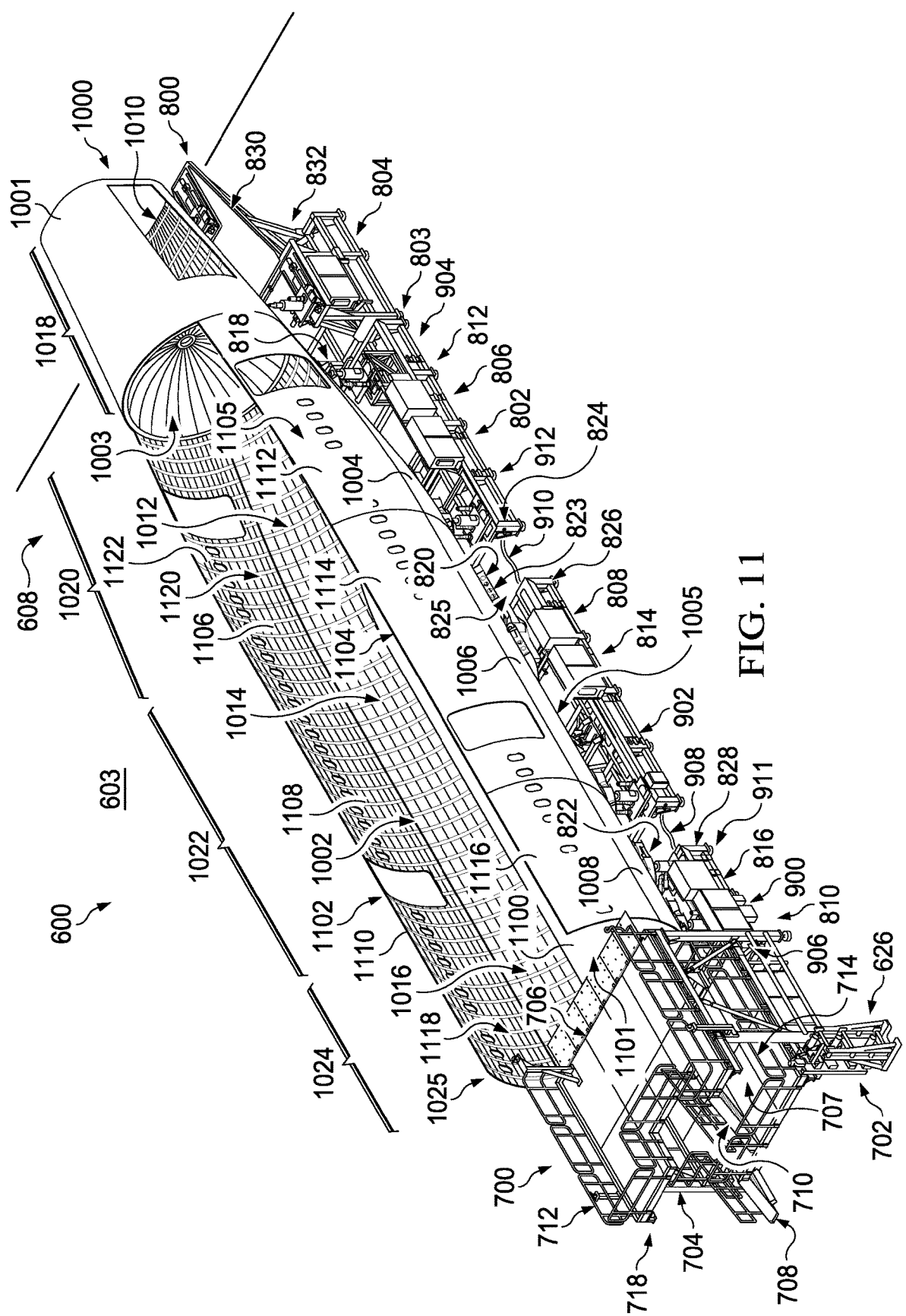
FIG. 11 is an illustration of an isometric view of another stage in the assembly process for building a fuselage assembly in accordance with an illustrative embodiment.

Turning now to FIG. 11, an illustration of an isometric view of another stage in the assembly process for building a fuselage assembly is depicted in accordance with an illustrative embodiment. In this illustrative example, cargo floor 1100 has been added to fuselage assembly 1000. In particular, cargo floor 1100 may be associated with plurality of keel panels 1002.

As depicted, at least a portion of cargo floor 1100 may be substantially level with bottom platform 707 of first tower 700. In particular, at least the portion of cargo floor 1100 nearest first tower 700 may be substantially aligned with bottom platform 707 of first tower 700. In this manner, a human operator (not shown) may use bottom platform 707 of first tower 700 to easily walk onto cargo floor 1100 and access interior 1101 of fuselage assembly 1000.

As depicted, first side panels 1102 and second side panels 1104 have been added to fuselage assembly 1000. First side panels 1102 and second side panels 1104 may be an example of one implementation for first side panels 224 and second side panels 226, respectively, in FIG. 2. First side panels 1102, second side panels 1104, and a first and second portion of end panel 1001 may form sides 1105 of fuselage assembly 1000. In this illustrative example, plurality of keel panels 1002, end panel 1001, first side panels 1102, and second side panels 1104 may all be temporarily connected together using, for example, without limitation, tack fasteners.

First side panels 1102 may include side panel 1106, side panel 1108, and side panel 1110 that have been engaged with and temporarily connected to keel panel 1004, keel panel 1006, and keel panel 1008, respectively. Similarly, second side panels 1104 may include side panel 1112, side panel 1114, and side panel 1116 that have been engaged with and temporarily connected to keel panel 1004, keel panel 1006, and keel panel 1008, respectively. Further, both side panel 1106 and side panel 1112 have been engaged with end panel 1001.

As depicted, members 1118 may be associated with first side panels 1102. Other members (not shown) may be similarly associated with second side panels 1104. Members 1118 may be implemented in a manner similar to members 1011. In this illustrative example, corresponding portion 1120 of members 1118 may be associated with side panel 1106. Corresponding portion 1120 of members 1118 may form support section 1122 associated with side panel 1106. Support section 1122 be an example of one implementation for support section 238 in FIG. 2.

Figure 12:
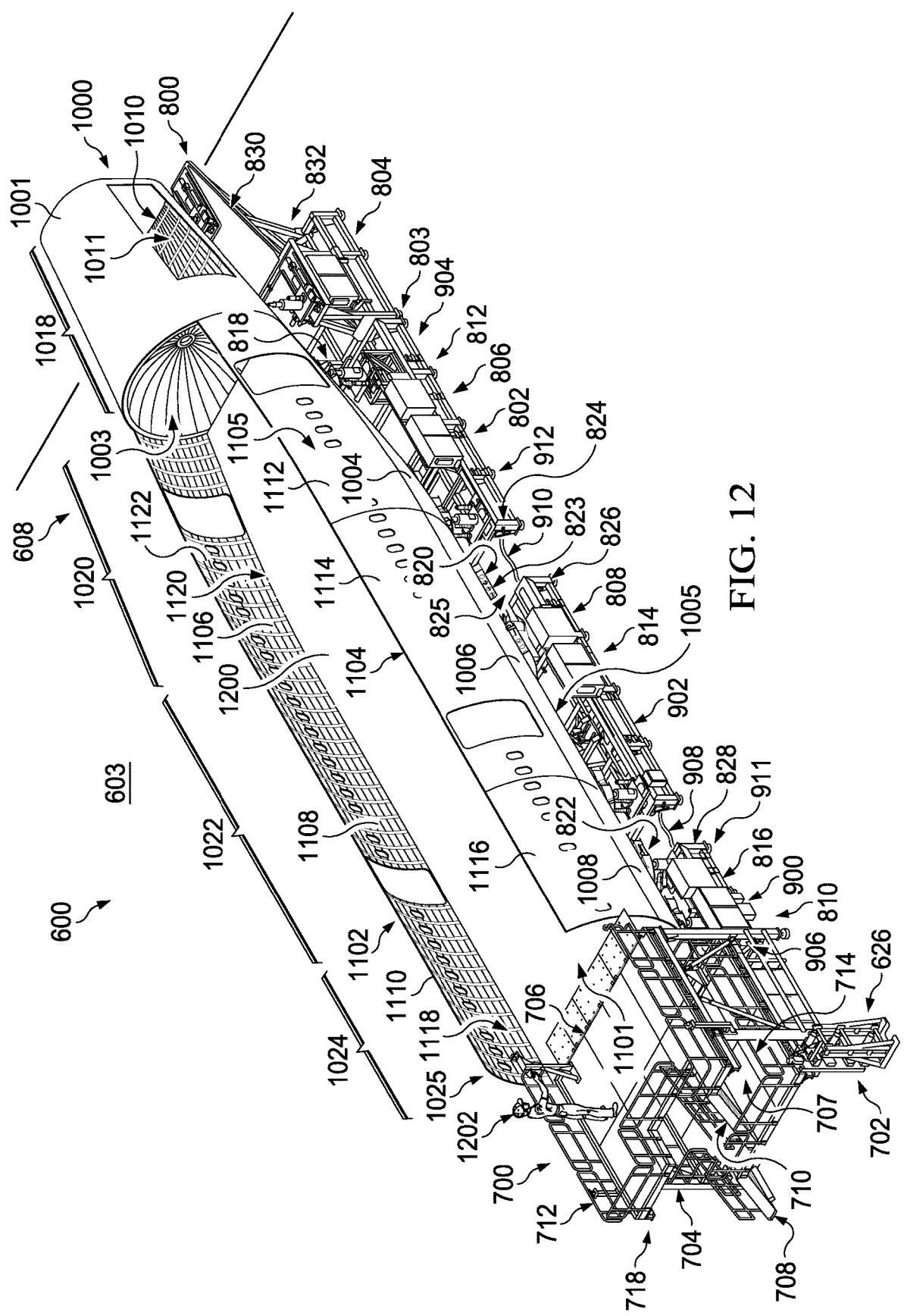
FIG. 12 is an illustration of an isometric view of another stage in the assembly process for building a fuselage assembly being supported by an assembly fixture in accordance with an illustrative embodiment.

With reference now to FIG. 12, an illustration of an isometric view of another stage in the assembly process for building a fuselage assembly is depicted in accordance with an illustrative embodiment. In this illustrative example, passenger floor 1200 has been added to fuselage assembly 1000. As depicted, passenger floor 1200 may be substantially level with top platform 706 of first tower 700. Human operator 1202 may use top platform 706 of first tower 700 to walk onto passenger floor 1200 and access interior 1101 of fuselage assembly 1000.

Figure 13:
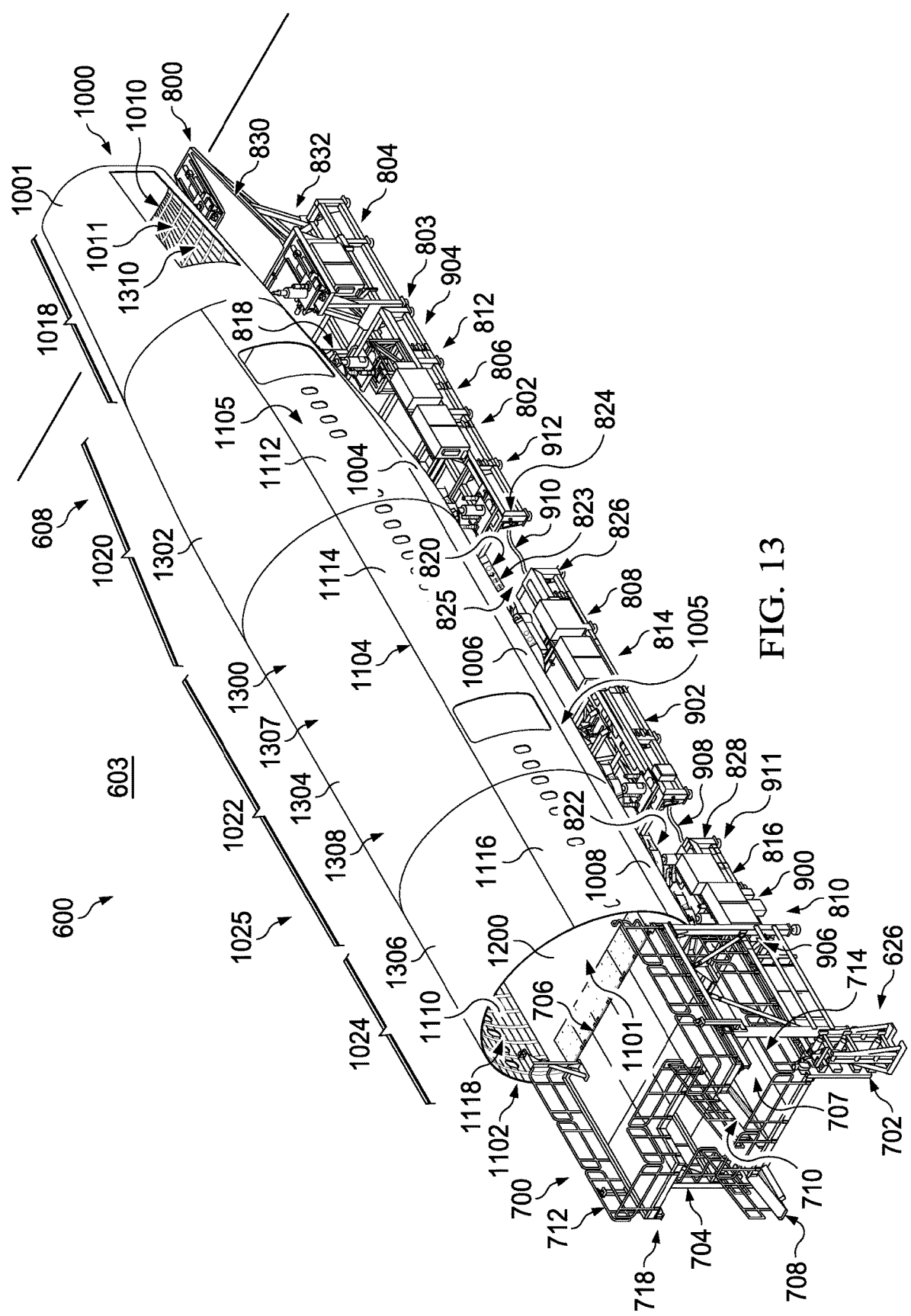
FIG. 13 is an illustration of an isometric view of another stage in the assembly process for building a fuselage assembly in accordance with an illustrative embodiment.

With reference now to FIG. 13, an illustration of an isometric view of another stage in the assembly process for building a fuselage assembly is depicted in accordance with an illustrative embodiment. In this illustrative example, plurality of crown panels 1300 have been added to fuselage assembly 1000. Plurality of crown panels 1300 may be an example of one implementation for crown panels 218 in FIG. 2.

In this illustrative example, plurality of crown panels 1300 may include crown panel 1302, crown panel 1304, and crown panel 1306. These crown panels along with a top portion of end panel 1001 may form crown 1307 of fuselage assembly 1000. Crown panel 1302 may be engaged with and temporarily connected to end panel 1001, side panel 1106 shown in FIG. 11, side panel 1112, and crown panel 1304.

Crown panel 1304 may be engaged with and temporarily connected to crown panel 1302, crown panel 1306, side panel 1108 shown in FIG. 11, and side panel 1114. Further, crown panel 1306 may be engaged with and temporarily connected to crown panel 1304, side panel 1110, and side panel 1116.

Together, end panel 1001, plurality of keel panels 1002, first side panels 1102, second side panels 1104, and plurality of crown panels 1300 may form plurality of panels 1308 for fuselage assembly 1000. Plurality of panels 1308 may be an example of one implementation for plurality of panels 120 in FIG. 1.

Plurality of panels 1308 may all be temporarily connected to each other such that desired compliance with outer mold line requirements and inner mold line requirements may be maintained during the building of fuselage assembly 1000. In other words, temporarily connecting plurality of panels 1308 to each other may enable outer mold line requirements and inner mold line requirements to be met within selected tolerances during the building of fuselage assembly 1000 and, in particular, the joining of plurality of panels 1308 together.

Members (not shown) may be associated with plurality of crown panels 1300 in a manner similar to the manner in which members 1118 are associated with first side panels 1102. These members associated with plurality of crown panels 1300 may be implemented in a manner similar to members 1118 and members 1011 as shown in FIGS. 11-12. The various members associated with end panel 1001, plurality of keel panels 1002, plurality of crown panels 1300, first side panels 1102, and second side panels 1104 may form plurality of members 1310 for fuselage assembly 1000. When plurality of panels 1308 are joined together, plurality of members 1310 may form a support structure (not yet shown) for fuselage assembly 1000, similar to support structure 121 in FIG. 1.

After plurality of crown panels 1300 have been added to fuselage assembly 1000, first tower 700 may be autonomously decoupled from assembly fixture 912 and utility fixture 626. First tower 700 may then be autonomously driven away from utility fixture 626 using, for example, without limitation, autonomous vehicle 716 in FIG. 7. In one illustrative example, first tower 700 may be autonomously driven back to holding environment 601 in FIG. 6.

When first tower 700 is decoupled from assembly fixture 912 and utility fixture 626, a gap is formed in the distributed utility network. This gap may be filled using a second tower (not shown), implemented in a manner similar to second tower 336 in FIG. 3.

Figure 14:
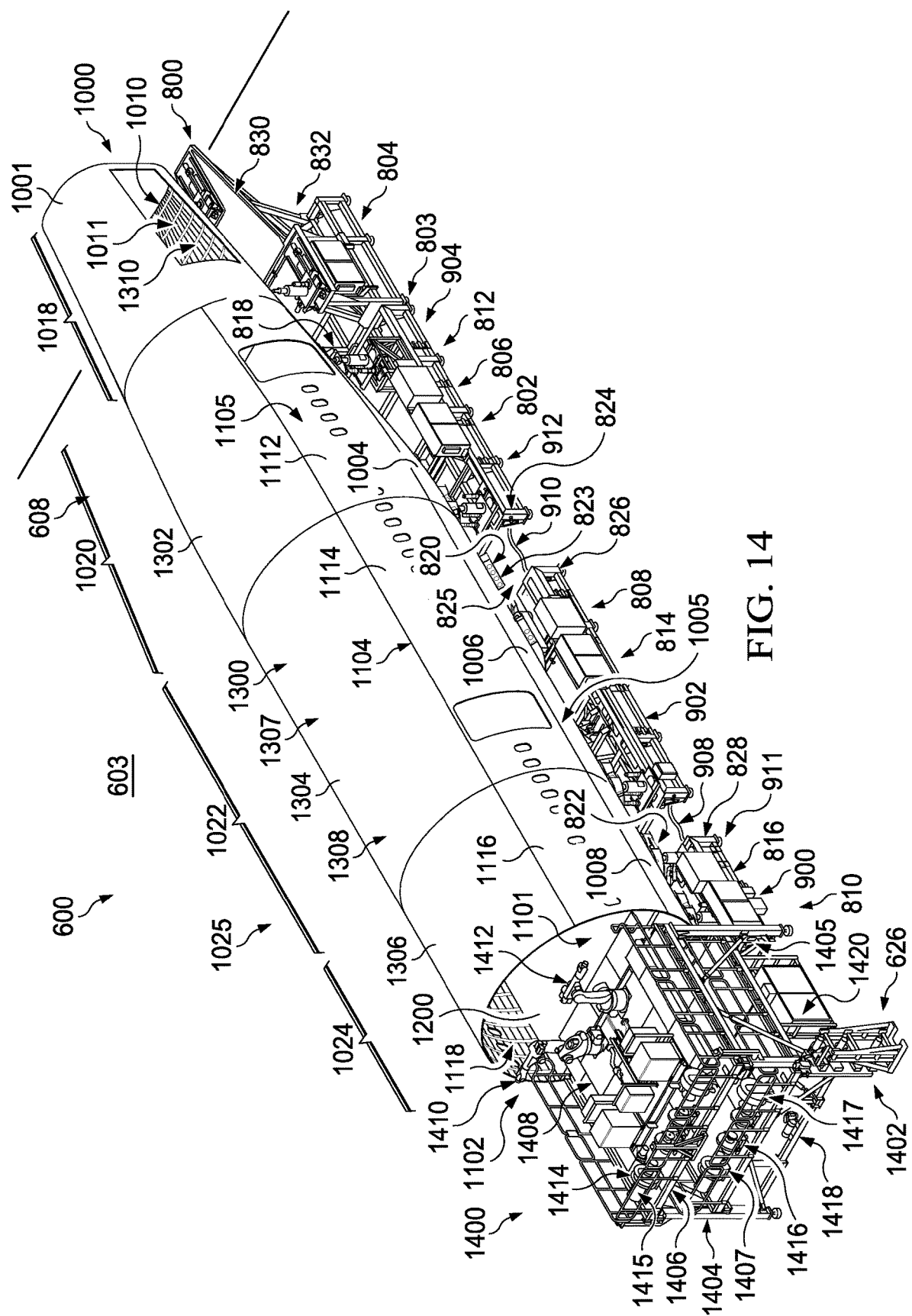
FIG. 14 is an illustration of an isometric view of a second tower coupled to a utility fixture and an assembly fixture supporting a fuselage assembly in accordance with an illustrative embodiment.

With reference now to FIG. 14, an illustration of an isometric view of a second tower coupled to utility fixture 626 and assembly fixture 912 supporting fuselage assembly 1000 from FIG. 13 is depicted in accordance with an illustrative embodiment. In this illustrative example, second tower 1400 has been positioned relative to assembly fixture 912 and utility fixture 626. Second tower 1400 may be an example of one implementation for second tower 336 in FIG. 3.

Second tower 1400 may be autonomously driven across floor 603 using an autonomous vehicle (not shown), similar to autonomous vehicle 716 in FIG. 7. Second tower 1400 may be autonomously driven into selected tower position 1418 relative to utility fixture 626. Selected tower position 1418 may be an example of one implementation for selected tower position 338 in FIG. 3. In this illustrative example, selected tower position 1418 may be substantially the same as selected tower position 718 in FIG. 7.

Once second tower 1400 has been autonomously driven into selected tower position 1418, second tower 1400 may autonomously couple to utility fixture 626. In particular, second tower 1400 may electrically and physically couple to utility fixture 626 autonomously to form interface 1402. Interface 1402 may be another example of one implementation for interface 342 in FIG. 3. This type of coupling may enable a number of utilities to flow from utility fixture 626 to second tower 1400.

Further, second tower 1400 may autonomously couple to cradle fixture 810, thereby autonomously coupling to assembly fixture 912, to form interface 1405. Interface 1405 may enable the number of utilities to flow downstream from second tower 1400. In this manner, the number of utilities may flow from second tower 1400 to cradle fixture 810, to cradle fixture 808, and then to cradle fixture 806. In this manner, second tower 1400 may fill the gap in the distributed utility network that was created when first tower 700 in FIG. 13 was decoupled from assembly fixture 912 and utility fixture 626 and driven away.

Similar to first tower 700 in FIG. 7, second tower 1400 may include base structure 1404, top platform 1406, and bottom platform 1407. However, top platform 1406 and bottom platform 1407 may be used to provide internal mobile platforms with access to interior 1101 of fuselage assembly 1000 instead of human operators.

In this illustrative example, internal mobile platform 1408 may be positioned on top platform 1406. Top platform 1406 may be substantially aligned with passenger floor 1200 such that internal mobile platform 1408 may be able to autonomously drive across top platform 1406 onto passenger floor 1200.

Similarly, an internal mobile platform (not shown in this view) may be positioned on bottom platform 1407. Bottom platform 1407 may be substantially aligned with cargo floor 1100 (not shown in this view) from FIG. 11 such that this other internal mobile platform (not shown in this view) may be able to autonomously drive across bottom platform 1407 onto the cargo floor. Internal mobile platform 1408 and the other internal mobile platform (not shown in this view) may be examples of implementations for internal mobile platform 406 in FIG. 4.

As depicted, internal robotic device 1410 and internal robotic device 1412 may be associated with internal mobile platform 1408. Although internal robotic device 1410 and internal robotic device 1412 are shown associated with the same internal mobile platform 1408, in other illustrative examples, internal robotic device 1410 may be associated with one internal mobile platform and internal robotic device 1412 may be associated with another internal mobile platform. Each of internal robotic device 1410 and internal robotic device 1412 may be an example of one implementation for internal robotic device 416 in FIG. 4.

Internal robotic device 1410 and internal robotic device 1412 may be used to perform operations within interior 1101 of fuselage assembly 1000 for joining plurality of panels 1308. For example, without limitation, internal robotic device 1410 and internal robotic device 1412 may be used to perform fastening operations, such as riveting operations, within interior 1101 of fuselage assembly 1000.

In one illustrative example, utility box 1420 may be associated with base structure 1404. Utility box 1420 may manage the number of utilities received from utility fixture 626 through interface 1402 and may distribute these utilities into utility cables that are managed using cable management system 1414 and cable management system 1416.

As depicted in this example, cable management system 1414 may be associated with top platform 1406 and cable management system 1416 may be associated with bottom platform 1407. Cable management system 1414 and cable management system 1416 may be implemented similarly.

Cable management system 1414 may include cable wheels 1415 and cable management system 1416 may include cable wheels 1417. Cable wheels 1415 may be used to spool utility cables that are connected to internal mobile platform 1408. For example, without limitation, cable wheels 1415 may be biased in some manner to substantially maintain a selected amount of tension in the utility cables. This biasing may be achieved using, for example, one or more spring mechanisms.

As internal mobile platform 1408 moves away from second tower 1400 along passenger floor 1200, the utility cables may extend from cable wheels 1415 to maintain utility support to internal mobile platform 1408 and manage the utility cables such that they do not become tangled. Cable wheels 1417 may be implemented in a manner similar to cable wheels 1415.

By using cable wheels 1415 to spool the utility cables, the utility cables may be kept off of internal mobile platform 1408, thereby reducing the weight of internal mobile platform 1408 and the load applied by internal mobile platform 1408 to passenger floor 1200. The number of utilities provided to internal mobile platform 1408 may include, for example, without limitation, electricity, air, water, hydraulic fluid, communications, some other type of utility, or some combination thereof.

Figure 15:
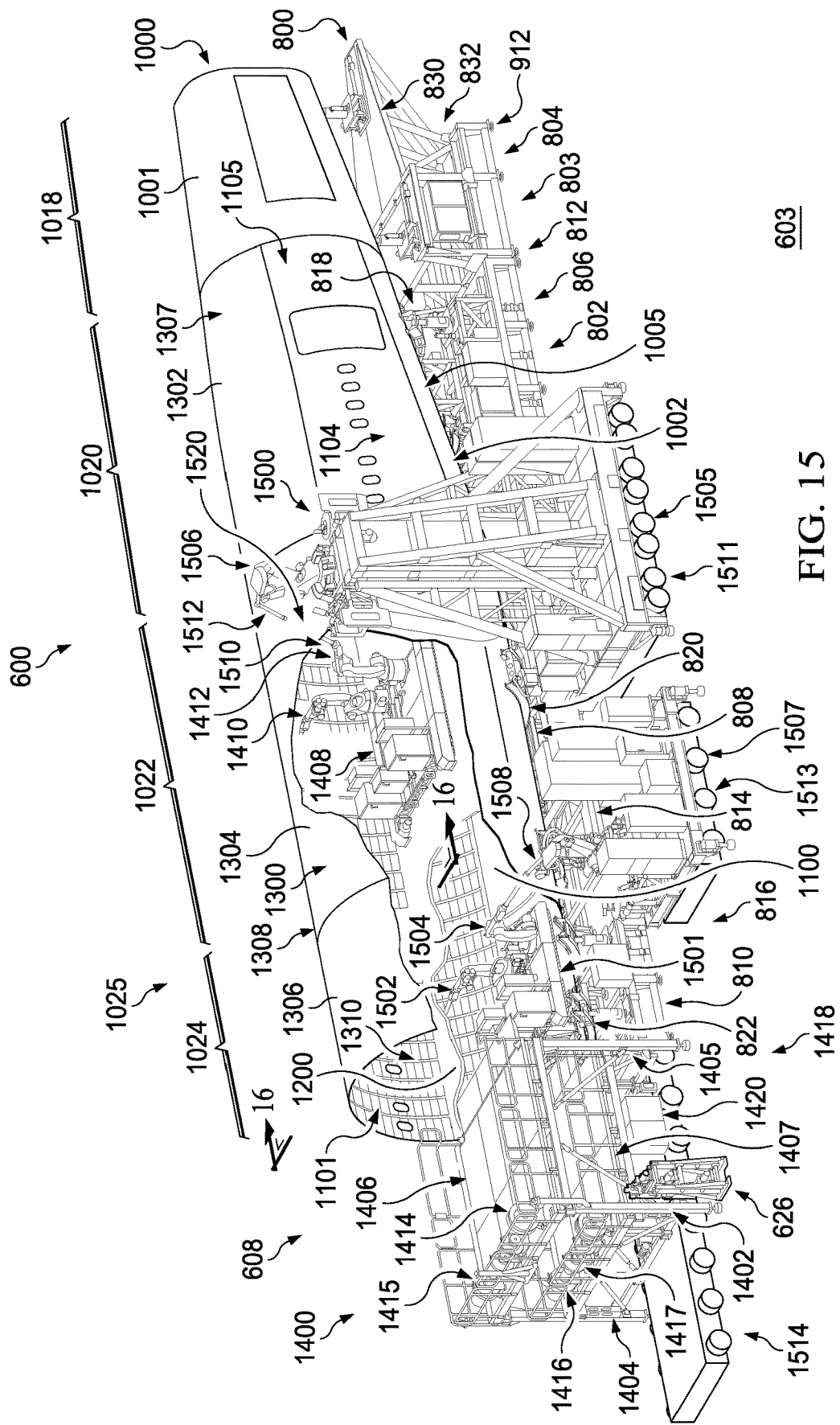
FIG. 15 is an illustration of an isometric cutaway view of a plurality of mobile platforms performing fastening processes within an interior of a fuselage assembly in accordance with an illustrative embodiment.

With reference now to FIG. 15, an illustration of an isometric cutaway view of a plurality of mobile platforms performing fastening processes within interior 1101 of fuselage assembly 1000 is depicted in accordance with an illustrative embodiment. In this illustrative example, plurality of mobile platforms 1500 may be used to perform fastening processes to join plurality of panels 1308 together.

In particular, plurality of panels 1308 may be joined together at selected locations along fuselage assembly 1000. Plurality of panels 1308 may be joined to form at least one of lap joints, butt joints, or other types of joints. In this manner, plurality of panels 1308 may be joined such that at least one of circumferential attachment, longitudinal attachment, or some other type of attachment is created between the various panels of plurality of panels 1308.

As depicted, plurality of mobile platforms 1500 may include internal mobile platform 1408 and internal mobile platform 1501. Internal mobile platform 1408 and internal mobile platform 1501 may be an example of one implementation for number of internal mobile platforms 402 in FIG. 4. Internal mobile platform 1408 may be configured to move along passenger floor 1200, while internal mobile platform 1501 may be configured to move along cargo floor 1100.

As depicted, internal robotic device 1502 and internal robotic device 1504 may be associated with internal mobile platform 1501. Each of internal robotic device 1502 and internal robotic device 1504 may be an example of one implementation for internal robotic device 416 in FIG. 4. Internal robotic device 1502 and internal robotic device 1504 may be similar to internal robotic device 1410 and internal robotic device 1412.

Plurality of mobile platforms 1500 may also include external mobile platform 1505 and external mobile platform 1507. External mobile platform 1505 and external mobile platform 1507 may be an example of one implementation for at least a portion of number of external mobile platforms 400 in FIG. 4. External mobile platform 1505 and external mobile platform 1507 may be examples of implementations for external mobile platform 404 in FIG. 4.

External robotic device 1506 may be associated with external mobile platform 1505. External robotic device 1508 may be associated with external mobile platform 1507. Each of external robotic device 1506 and external robotic device 1508 may be an example of one implementation for external robotic device 408 in FIG. 4.

As depicted, external robotic device 1506 and internal robotic device 1412 may work collaboratively to install fasteners autonomously in fuselage assembly 1000. These fasteners may take the form of, for example, without limitation, at least one of rivets, interference-fit bolts, non-interference-fit bolts, or other types of fasteners or fastener systems. Similarly, external robotic device 1508 and internal robotic device 1504 may work collaboratively to install fasteners autonomously in fuselage assembly 1000. As one illustrative example, end effector 1510 of internal robotic device 1412 and end effector 1512 of external robotic device 1506 may be positioned relative to a same location 1520 on fuselage assembly 1000 to perform a fastening process at location 1520, such as fastening process 424 in FIG. 4.

The fastening process may include at least one of, for example, without limitation, a drilling operation, a fastener insertion operation, a fastener installation operation, an inspection operation, or some other type of operation. The fastener installation operation may take the form of, for example, without limitation, two-stage riveting process 444 described in FIG. 4, interference-fit bolt-type installation process 439 described in FIG. 4, bolt-nut type installation process 433 described in FIG. 4, or some other type of fastener installation operation.

In this illustrative example, autonomous vehicle 1511 may be fixedly associated with external mobile platform 1505. Autonomous vehicle 1511 may be used to drive external mobile platform 1505 autonomously. For example, autonomous vehicle 1511 may be used to autonomously drive external mobile platform 1505 across floor 603 of manufacturing environment 600 relative to assembly fixture 912.

Similarly, autonomous vehicle 1513 may be fixedly associated with external mobile platform 1507. Autonomous vehicle 1513 may be used to drive external mobile platform 1507 autonomously. For example, autonomous vehicle 1513 may be used to autonomously drive external mobile platform 1507 across floor 603 of manufacturing environment 600 relative to assembly fixture 912.

By being fixedly associated with external mobile platform 1505 and external mobile platform 1507, autonomous vehicle 1511 and autonomous vehicle 1513 may be considered integral to external mobile platform 1505 and external mobile platform 1507, respectively. However, in other illustrative examples, these autonomous vehicles may be independent of the external mobile platforms in other illustrative examples.

Once all fastening processes have been completed for fuselage assembly 1000, internal mobile platform 1408 and internal mobile platform 1501 may be autonomously driven across passenger floor 1200 back onto top platform 1406 and bottom platform 1407, respectively, of second tower 1400. Second tower 1400 may then be autonomously decoupled from both utility fixture 626 and assembly fixture 912. Autonomous vehicle 1514 may then be used to autonomously drive or move second tower 1400 away.

In this illustrative example, building of fuselage assembly 1000 may now be considered completed for this stage in the overall assembly process for the fuselage. Consequently, assembly fixture 912 may be autonomously driven across floor 603 to move fuselage assembly 1000 to some other location. In other illustrative examples, first tower 700 from FIG. 7 may be autonomously driven back into selected tower position 718 in FIG. 7 relative to utility fixture 626. First tower 700 from FIG. 7 may then be autonomously recoupled to utility fixture 626 and assembly fixture 912. First tower 700 from FIG. 7 may enable a human operator (not shown) to access interior 1101 of fuselage assembly 1000 to perform other operations including, but not limited to, at least one of inspection operations, fastening operations, system installation operations, or other types of operations. System installation operations may include operations for installing systems such as, for example, without limitation, at least one of a fuselage utility system, an air conditioning system, interior panels, electronic circuitry, some other type of system, or some combination thereof.

Figure 16:
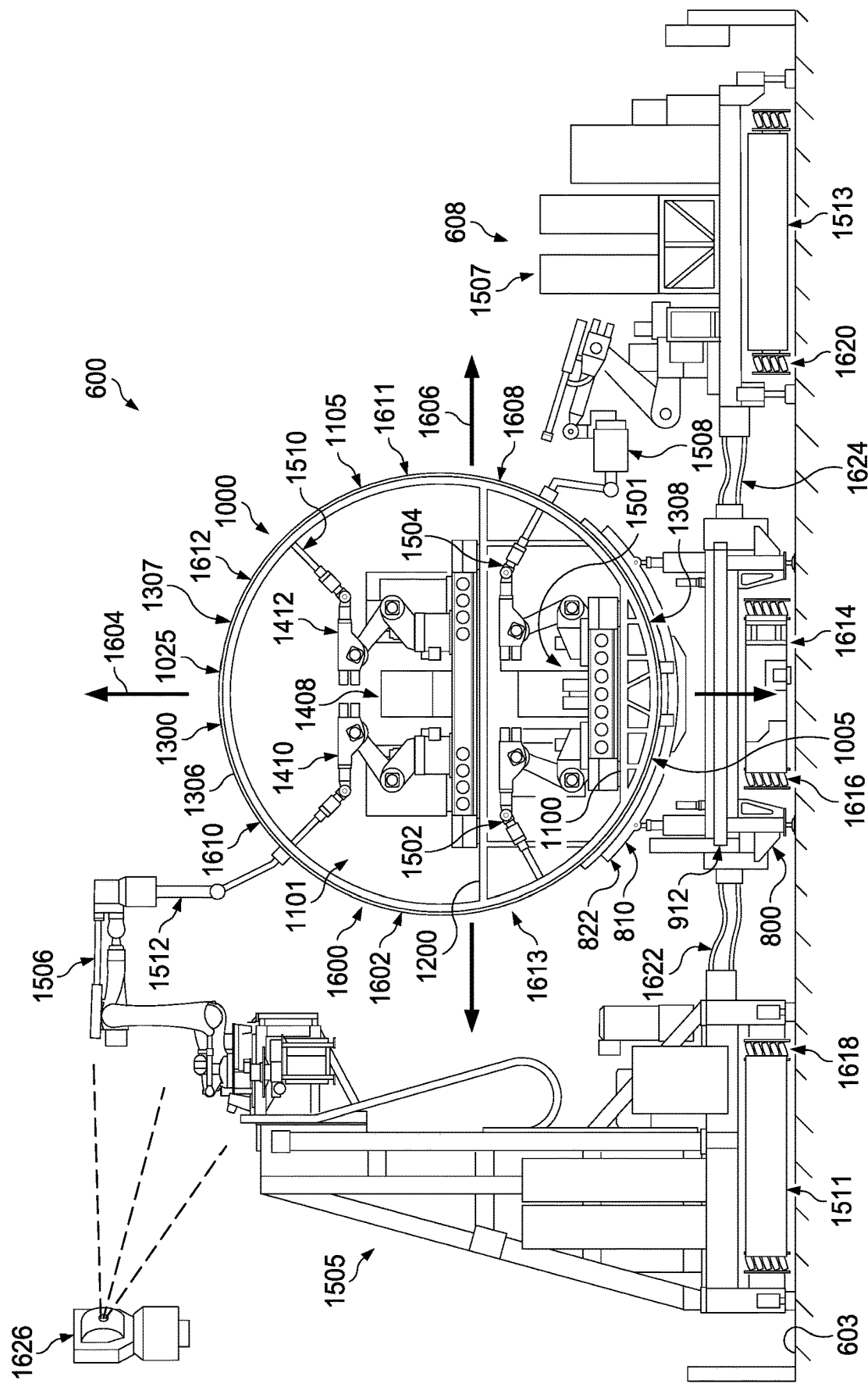
FIG. 16 is an illustration of a cross-sectional view of a flexible manufacturing system performing operations on a fuselage assembly in accordance with an illustrative embodiment.

With reference now to FIG. 16, an illustration of a cross-sectional view of flexible manufacturing system 608 performing operations on fuselage assembly 1000 from FIG. 15 is depicted in accordance with an illustrative embodiment. In this illustrative example, a cross-sectional view of fuselage assembly 1000 from FIG. 15 is depicted taken in the direction of lines 16-16 in FIG. 15.

As depicted, internal mobile platform 1408 and internal mobile platform 1501 are performing operations within interior 1101 of fuselage assembly 1000. External mobile platform 1505 and external mobile platform 1507 are performing assembly operations along exterior 1600 of fuselage assembly 1000.

In this illustrative example, external mobile platform 1505 may be used to perform operations along portion 1602 of exterior 1600 between axis 1604 and axis 1606 at first side 1610 of fuselage assembly 1000. External robotic device 1506 of external mobile platform 1505 may work collaboratively with internal robotic device 1410 of internal mobile platform 1408 to perform fastening processes.

Similarly, external mobile platform 1507 may be used to perform operations along portion 1608 of exterior 1600 of fuselage assembly 1000 between axis 1604 and axis 1606 at second side 1612 of fuselage assembly 1000. External robotic device 1508 of external mobile platform 1507 may work collaboratively with internal robotic device 1504 of internal mobile platform 1501 to perform fastening processes.

Although external mobile platform 1505 is depicted as being located at first side 1610 of fuselage assembly 1000, external mobile platform 1505 may be autonomously driven by autonomous vehicle 1511 to second side 1612 of fuselage assembly 1000 to perform operations along portion 1611 of exterior 1600 of fuselage assembly 1000 between axis 1604 and axis 1606. Similarly, external mobile platform 1507 may be autonomously driven by autonomous vehicle 1513 to second side 1612 of fuselage assembly 1000 to perform operations along portion 1613 of exterior 1600 of fuselage assembly 1000 between axis 1604 and axis 1606.

Although not shown in this illustrative example, an external mobile platform similar to external mobile platform 1505 may have an external robotic device configured to work collaboratively with internal robotic device 1412 of internal mobile platform 1408 at second side 1612 of fuselage assembly 1000. Similarly, an external mobile platform similar to external mobile platform 1507 may have an external robotic device configured to work collaboratively with internal robotic device 1502 of internal mobile platform 1501 at first side 1610 of fuselage assembly 1000.

These four different external mobile platforms and two internal mobile platforms may be controlled such that the operations performed by internal mobile platform 1408 located on passenger floor 1200 may occur at a different location with respect to the longitudinal axis of fuselage assembly 1000 than the operations performed by internal mobile platform 1501 located on cargo floor 1100. The four external mobile platforms may be controlled such that the two external mobile platforms located on the same side of fuselage assembly 1000 do not collide or impede one another. The two external mobile platforms located at the same side of fuselage assembly 1000 may be unable to occupy the same footprint in this illustrative example.

In this illustrative example, external mobile platform 1505 may autonomously couple to assembly fixture 912 to form interface 1622 such that a number of utilities may flow from assembly fixture 912 to external mobile platform 1505. In other words, the number of utilities may be autonomously coupled between external mobile platform 1505 and assembly fixture 912 through interface 1622. In particular, external mobile platform 1505 has been coupled to cradle fixture 810 through interface 1622.

Similarly, external mobile platform 1507 may autonomously couple to assembly fixture 912 to form interface 1624 such that a number of utilities may flow from assembly fixture 912 to external mobile platform 1507. In other words, the number of utilities may be autonomously coupled between external mobile platform 1507 and assembly fixture 912 through interface 1624. In particular, external mobile platform 1507 has been coupled to cradle fixture 810 through interface 1624.

As operations are performed along fuselage assembly 1000 by external mobile platform 1505, external mobile platform 1507, and any other external mobile platforms, these external mobile platforms may be coupled to and decoupled from assembly fixture 912 as needed. For example, external mobile platform 1507 may decouple from cradle fixture 810 as external mobile platform 1507 moves aftward along fuselage assembly 1000 such that external mobile platform 1507 may then autonomously couple to cradle fixture 808 (not shown) from FIGS. 8-15. Further, these external mobile platforms may be coupled to and decoupled from assembly fixture 912 to avoid collisions and prevent the external mobile platforms from impeding each other during maneuvering of the external mobile platforms relative to assembly fixture 912 and fuselage assembly 1000.

As depicted, autonomous vehicle 1614 is shown positioned under the assembly fixture 912 formed by cradle system 800. In this illustrative example, autonomous vehicle 1614, autonomous vehicle 1511, and autonomous vehicle 1513 may have omnidirectional wheels 1616, omnidirectional wheels 1618, and omnidirectional wheels 1620, respectively. In some illustrative examples, metrology system 1626 may be used to help position external mobile platform 1505 and external mobile platform 1507 relative to fuselage assembly 1000.

Figure 17:
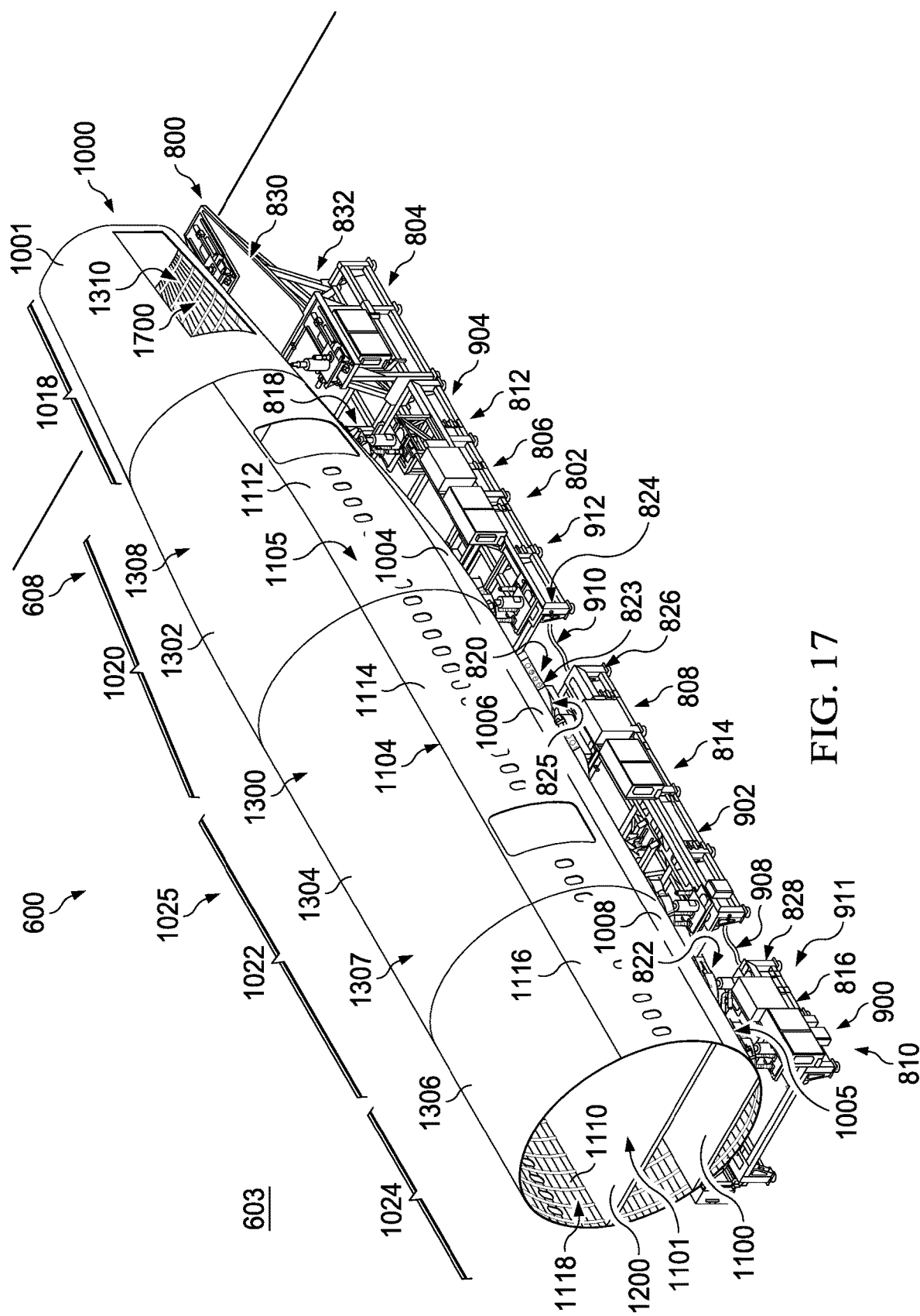
FIG. 17 is an illustration of an isometric view of a fully built fuselage assembly in accordance with an illustrative embodiment.

Turning now to FIG. 17, an illustration of an isometric view of a fully built fuselage assembly is depicted in accordance with an illustrative embodiment. In this illustrative example, fuselage assembly 1000 may be considered completed when plurality of panels 1308 have been fully joined.

In other words, all fasteners needed to join together plurality of panels 1308 have been fully installed. With plurality of panels 1308 joined together, support structure 1700 may be fully formed. Support structure 1700 may be an example of one implementation for support structure 121 in FIG. 1. Fuselage assembly 1000, which is an aft fuselage assembly, may now be ready for attachment to a corresponding middle fuselage assembly (not shown) and forward fuselage assembly (not shown).

As depicted, autonomous vehicles (not shown in this view), similar to autonomous vehicle 1514 shown in FIG. 15, may be positioned under base 812 of cradle fixture 806, base 814 of cradle fixture 808, and base 816 of cradle fixture 810, respectively. Autonomous vehicles, such as number of corresponding autonomous vehicles 316 in FIG. 3, may lift up base 812, base 814, and base 816, respectively, such that plurality of stabilizing members 824, plurality of stabilizing members 826, and plurality of stabilizing members 828, respectively, no longer contact the floor.

These autonomous vehicles (not shown) may then autonomously drive cradle system 800 carrying fuselage assembly 1000 that has been fully built away from assembly environment 602 in FIG. 6 and, in some cases, away from manufacturing environment 600 in FIG. 6. Computer-controlled movement of these autonomous vehicles (not shown) may ensure that number of cradle fixtures 802 maintain their positions relative to each other as fuselage assembly 1000 is being moved.

Figure 18:
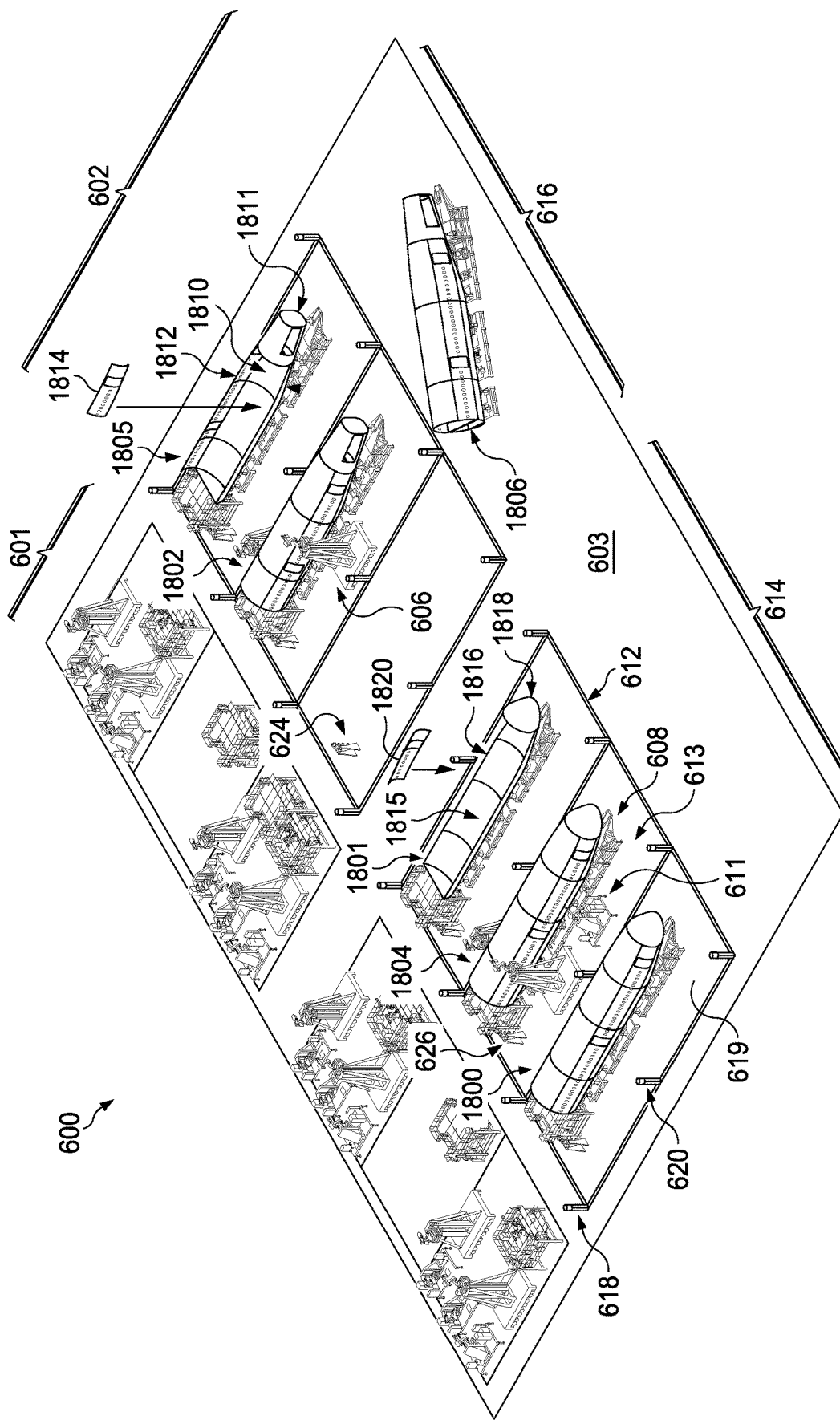
FIG. 18 is an illustration of an isometric view of fuselage assemblies being built within a manufacturing environment in accordance with an illustrative embodiment.

With reference now to FIG. 18, an illustration of an isometric view of fuselage assemblies being built within manufacturing environment 600 is depicted in accordance with an illustrative embodiment. In this illustrative example, plurality of fuselage assemblies 1800 are being built within plurality of work cells 612 in manufacturing environment 600.

Plurality of fuselage assemblies 1800 may include plurality of forward fuselage assemblies 1801 being built in first portion 614 of plurality of work cells 612 and plurality of aft fuselage assemblies 1802 being built in second portion 616 of plurality of work cells 612. Each of plurality of fuselage assemblies 1800 may be an example of one implementation for fuselage assembly 114 in FIG. 1.

As depicted, plurality of fuselage assemblies 1800 are being built concurrently. However, plurality of fuselage assemblies 1800 are at different stages of assembly in this illustrative example.

Forward fuselage assembly 1804 may be an example of one of plurality of forward fuselage assemblies 1801. Forward fuselage assembly 1804 may be an example of one implementation for forward fuselage assembly 117 in FIG. 1. Aft fuselage assembly 1805 may be an example of one of plurality of aft fuselage assemblies 1802. Aft fuselage assembly 1805 may be an example of one implementation for aft fuselage assembly 116 in FIG. 1. In this illustrative example, aft fuselage assembly 1805 may be at an earlier stage of assembly than forward fuselage assembly 1804.

Aft fuselage assembly 1806, which may be another example of an implementation for aft fuselage assembly 116 in FIG. 1, may be a fuselage assembly with all panels joined. As depicted, aft fuselage assembly 1806 is being autonomously driven to some other location for a next stage in the overall fuselage and aircraft manufacturing process.

As described above, aft fuselage assembly 1805 may be partially assembled. In this illustrative example, aft fuselage assembly 1805 has keel 1810, end panel 1811, and first side 1812. End panel 1811 may form an end fuselage section of aft fuselage assembly 1805. As depicted, side panel 1814 may be added to aft fuselage assembly 1805 to build a second side of aft fuselage assembly 1805.

Forward fuselage assembly 1815 may be another example of one of plurality of forward fuselage assemblies 1801. In this illustrative example, forward fuselage assembly 1815 has keel 1816 and end panel 1818. End panel 1818 may form an end fuselage section of forward fuselage assembly 1815. As depicted, side panel 1820 may be added to forward fuselage assembly 1815 to begin building a first side of forward fuselage assembly 1815.

The illustrations of manufacturing environment 600 in FIGS. 6-18 are not meant to imply physical or architectural limitations to the manner in which an illustrative embodiment may be implemented. Other components in addition to or in place of the ones illustrated may be used. Some components may be optional.

The different components shown in FIGS. 6-18 may be illustrative examples of how components shown in block form in FIGS. 1-5 can be implemented as physical structures. Additionally, some of the components in FIGS. 6-18 may be combined with components in FIGS. 1-5, used with components in FIG. 1-5, or a combination of the two.

Figure 19:
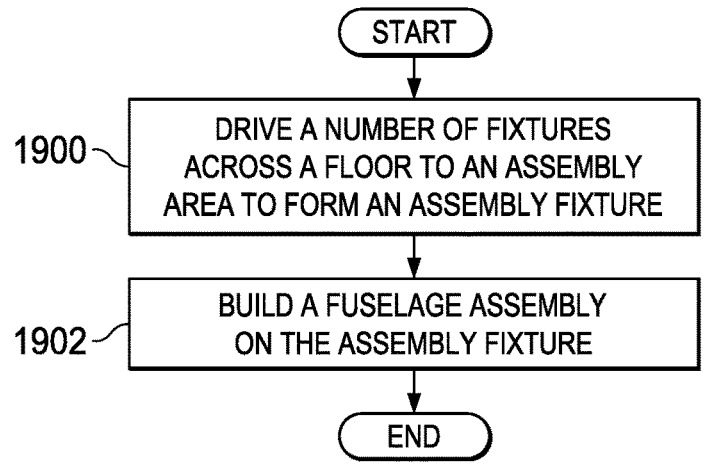
FIG. 19 is an illustration of a process for building a fuselage assembly in the form of a flowchart in accordance with an illustrative embodiment.

Turning now to FIG. 19, an illustration of a process for building a fuselage assembly is depicted in the form of a flowchart in accordance with an illustrative embodiment. The process illustrated in FIG. 19 may be implemented using flexible manufacturing system 106 in FIG. 1. In particular, plurality of mobile systems 134 in FIG. 3 may be used.

The process may begin by driving number of fixtures 313 autonomously across floor 300 to assembly area 304 to form assembly fixture 324 (operation 1900). Number of fixtures 313 may take the form of number of cradle fixtures 314. Next, fuselage assembly 114 may be built on assembly fixture 324 (operation 1902), with the process terminating thereafter.

Figure 20:
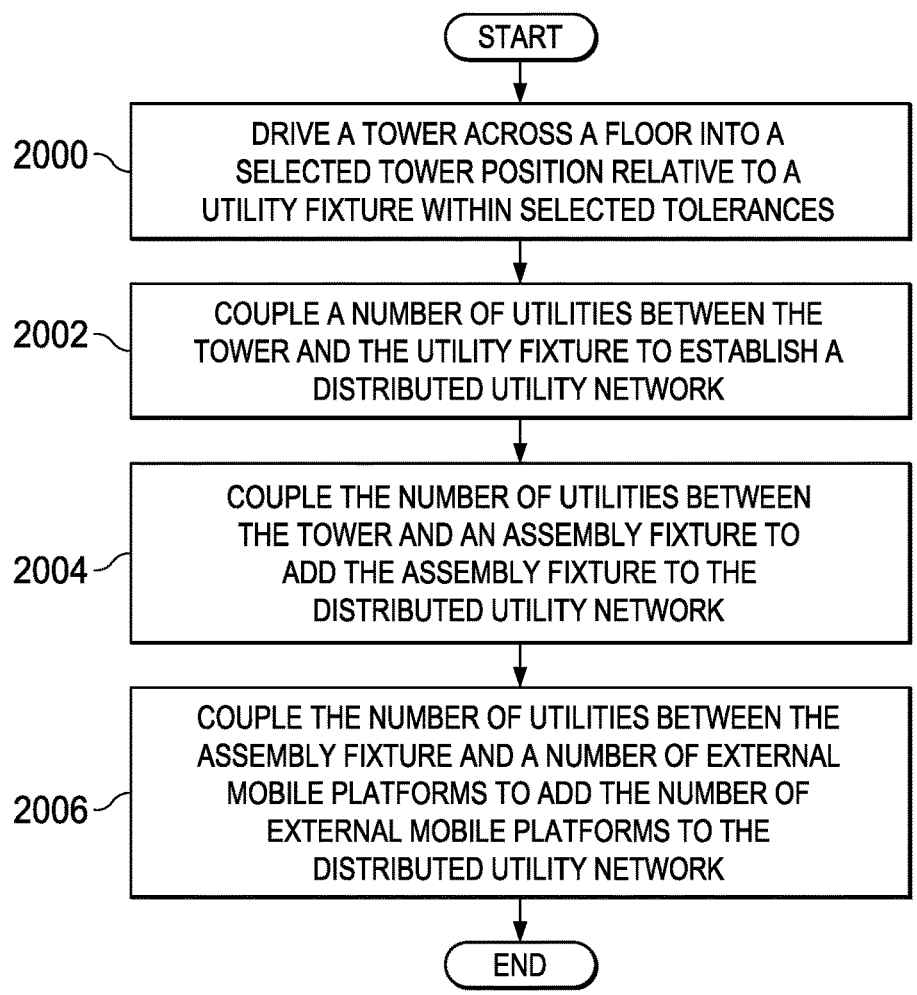
FIG. 20 is an illustration of a process for establishing a distributed utility network in the form of a flowchart in accordance with an illustrative embodiment.

Turning now to FIG. 20, an illustration of a process for establishing a distributed utility network is depicted in the form of a flowchart in accordance with an illustrative embodiment. The process illustrated in FIG. 20 may be implemented using flexible manufacturing system 106 in FIG. 1 to form distributed utility network 144 in FIG. 1.

The process may begin by driving tower 332 autonomously across floor 300 into selected tower position 338 relative to utility fixture 150 within selected tolerances (operation 2000). Tower 332 may be coupled to utility fixture 150 to establish distributed utility network 144 such that number of utilities 146 flow from utility fixture 150 to tower 332 (operation 2002).

Next, assembly fixture 324 may be coupled to the tower to add assembly fixture 324 to distributed utility network 144 such that number of utilities 146 flows from tower 332 to assembly fixture 324 (operation 2004). Thereafter, number of external mobile platforms 400 may be coupled to number of utility units 500 associated with assembly fixture 324 to add number of external mobile platforms 400 to distributed utility network 144 such that number of utilities 146 may flow from assembly fixture 324 through number of utility units 500 to number of external mobile platforms 400 (operation 2006), with the process terminating thereafter.

In some cases, when tower 332 takes the form of first tower 334, first tower 334 may provide a means for providing number of utilities 146 for use by human operators. In one illustrative example, tower 332 may allow a human operator to couple one or more devices to tower 332 to receive number of utilities 146. In this manner, number of utilities 146 may be coupled between tower 332 and any number of devices usable by a human operator such that these devices may be added to distributed utility network 144.

For example, without limitation, a human operator may be able to plug one or more utility cables from a handheld device into one or more utility connections associated with tower 332 or a utility box associated with tower. Once the handheld device is plugged in, the handheld device may become part of distributed utility network 144. The handheld device may take the form of, for example, without limitation, a drill, a fastener insertion tool, a fastener installation tool, an electric-powered hammer, or some other type of handheld device or tool.

When tower 332 takes the form of second tower 336, number of internal mobile platforms 402 located on second tower 336 may be automatically added to distributed utility network 144 by autonomously coupling number of utilities 146 between second tower 336 and utility fixture 150. In particular, number of utilities 146 may flow downstream, in series, from utility fixture 150, to second tower 336, and to number of internal mobile platforms 402.

Figure 21:
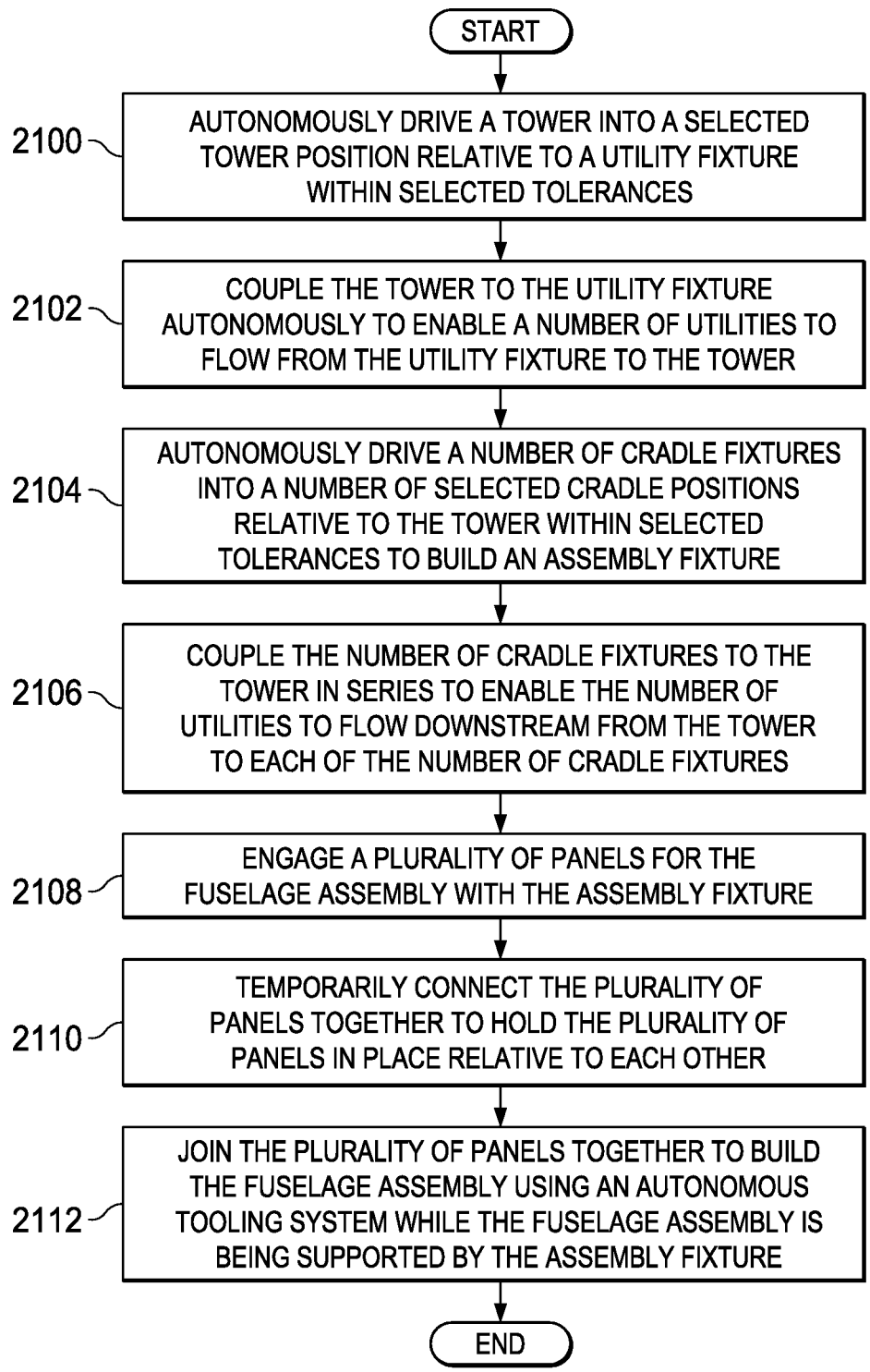
FIG. 21 is an illustration of a process for building a fuselage assembly in the form of a flowchart in accordance with an illustrative embodiment.

Turning now to FIG. 21, an illustration of a process for building a fuselage assembly is depicted in the form of a flowchart in accordance with an illustrative embodiment. The process illustrated in FIG. 21 may be implemented using flexible manufacturing system 106 in FIG. 1 to form distributed utility network 144 in FIG. 1.

The process may begin by driving tower 332 autonomously into selected tower position 338 relative to utility fixture 150 within selected tolerances (operation 2100). Tower 332 may be coupled to utility fixture 150 autonomously to enable number of utilities 146 to flow from utility fixture 150 to tower 332 (operation 2102).

Number of cradle fixtures 314 may be driven autonomously into number of selected cradle positions relative to tower 332 within selected tolerances to build assembly fixture 324 (operation 2104). Number of cradle fixtures 314 may be coupled to tower 332 in series to enable number of utilities 146 to flow downstream from tower 332 to each of number of cradle fixtures 314 (operation 2106). Next, plurality of panels 120 for fuselage assembly 114 may be engaged with assembly fixture 324 (operation 2108).

Plurality of panels 120 may be temporarily connected to each other to hold plurality of panels 120 in place relative to each other (operation 2110). Plurality of panels 120 may be joined together to build fuselage assembly 114 using autonomous tooling system 312 while fuselage assembly 114 is being supported by assembly fixture 324 (operation 2112), with the process terminating thereafter.

Figure 22:
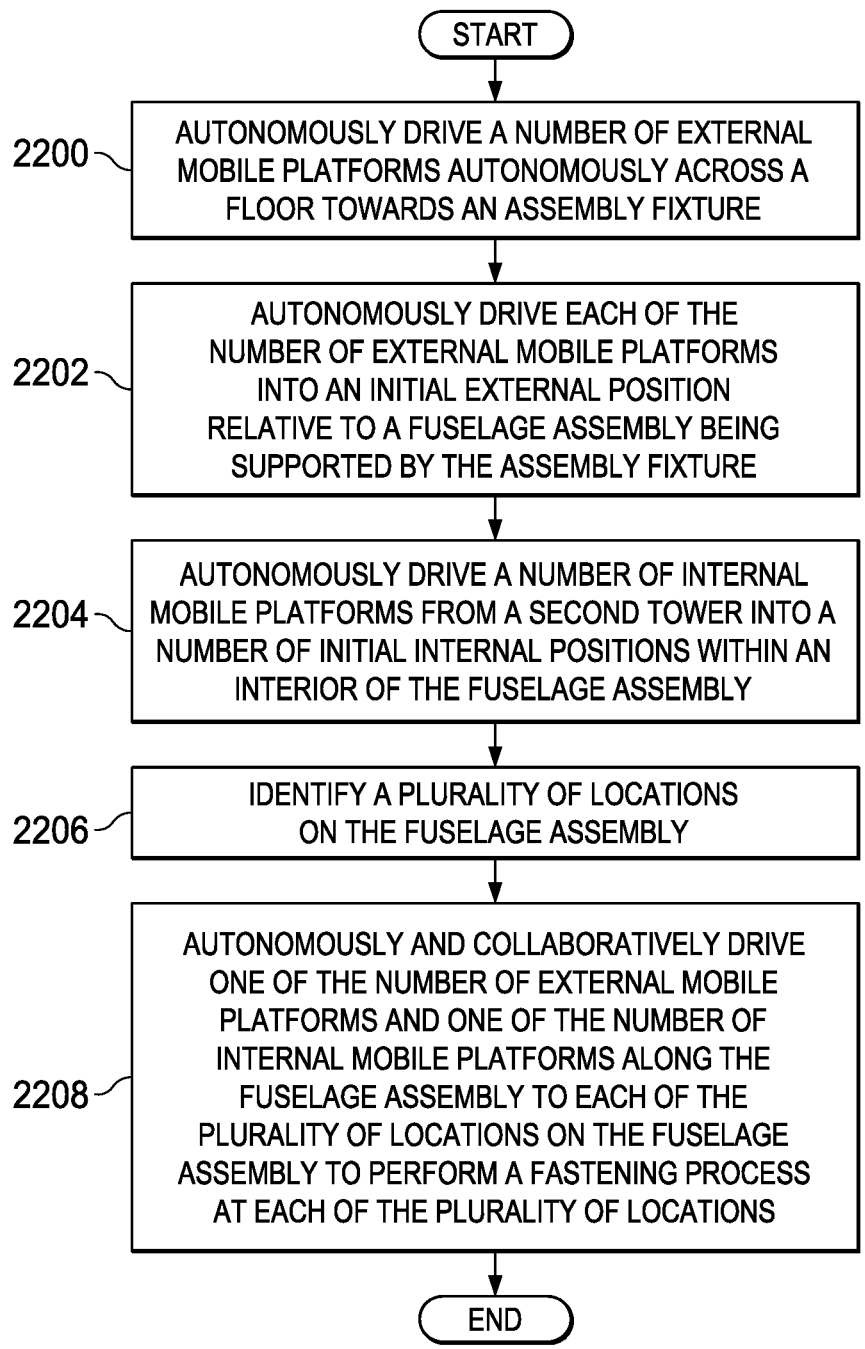
FIG. 22 is an illustration of a process for joining a plurality of panels together in the form of a flowchart in accordance with an illustrative embodiment.

With reference now to FIG. 22, an illustration of a process for joining a plurality of panels together is depicted in the form of a flowchart in accordance with an illustrative embodiment. The process illustrated in FIG. 22 may be an example of one manner in which operation 2112 in FIG. 21 may be performed.

The process may begin by autonomously driving number of external mobile platforms 400 autonomously across floor 300 towards assembly fixture 324 (operation 2200). Next, each of number of external mobile platforms 400 may be autonomously driven into an initial external position relative to fuselage assembly 114 being supported by assembly fixture 324 (operation 2202). The initial external position for each of number of external mobile platforms 400 may be selected such that number of external mobile platforms 400 will not collide with or impede each other's path as number of external mobile platforms 400 move longitudinally along fuselage assembly 114.

In one illustrative example, when fuselage assembly 114 takes the form of forward fuselage assembly 117, a first external mobile platform may be positioned at the aftmost end of forward fuselage assembly 117 along first side 206 of forward fuselage assembly 117. In this example, the aftmost end of forward fuselage assembly 117 may be located nearest to second tower 336 coupled to assembly fixture 324 supporting forward fuselage assembly 117. A second external mobile platform may then be positioned at the aftmost end of forward fuselage assembly 117 along second side 208 of forward fuselage assembly 117. The first and second external mobile platforms may be positioned at these initial external positions such that the first and second external mobile platforms may then be moved together longitudinally along forward fuselage assembly 117 from the aftmost end to the forwardmost end without one colliding with or impeding the movement of the other.

In another illustrative example, a first external mobile platform may be positioned at the aftmost end of forward fuselage assembly 117 along first side 206 of forward fuselage assembly 117, while the second external mobile platform may be positioned relative to first side 206 of forward fuselage assembly 117 just behind the first external mobile platform near second tower 336. A third external mobile platform may be similarly positioned at the aftmost end of forward fuselage assembly 117 but along second side 208 of forward fuselage assembly 117 and a fourth external mobile platform may be positioned relative to second side 208 of forward fuselage assembly 117 just behind the third external mobile platform near second tower 336.

These initial external positions for the first, second, third, and fourth external mobile platforms may be selected such that the first and third external mobile platforms may begin autonomous longitudinal movement along exterior 234 of forward fuselage assembly 117. At some selected time later, the second and third external mobile platforms may then begin autonomous longitudinal movement along exterior 234 of forward fuselage assembly 117. In this manner, the first, second, third, and fourth external mobile platforms may be autonomously driven longitudinally along forward fuselage assembly 117 to perform operations along exterior 234 of forward fuselage assembly 117 without one colliding with or impeding the movement of another.

In this manner, number of external mobile platforms 400 may be autonomously positioned in a number of initial external positions relative to fuselage assembly 114 in any number of ways. Further, depending on the implementation, number of external mobile platforms 400 may include one, two, three, four, five, six, or some other number of external mobile platforms that may be autonomously driven relative to fuselage assembly 114 such that these external mobile platforms do not collide with or impede each other's movement.

Thereafter, number of internal mobile platforms 402 may be autonomously driven from second tower 336 into a number of initial internal positions within interior 236 of fuselage assembly 114 (operation 2204). Plurality of locations 446 on fuselage assembly 114 may be identified (operation 2206). One of number of external mobile platforms 400 and one of number of internal mobile platforms 402 may be autonomously and collaboratively driven along fuselage assembly 114 to each of plurality of locations 446 on fuselage assembly 114 to perform fastening process 424 at each of plurality of locations 446 (operation 2208), with the process terminating thereafter.

In operation 2208, the end effector associated with each of number of external mobile platforms 400 and the end effector associated with each of number of internal mobile platforms 402 may have a number of degrees of freedom. In one illustrative example, each of these end effectors may have at least one degree of freedom. In this manner, the end effectors may be autonomously controlled to move in a longitudinal direction, a hoop-wise direction, and in other directions. In this manner, fastening process 424 may be performed at locations on fuselage assembly 114 located in the hoop-wise direction as well as locations on fuselage assembly 114 located in the longitudinal direction.

In operation 2208, each of number of external mobile platforms 400 may work collaboratively with a corresponding one of number of internal mobile platforms 402 to perform a fastening process at a particular location on fuselage assembly 114. For example, without limitation, external mobile platform 404 may perform one or more operations at location 426 on fuselage assembly 114 at exterior 234 of fuselage assembly 114 while internal mobile platform 406 may perform one or more operations at location 426 on fuselage assembly 114 at interior 236 of fuselage assembly 114. The operations performed by external mobile platform 404 and internal mobile platform 406 may be coordinated such that fastening process 424 is fully performed at location 426.

Figure 23:
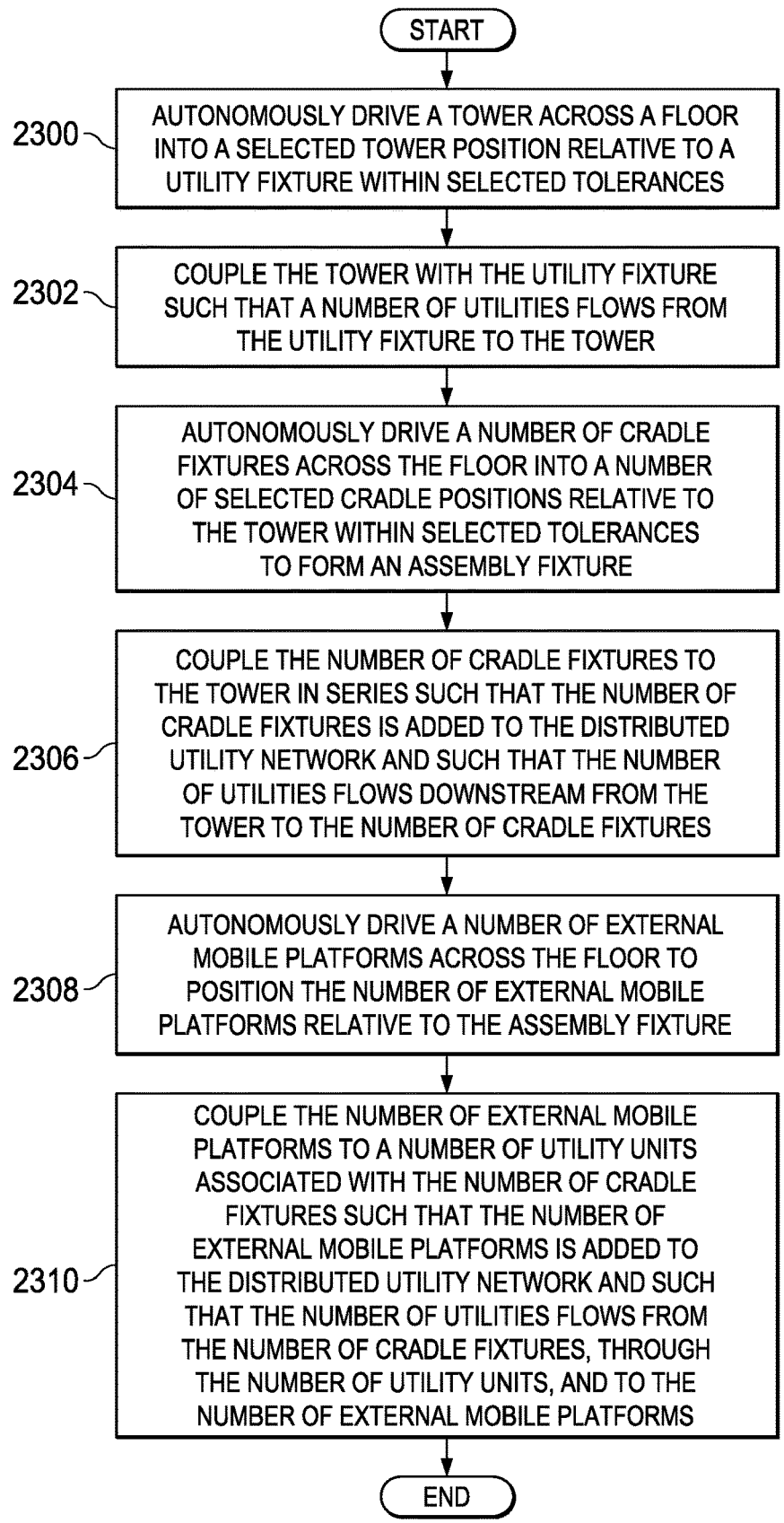
FIG. 23 is an illustration of a process for establishing a distributed utility network in the form of a flowchart in accordance with an illustrative embodiment.

Turning now to FIG. 23, an illustration of a process for establishing a distributed utility network is depicted in the form of a flowchart in accordance with an illustrative embodiment. The process illustrated in FIG. 23 may be implemented using flexible manufacturing system 106 in FIG. 1 to establish distributed utility network 144 described in FIGS. 1 and 5.

The process may begin by autonomously driving tower 332 across floor 300 into selected tower position 338 relative to utility fixture 150 within selected tolerances (operation 2300). Next, tower 332 may be coupled with utility fixture 150 to establish distributed utility network 144 such that number of utilities 146 flows from utility fixture 150 to the tower 332 (operation 2302). In operation 2302, interface 342 may be formed between tower 332 and utility fixture 150.

When tower 332 takes the form of second tower 336, number of internal mobile platforms 402 may be located on tower 332. In these cases, coupling tower 332 to utility fixture 150 may result in number of internal mobile platforms 402 also being added to distributed utility network 144. Number of utilities 146 may flow from tower 332 to number of internal mobile platforms 402.

Thereafter, number of cradle fixtures 314 may be autonomously driven across floor 300 into number of selected cradle positions 320 relative to tower 332 within selected tolerances to form assembly fixture 324 (operation 2304). Number of cradle fixtures 314 may then be coupled to tower 332 in series such that number of cradle fixtures 314 is added to distributed utility network 144 and such that number of utilities 146 flows downstream from tower 332 to number of cradle fixtures 314 (operation 2306). In particular, in operation 2306, assembly fixture 324 may form interface 340 with tower 332.

Next, number of external mobile platforms 400 may be autonomously driven across floor 300 to position number of external mobile platforms 400 relative to assembly fixture 324 (operation 2308). Number of external mobile platforms 400 may be coupled to number of utility units 500 associated with number of cradle fixtures 314 such that number of external mobile platforms 400 is added to distributed utility network 144 and such that number of utilities 146 flows from number of cradle fixtures 314, through number of utility units 500, and to number of external mobile platforms 400 (operation 2310), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, a portion of an operation or step, some combination thereof.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 24:
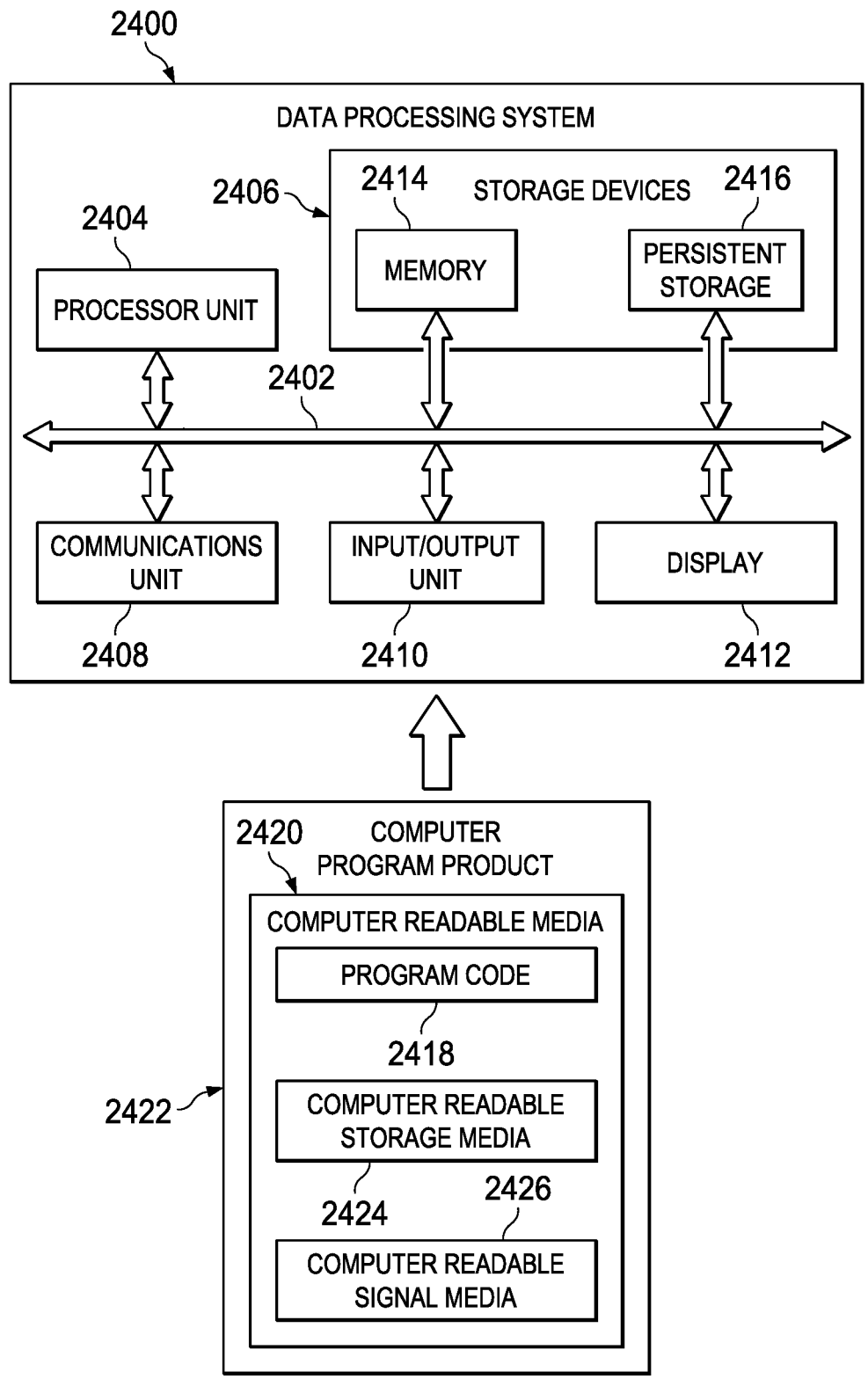
FIG. 24 is an illustration of a data processing system in the form of a block diagram in accordance with an illustrative embodiment.

Turning now to FIG. 24, an illustration of a data processing system is depicted in the form of a block diagram in accordance with an illustrative embodiment. Data processing system 2400 may be used to implement any of the controllers described above, including control system 136 in FIG. 1. As depicted, data processing system 2400 includes communications framework 2402, which provides communications between processor unit 2404, storage devices 2406, communications unit 2408, input/output unit 2410, and display 2412. In some cases, communications framework 2402 may be implemented as a bus system.

Processor unit 2404 is configured to execute instructions for software to perform a number of operations. Processor unit 2404 may comprise at least one of a number of processors, a multi-processor core, or some other type of processor, depending on the implementation. In some cases, processor unit 2404 may take the form of a hardware unit, such as a circuit system, an application specific integrated circuit (ASIC), a programmable logic device, or some other suitable type of hardware unit.

Instructions for the operating system, applications and programs run by processor unit 2404 may be located in storage devices 2406. Storage devices 2406 may be in communication with processor unit 2404 through communications framework 2402. As used herein, a storage device, also referred to as a computer readable storage device, is any piece of hardware capable of storing information on a temporary basis, a permanent basis, or both. This information may include, but is not limited to, data, program code, other information, or some combination thereof.

Memory 2414 and persistent storage 2416 are examples of storage devices 2406. Memory 2414 may take the form of, for example, a random access memory or some type of volatile or non-volatile storage device. Persistent storage 2416 may comprise any number of components or devices. For example, persistent storage 2416 may comprise a hard drive, a flash memory, a rewritable optical disk, a rewritable magnetic tape, or some combination of the above. The media used by persistent storage 2416 may or may not be removable.

Communications unit 2408 allows data processing system 2400 to communicate with other data processing systems, devices, or both. Communications unit 2408 may provide communications using physical communications links, wireless communications links, or both.

Input/output unit 2410 allows input to be received from and output to be sent to other devices connected to data processing system 2400. For example, input/output unit 2410 may allow user input to be received through a keyboard, a mouse, some other type of input device, or a combination thereof. As another example, input/output unit 2410 may allow output to be sent to a printer connected to data processing system 2400.

Display 2412 is configured to display information to a user. Display 2412 may comprise, for example, without limitation, a monitor, a touch screen, a laser display, a holographic display, a virtual display device, some other type of display device, or a combination thereof.

In this illustrative example, the processes of the different illustrative embodiments may be performed by processor unit 2404 using computer-implemented instructions. These instructions may be referred to as program code, computer usable program code, or computer readable program code and may be read and executed by one or more processors in processor unit 2404.

In these examples, program code 2418 is located in a functional form on computer readable media 2420, which is selectively removable, and may be loaded onto or transferred to data processing system 2400 for execution by processor unit 2404. Program code 2418 and computer readable media 2420 together form computer program product 2422. In this illustrative example, computer readable media 2420 may be computer readable storage media 2424 or computer readable signal media 2426.

Computer readable storage media 2424 is a physical or tangible storage device used to store program code 2418 rather than a medium that propagates or transmits program code 2418. Computer readable storage media 2424 may be, for example, without limitation, an optical or magnetic disk or a persistent storage device that is connected to data processing system 2400.

Alternatively, program code 2418 may be transferred to data processing system 2400 using computer readable signal media 2426. Computer readable signal media 2426 may be, for example, a propagated data signal containing program code 2418. This data signal may be an electromagnetic signal, an optical signal, or some other type of signal that can be transmitted over physical communications links, wireless communications links, or both.

The illustration of data processing system 2400 in FIG. 24 is not meant to provide architectural limitations to the manner in which the illustrative embodiments may be implemented. The different illustrative embodiments may be implemented in a data processing system that includes components in addition to or in place of those illustrated for data processing system 2400. Further, components shown in FIG. 24 may be varied from the illustrative examples shown.

Figure 25:
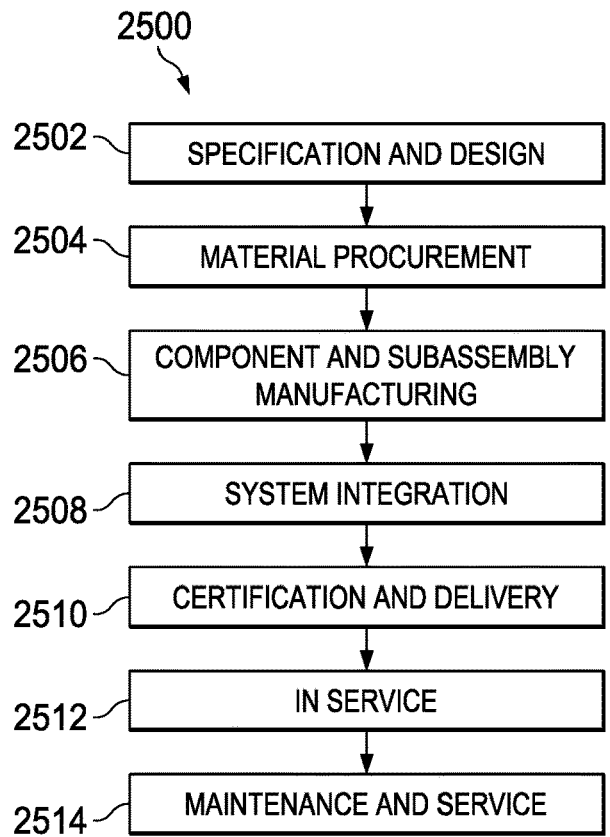
FIG. 25 is an illustration of an aircraft manufacturing and service method in the form of a block diagram in accordance with an illustrative embodiment.
Figure 26:
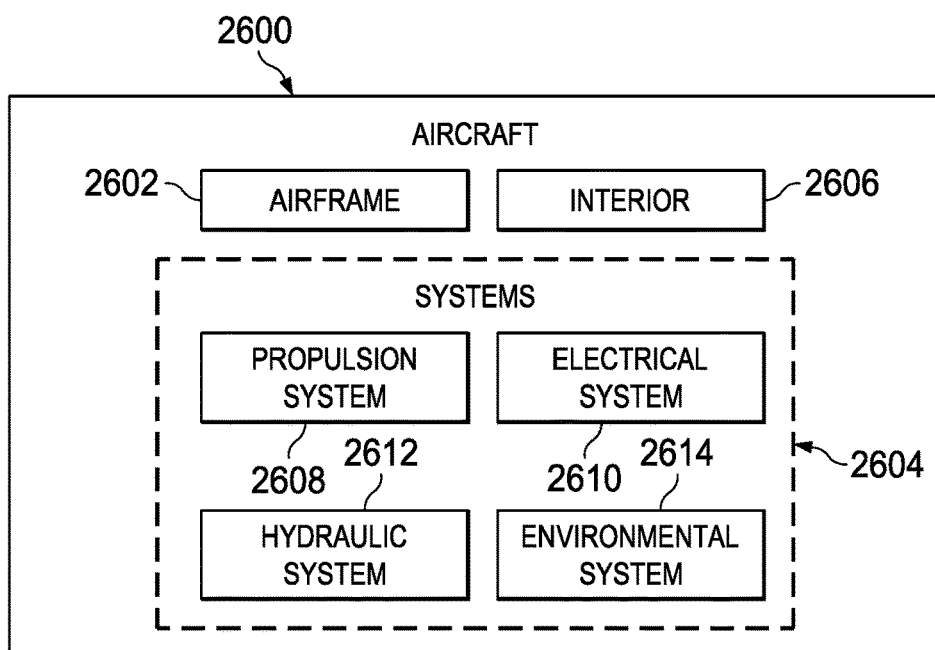
FIG. 26 is an illustration of an aircraft in the form of a block diagram in which an illustrative embodiment may be implemented.

The illustrative embodiments of the disclosure may be described in the context of aircraft manufacturing and service method 2500 as shown in FIG. 25 and aircraft 2600 as shown in FIG. 26. Turning first to FIG. 25, an illustration of an aircraft manufacturing and service method is depicted in the form of a block diagram in accordance with an illustrative embodiment. During pre-production, aircraft manufacturing and service method 2500 may include specification and design 2502 of aircraft 2600 in FIG. 26 and material procurement 2504.

During production, component and subassembly manufacturing 2506 and system integration 2508 of aircraft 2600 in FIG. 26 takes place. Thereafter, aircraft 2600 in FIG. 26 may go through certification and delivery 2510 in order to be placed in service 2512. While in service 2512 by a customer, aircraft 2600 in FIG. 26 is scheduled for routine maintenance and service 2514, which may include modification, reconfiguration, refurbishment, and other maintenance or service.

Each of the processes of aircraft manufacturing and service method 2500 may be performed or carried out by at least one of a system integrator, a third party, or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 26, an illustration of an aircraft is depicted in the form of a block diagram in which an illustrative embodiment may be implemented. In this example, aircraft 2600 is produced by aircraft manufacturing and service method 2500 in FIG. 25 and may include airframe 2602 with plurality of systems 2604 and interior 2606. Examples of systems 2604 include one or more of propulsion system 2608, electrical system 2610, hydraulic system 2612, and environmental system 2614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2500 in FIG. 25. In particular, flexible manufacturing system 106 from FIG. 1 may be used to build at least a portion of airframe 2602 of aircraft 2600 during any one of the stages of aircraft manufacturing and service method 2500. For example, without limitation, flexible manufacturing system 106 from FIG. 1 may be used during at least one of component and subassembly manufacturing 2506, system integration 2508, or some other stage of aircraft manufacturing and service method 2500 to form a fuselage for aircraft 2600.

In one illustrative example, components or subassemblies produced in component and subassembly manufacturing 2506 in FIG. 25 may be fabricated or manufactured in a manner similar to components or subassemblies produced while aircraft 2600 is in service 2512 in FIG. 25. As yet another example, one or more apparatus embodiments, method embodiments, or a combination thereof may be utilized during production stages, such as component and subassembly manufacturing 2506 and system integration 2508 in FIG. 25. One or more apparatus embodiments, method embodiments, or a combination thereof may be utilized while aircraft 2600 is in service 2512, during maintenance and service 2514 in FIG. 25, or both. The use of a number of the different illustrative embodiments may substantially expedite the assembly of and reduce the cost of aircraft 2600.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A machine configured to assemble sections of a fuselage, wherein the machine comprises:
   a holding cell;
   work cells, wherein each work cell in the work cells comprises, respectively, a utility fixture configured to electrically and physically accept an autonomous couple from a drivable tower that comprises a top platform and a bottom platform, wherein the top platform is configured to support a passenger floor internal robotic device and rise above the bottom platform, configured to support a cargo floor internal robotic device, by a distance equal to a height of a passenger floor above a cargo floor in a fuselage section of the sections of the fuselage;

an assembly fixture that comprises a number of drivable cradle fixtures, wherein each drivable cradle fixture in the drivable cradle fixtures, respectively comprise:
a base;
a number of retaining structures configured to retain and support the fuselage section, wherein the number of retaining structures each comprise, respectively, a radius of curvature equivalent to a radius of curvature of a keel panel of the fuselage section; and
an interface configured to couple physically and electrically to:
the drivable tower; or
another drivable cradle fixture in the number of drivable cradle fixtures; and
an autonomous panel joining system configured to join a plurality of panels together on the assembly fixture, wherein the autonomous panel joining system comprises:
an external mobile platform configured to support an external robotic device configured to associate with the passenger floor internal robotic device; and
a second external mobile platform configured to support a second external robotic device configured to associate with the cargo floor internal robotic device.

2. The machine of claim 1, wherein the drivable tower is further configured to couple at least one of an air or a hydraulic supply from the utility fixture.

3. The machine of claim 2, wherein the drivable tower is an autonomously drivable tower and wherein the number of drivable cradle fixtures is a number of autonomously drivable cradle fixtures.

4. The machine of claim 3, wherein the utility fixture is further configured to supply: communications, hydraulic fluid, water, and air.

5. The machine of claim 3, wherein the autonomous panel joining system comprises a number of drivable internal mobile platforms located on the autonomously drivable tower.

6. The machine of claim 3, wherein the external mobile platform configured to support an external robotic device configured to associate with the passenger floor internal robotic device is further configured to autonomously couple to the assembly fixture.

7. The machine of claim 2, wherein the drivable tower comprises a ramp configured to provide access to the bottom platform from a work cell in the work cells.

8. The machine of claim 2, further comprising an autonomous vehicle capable of autonomously driving the drivable tower between the holding cell and the work cells.

9. The machine of claim 1, further comprising:
a sensor located in a work cell of the work cells and configured to track and position the drivable tower and each drivable cradle fixture in the number of drivable cradle fixtures; and
an autonomous vehicle integrally associated with the drivable tower.

10. The machine of claim 1, wherein each retaining structure in the number of retaining structures is associated with, respectively, the base of the drivable cradle fixture.

11. The machine of claim 10, wherein each of the number of retaining structures is 4.

\* \* \* \* \*

UNITED STATES PATENT AND TRADEMARK OFFICE
CERTIFICATE OF CORRECTION

PATENT NO. : 12,290,852 B2
APPLICATION NO. : 18/356032
DATED : May 6, 2025
INVENTOR(S) : Harinder S. Oberoi et al.

Page 1 of 1

It is certified that error appears in the above-identified patent and that said Letters Patent is hereby corrected as shown below:

In the Claims

Column 52, Line 33, correct "wherein each of the" to read -- wherein the --

Signed and Sealed this
Third Day of June, 2025

Coke Morgan Stewart
*Acting Director of the United States Patent and Trademark Office*